(12) United States Patent
Kasagi et al.

(10) Patent No.: US 11,327,764 B2
(45) Date of Patent: May 10, 2022

(54) INFORMATION PROCESSING SYSTEM AND METHOD FOR CONTROLLING INFORMATION PROCESSING SYSTEM

(71) Applicant: FUJITSU LIMITED, Kawasaki (JP)

(72) Inventors: Akihiko Kasagi, Kawasaki (JP); Takashi Arakawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 282 days.

(21) Appl. No.: 16/664,982

(22) Filed: Oct. 28, 2019

(65) Prior Publication Data

US 2020/0167162 A1 May 28, 2020

(30) Foreign Application Priority Data

Nov. 22, 2018 (JP) .............................. JP2018-219355

(51) Int. Cl.
*G06F 9/38* (2018.01)
*G06F 15/80* (2006.01)
*G06F 9/345* (2018.01)

(52) U.S. Cl.
CPC ............ *G06F 9/3836* (2013.01); *G06F 9/345* (2013.01); *G06F 9/3889* (2013.01); *G06F 15/8023* (2013.01)

(58) Field of Classification Search
USPC ........................................................ 709/201
See application file for complete search history.

(56) References Cited

U.S. PATENT DOCUMENTS

| | | | | |
|---|---|---|---|---|
| 2007/0220164 A1* | 9/2007 | Inagaki | ............. | G06F 15/17381 709/231 |
| 2015/0095488 A1* | 4/2015 | Sutou | .................. | G06F 11/3404 709/224 |
| 2017/0123661 A1* | 5/2017 | Chen | ..................... | G06F 3/0611 |

FOREIGN PATENT DOCUMENTS

| JP | 2007-249810 A | 9/2007 |
|---|---|---|
| JP | 2010-211553 A | 9/2010 |

* cited by examiner

*Primary Examiner* — Hermon Asres
(74) *Attorney, Agent, or Firm* — Fujitsu Patent Center

(57) ABSTRACT

A method for controlling an information processing system, the information processing system including multiple information processing devices coupled to each other, each of the multiple information processing devices including multiple main operation devices and multiple aggregate operation devices that are coupled to each other, the method includes: acquiring, by each of the aggregate operation devices, array data items from a main operation device coupled to the concerned aggregate operation device; determining the order of dimensions in which a process is executed and in which the information processing devices are coupled to each other; executing for each of the dimensions in accordance with the order of the dimensions, a process of halving the array data items and distributing the array data items to information processing devices arranged in the dimension; executing a process of transmitting, to information processing devices arranged in the dimension, operation results calculated based on data items.

8 Claims, 38 Drawing Sheets

INFORMATION PROCESSING SYSTEM AND METHOD FOR CONTROLLING INFORMATION PROCESSING SYSTEM

CROSS-REFERENCE TO RELATED APPLICATION

This application is based upon and claims the benefit of priority of the prior Japanese Patent Application No. 2018-219355, filed on Nov. 22, 2018, the entire contents of which are incorporated herein by reference.

FIELD

The embodiments relate to an information processing system and a method for controlling an information processing system.

BACKGROUND

In the field of high performance computing (HPC), a parallel computation system in which many calculators that are called nodes are coupled to each other is used in many cases. Each of the nodes may be a single chip set, for example. In recent years, the parallel computation system is used for deep learning or the like.

In the parallel computation system, an Allreduce process is used in many cases. The Allreduce process is collective communication, which is many-to-many communication to be executed by many applications for an operation in deep learning or the like. The Allreduce process is a process of making results, which have been obtained by aggregating values calculated by processes and using the aggregated values to execute operations, common to all the processes. By executing the collective communication, the processes executed by the nodes hold results of executing operations on the values held in all the processes. In the case where the Allreduce process is executed, each of the nodes acquires values held in processes executed by all the other nodes.

In the Allreduce process, however, when the values held in the nodes are simply aggregated into any of the nodes and a Reduce process is executed, amounts of communication data and amounts to be computed are uneven. It is, therefore, preferable that the nodes simultaneously execute operations in parallel as much as possible and amounts of data to be transferred be small.

As a traditional technique for reducing amounts of communication data in the Allreduce process, a halving and doubling method has been proposed. When a halving operation is executed in the halving and doubling method, the amount of communication data is reduced by half for each of communication steps. On the other hand, when a doubling operation is executed in the halving and doubling method, the amount of communication data is doubled for each of the communication steps. Thus, in the halving and doubling method, as the communication steps are progressed, the amount of communication data is reduced by executing the halving after the start of the process. After that, when the communication steps are further progressed, the amount of communication data is increased by executing the doubling. Thus, in the halving and doubling method, in an early step, mutual communication is executed using large data. In an intermediate step, mutual communication is executed using small data. After that, when the steps are progressed, mutual communication is executed using large data.

Among parallel computation systems, a system that includes main operation devices for executing a main operation and aggregate operation devices for executing an aggregate operation exists. In this case, the aggregate operation devices are used for computation in the Allreduce process, and the main operation devices are not used for the computation in the Allreduce process. Data to be subjected to the Allreduce process is stored in memories included in the main operation devices.

For example, a parallel computation system that includes eight main operation devices and four aggregate operation devices on a single system board exists. Each of the main operation devices and the aggregate operation devices has a memory, an arithmetic circuit, and ten interconnect ports.

As an example of coupling in the system, the main operation devices are not directly coupled to each other and are directly coupled to the four aggregate operation devices. That is, the main operation devices are coupled to each other via the aggregate operation devices. In this case, except for interconnect ports used for the coupling within the system board, each of the main operation devices has two ports, and each of the aggregate operation devices has six ports. The main and aggregate operation devices are coupled to main and aggregate operation devices on another system board via these remaining ports. For example, the main operation devices are coupled to each other between the system boards in a three-dimensional torus. The aggregate operation devices are coupled to each other between the system boards in a one-dimensional torus. Thus, the parallel computation system exemplified has a structure in which three-dimensional torus meshes are coupled to each other in a ring.

There is a traditional technique for executing collective communication by transferring a portion of data to processes adjacent to each other in a first direction and transferring a portion of the data to processes adjacent to each other in a second direction in a next data transfer process in an n-dimensional torus topology. There is another traditional technique for dividing data to be aggregated into some data items, using a crossbar switch to transfer the divided data items to a target node, and executing an aggregate operation for each partial region.

Examples of the related art are Japanese Laid-open Patent Publication No. 2010-211553 and Japanese Laid-open Patent Publication No. 2007-249810.

SUMMARY

According to an aspect of the embodiments, provided is a method for controlling an information processing system of a torus structure, the information processing system including multiple information processing devices coupled to each other, each of the multiple information processing devices including multiple main operation devices and multiple aggregate operation devices that are coupled to each other. The method includes: acquiring, by each of the aggregate operation devices, array data items from a main operation device coupled to the concerned aggregate operation device; determining, by each of the aggregate operation devices, the order of dimensions in which a process is executed and in which the information processing devices are coupled to each other; repeatedly executing, by each of the aggregate operation devices, for each of the dimensions in accordance with the order of the dimensions, a process of halving the array data items and distributing the array data items to information processing devices arranged in the dimension; repeatedly executing, by each of the aggregate operation devices, for each of the dimensions in accordance with the opposite order to the order of the dimensions, a process of transmitting, to information processing devices arranged in the dimension, operation results calculated based on data items received from the information processing devices arranged in the dimensions, and receiving, from the information processing devices arranged in the dimension, operation results calculated by the information processing devices arranged in the dimension; and transmitting, by each of the aggregate operation devices, the held operation results to the main operation device coupled to the concerned aggregate operation device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In a traditional parallel computation system for the traditional halving and doubling method, operation devices for executing an aggregate operation and operation devices storing data match and are directly coupled to each other. The traditional halving and doubling method is used for a certain system. A position of data to be used for an operation in the certain system is different from that in the aforementioned traditional parallel computation system including the main operation devices and the aggregate operation devices. A topology structure of operation devices included in the certain system is different from that in the traditional parallel computation system. It is, therefore, difficult to apply the traditional halving and doubling method to the parallel computation system including the main operation devices and the aggregate operation devices.

In the aforementioned traditional technique in which processes that are destinations of data to be continuously transferred are installed in different directions and the aforementioned traditional technique for executing an aggregate operation for each partial region, a system in which a main operation device and an aggregate operation device are different from each other is not considered, and it is difficult to reduce an amount of data to be transferred.

Techniques disclosed herein aim to provide an information processing system and a method for controlling an information processing system, which reduce an amount of data to be transferred.

Hereinafter, embodiments of an information processing system disclosed herein and a method, disclosed herein, for controlling an information processing system are described in detail with reference to the drawings. The information processing system disclosed herein and the method, disclosed herein, for controlling the information processing system are not limited by the following embodiments.

First Embodiment

Figure 1:
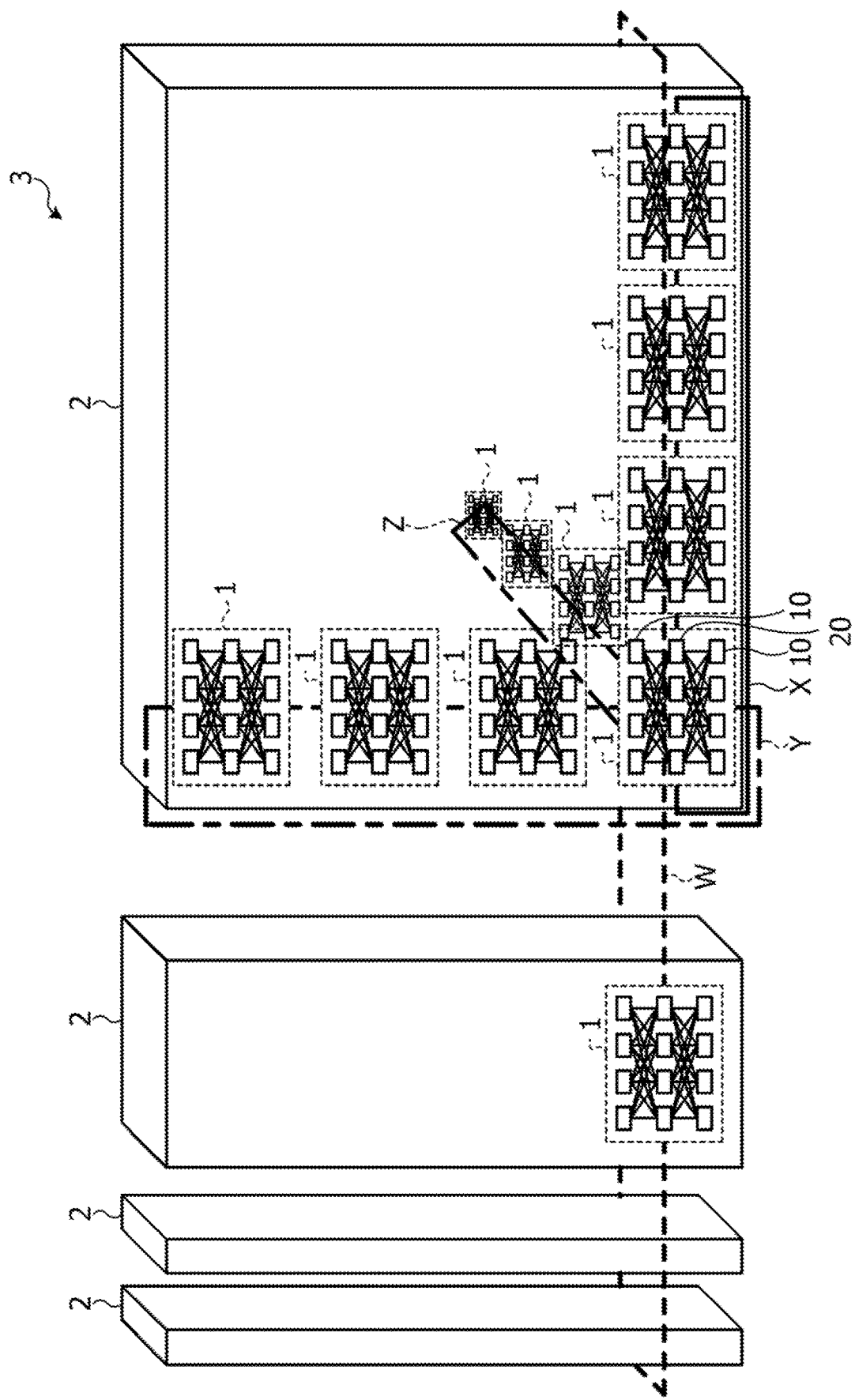
FIG. 1 illustrates a configuration of an information processing system according to a first embodiment.

FIG. 1 illustrates a configuration of an information processing system according to a first embodiment. The information processing system 3 according to the first embodiment includes multiple three-dimensional torus meshes 2. Each of the three-dimensional torus meshes 2 has an annularly coupled one-dimensional torus structure. Thus, the information processing system 3 has a four-dimensional torus structure. Hereinafter, a dimension in which the three-dimensional torus meshes 2 are coupled to each other is referred to as W dimension.

Each of the three-dimensional torus meshes 2 includes multiple system boards 1. Each of the system boards 1 is coupled to adjacent system boards 1 in three dimensions to have a three-dimensional torus structure. Hereinafter, the three dimensions included in the three-dimensional torus meshes 2 are referred to as X dimension, Y dimension, and Z dimension.

Figure 2:
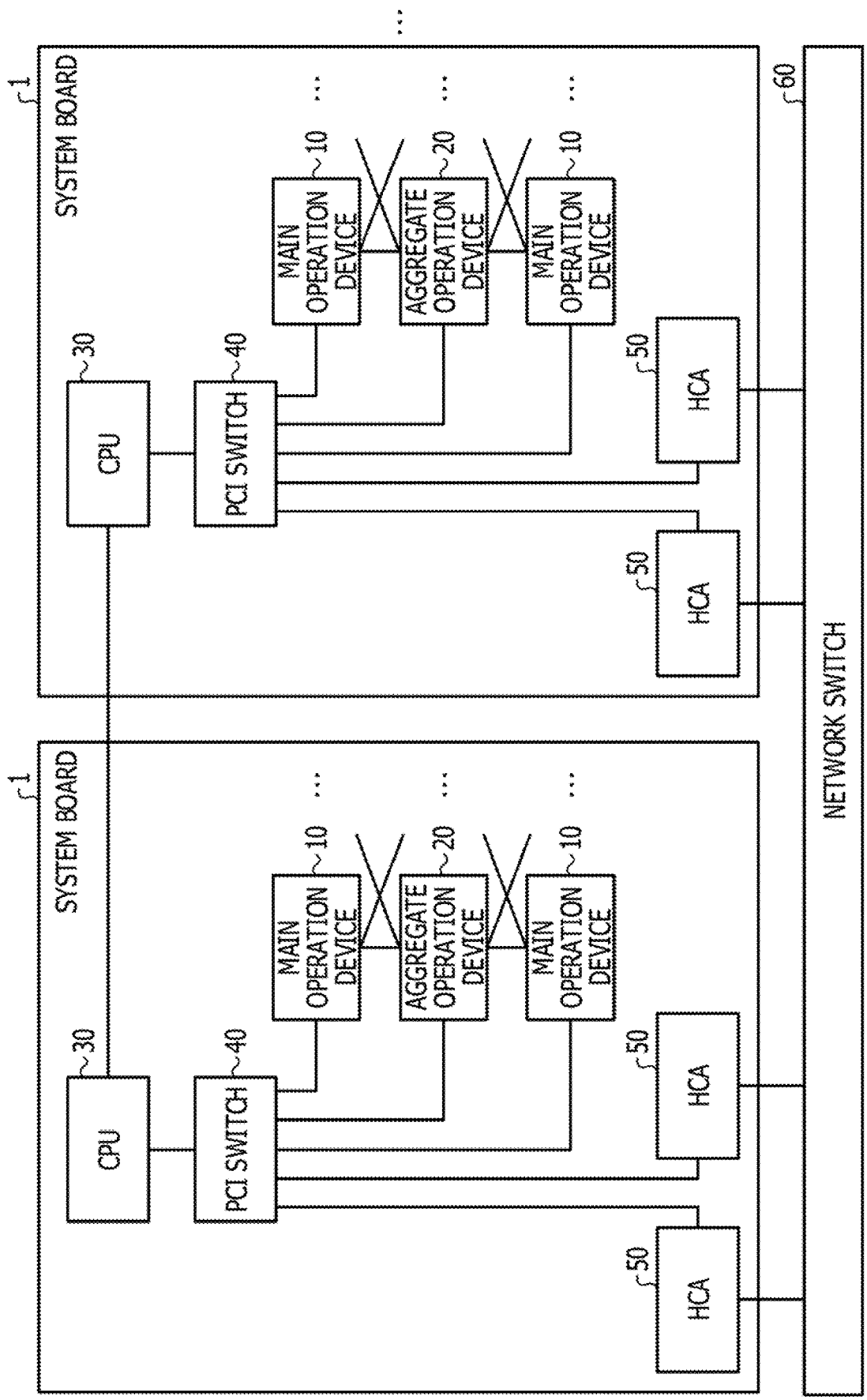
FIG. 2 illustrates a hardware configuration of each of system boards.

FIG. 2 illustrates a hardware configuration of each of the system boards. Each of the system boards 1 has multiple main operation devices 10, multiple aggregate operation devices 20, a central processing unit (CPU) 30, a PCI switch 40, and host channel adaptors (HCAs) 50. Each of the system boards 1 is an example of an "information processing device".

The CPUs 30 on the system boards 1 are directly coupled to each other. On each of the system boards 1, the CPU 30 is coupled to the PCI switch 40. The CPU 30 receives an instruction, input from an operator, for a job and transmits the job to the main operation devices 10 and the aggregate operation devices 20.

The PCI switch 40 is coupled to the main operation devices 10, the aggregate operation device 20, and the CPU 30. The PCI switch 40 is coupled to the HCAs 50. The PCI switch 40 selects a path for communication to be executed by the main operation devices 10, the aggregate operation devices 20, and the CPU 30 using PCI.

Each of the HCAs 50 is a communication interface for communication to be executed by the main operation devices 10, the aggregate operation devices 20, and the CPU 30 using InfiniBand. The HCAs 50 are coupled to the PCI switch 40. The HCAs 50 are coupled to a network switch 60.

The HCAs 50 on the system boards 1 are coupled to the network switch 60. The network switch 60 selects a path for communication to be executed by the main operation devices 10, the aggregate operation devices 20, and the CPUs 30 using InfiniBand.

Each of the main operation devices 10 includes an arithmetic circuit for executing parallel computation. The main operation devices 10 are, for example, graphics processing units (GPUs). The main operation devices 10 execute arithmetic processing other than aggregate operations to be executed in deep learning.

Each of the aggregate operation devices 20 includes an arithmetic circuit for executing an aggregate operation by collective communication. The aggregate operation devices 20 are, for example, GPUs. Each of the aggregate operation devices 20 executes an aggregate operation in deep learning and the like. Hereinafter, the main operation devices 10 and the aggregate operation devices 20 are referred to as "nodes" in some cases.

Figure 3:
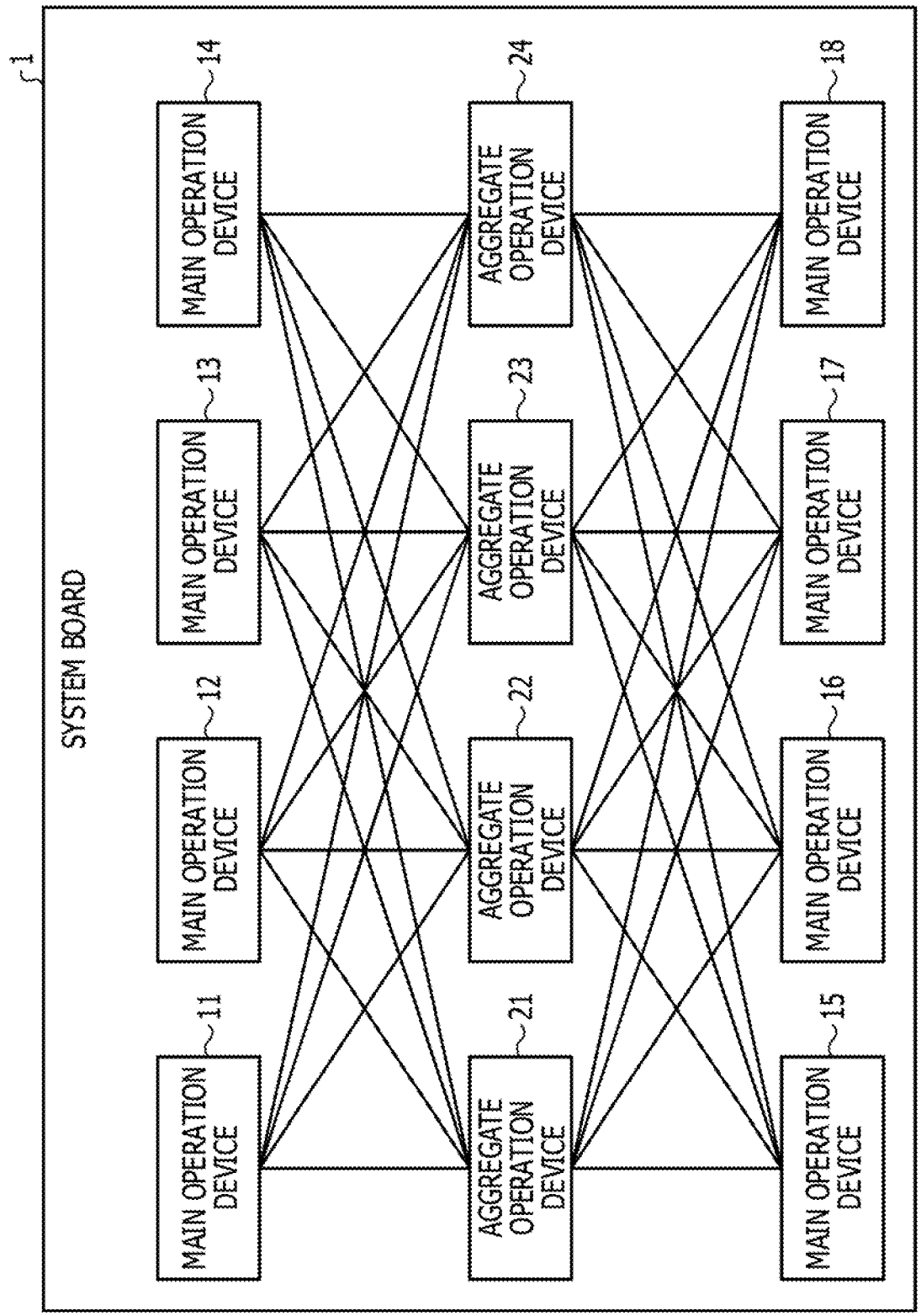
FIG. 3 illustrates a coupling state of main operation devices and aggregate operation devices.

As illustrated in FIG. 3, in the first embodiment, main operation devices 11 to 18 and aggregate operation devices 21 to 24 are mounted on each of the system boards 1. The case where the aggregate operation devices 21 to 24 at the same positions on the system boards 1 are coupled to each other to form one-dimensional tori is described below. For example, an aggregate operation device 21 on a certain system board 1 and an aggregate operation device 21 on another system board 1 are coupled to each other. Hereinafter, aggregate operation devices 20 at the same position on system boards 1 indicate aggregate operation devices 20 at the same position illustrated in FIG. 3.

FIG. 3 illustrates a coupling state of the main operation devices and the aggregate operation devices. In the first embodiment, eight main operation devices 10 are mounted on each of the system boards 1. In FIG. 3, the eight main operation devices 10 are the main operation devices 11 to 18. In the first embodiment, four aggregate operation devices 20 are mounted on each of the system boards 1. In FIG. 3, the four aggregate operation devices 20 are the aggregate operation devices 21 to 24.

On each of the system boards 1, each of the main operation devices 11 to 18 is coupled to all the aggregate operation devices 21 to 24. The main operation devices 11 to 18 mounted on the same system board 1 are not directly coupled to each other. The main operation devices 11 to 18 and the aggregate operation devices 21 to 24 are coupled to each other to form a fat-tree structure.

Each of the main operation devices 11 to 18 has ten coupling ports. Four coupling ports of each of the main operation devices 11 to 18 are used to couple the concerned main operation device to the aggregate operation devices 21 to 24 via interconnects on the system board 1. The remaining six coupling ports of each of the main operation devices 11 to 18 are used for coupling between the system board 1 and other system boards 1. For example, two of the remaining six coupling ports, used for the coupling to the other system boards 1, of each of the main operation devices 11 to 18 are used for coupling in the X direction, other two of the remaining six coupling ports of each of the main operation devices 11 to 18 are used for coupling in the Y direction, and the other two of the remaining six coupling ports of each of the main operation devices 11 to 18 are used for coupling in the Z direction.

In the first embodiment, each of the main operation devices 11 to 18 is coupled to all the aggregate operation devices 21 to 24, but may be coupled to some aggregate operation devices selected from among the aggregate operation devices 21 to 24. The number of main operation devices on each of the system boards 1 and the number of aggregate operation devices on each of the system boards 1 are not limited to the numbers exemplified. The ratio of the number of aggregate operation devices to the number of main operation devices on each of the system boards 1 is not limited to the ratio exemplified.

Figure 4:
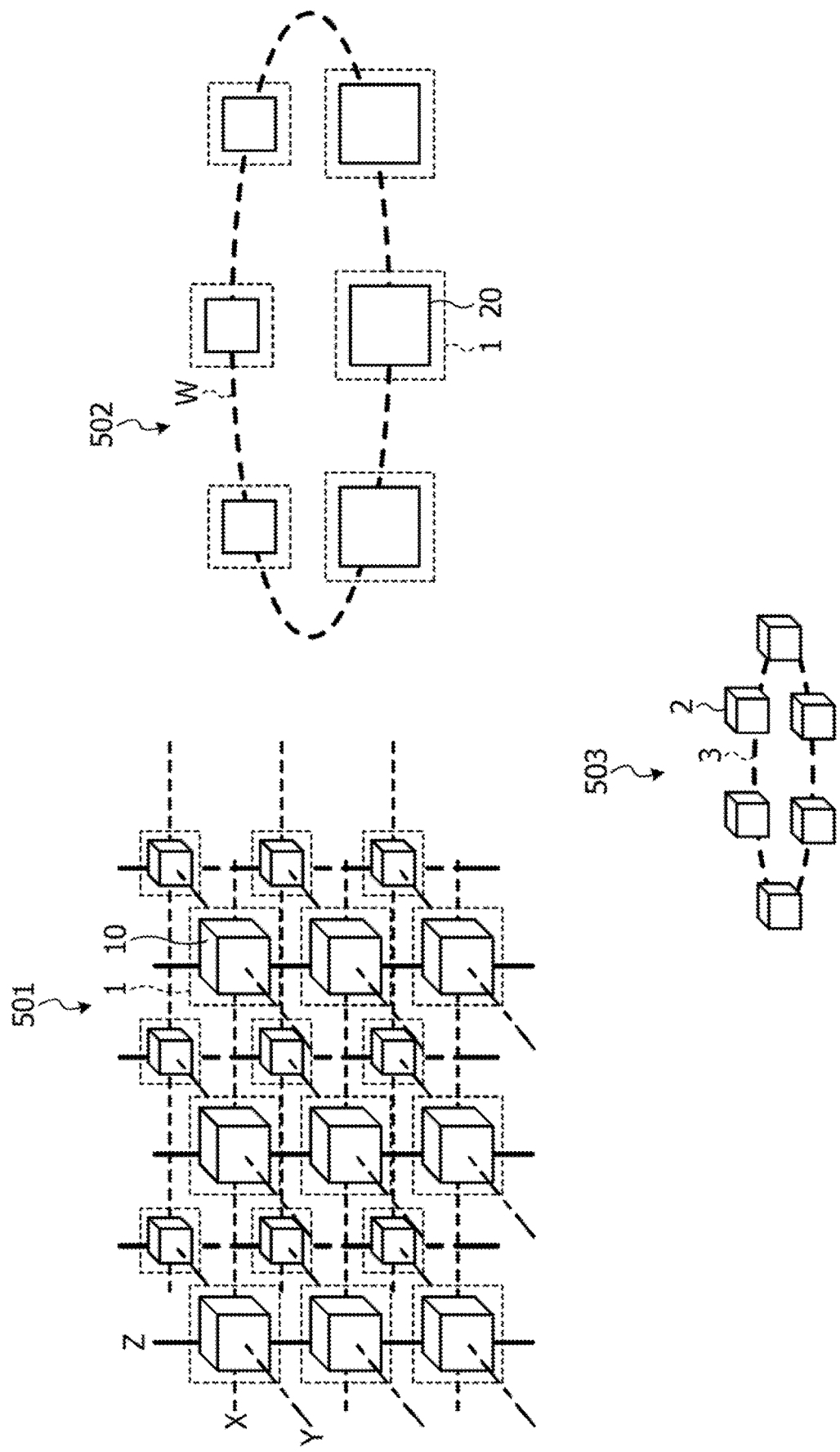
FIG. 4 illustrates coupling states in the information processing system.

A coupling state 501 illustrated in FIG. 4 indicates a coupling state of the system boards 1 according to the first embodiment. FIG. 4 illustrates coupling states in the information processing system. Since the main operation devices 11 to 18 are coupled between the system boards 1, the system boards 1 have an XYZ- or three-dimensional torus structure.

Each of the aggregate operation devices 21 to 24 has ten coupling ports. Eight coupling ports of each of the aggregate operation devices 21 to 24 are used to couple the concerned aggregate operation device to the main operation devices 11 to 18 via interconnects on the system board 1. Remaining two coupling ports of each of the aggregate operation devices 21 to 24 are used for coupling between the system board 1 and other system boards 1. For example, the two coupling ports, used for the coupling to the other system boards 1, of each of the aggregate operation devices 21 to 24 are used for the coupling in the W direction. A coupling state 502 illustrated in FIG. 4 indicates a coupling state of the aggregate operation devices 21 to 24. Since the aggregate operation devices 21 to 24 are coupled between the system boards 1, the aggregate operation devices 21 to 24 have a one-dimensional torus structure in the W dimension.

In the coupling state 501, the three-dimensional torus meshes 2, each of which has a three-dimensional torus structure of system boards 1, are built. In the coupling state 502, each of the three-dimensional torus meshes 2 has an annularly coupled one-dimensional torus structure. The information processing system 3 has the four-dimensional torus structure formed by coupling the three-dimensional torus meshes 2 to each other in a ring, as indicated by the coupling state 503.

Figure 5:
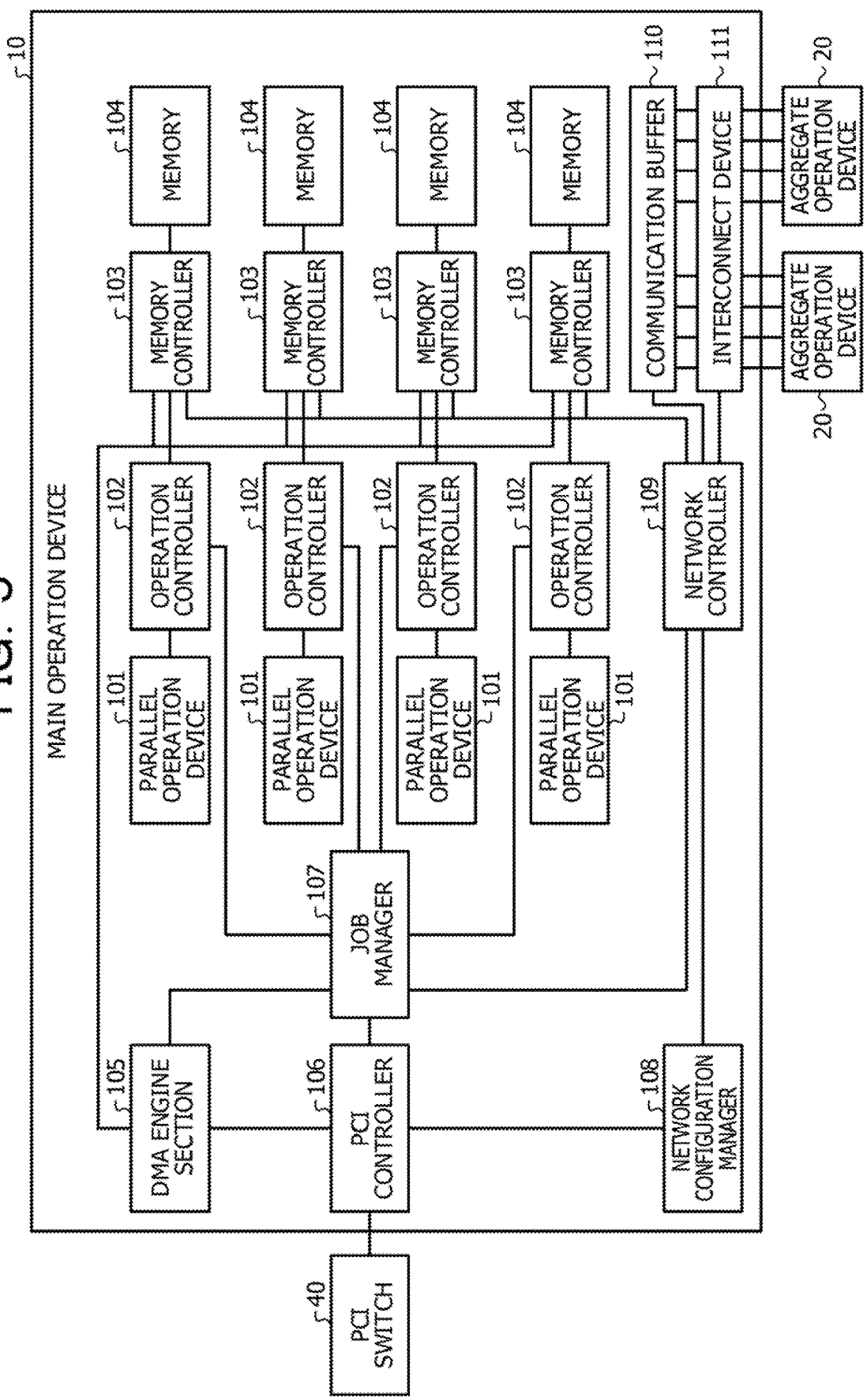
FIG. 5 illustrates a hardware configuration of each of the main operation devices.

Each of the main operation devices 10 is described below in detail with reference to FIG. 5. FIG. 5 illustrates a hardware configuration of each of the main operation devices.

The main operation device 10 includes parallel operation devices 101, operation controllers 102, memory controllers 103, and memories 104. The main operation device 10 also includes a direct memory access (DMA) engine section 105, a PCI controller 106, a job manager 107, a network configuration manager 108, a network controller 109, a communication buffer 110, and an interconnect device 111. FIG. 5 illustrates the four parallel operation devices 101, the four operation controllers 102, the four memory controllers 103, and the four memories 104. The number of parallel operation devices 101, the number of operation controllers 102, the number of memory controllers 103, and the number of memories 104, however, are not limited to four.

The PCI controller 106 controls communication that is executed between the DMA engine section 105, the job manager 107, the network configuration manager 108, and the PCI switch 40 using PCI.

The job manager 107 receives an input operation instruction, transmitted by the CPU 30 via the PCI switch 40 and the PCI controller 106, to execute a job. The job manager 107 treats the received operation instruction as a queue. The job manager 107 outputs the operation instruction to the operation controllers 102. After that, the job manager 107 receives input operation results from the operation controllers 102. Then, the job manager 107 collects the operation results received from the operation controllers 102 to obtain results of the job. After that, the job manager 107 outputs the results of the job to the CPU 30 via the PCI controller 106, the PCI switch 40, and the like.

The operation controllers 102 acquire data from the memories 104 via the memory controllers 103 in accordance with the operation instruction. Then, the operation controllers 102 output the acquired data and the operation instruction to the parallel operation devices 101. After that, the operation controllers 102 acquire operation results from the parallel operation devices 101. Then, the operation controllers 102 output the operation results to the job manager 107.

The parallel operation devices 101 receive the data and the operation instruction from the operation controllers 102. Then, the parallel operation devices 101 use the received data to execute specified operations. After that, the parallel operation devices 101 output results of executing the operations to the operation controllers 102.

The network configuration manager 108 acquires a wiring table for wirings within the system board 1 by a device driver executed by the CPU 30. The wiring table includes coupling states of interconnects between the main operation devices 10 and the aggregate operation devices 20. The network configuration manager 108 outputs the acquired wiring table to the network controller 109.

The network controller 109 is coupled to the communication buffer 110 and the interconnect device 111. The network controller 109 uses the communication buffer 110 and the interconnect device 111 to control communication with other main operation devices 10 via interconnects. For example, the network controller 109 writes, to the communication buffer 110, data to be transmitted. Then, the network controller 109 instructs the interconnect device 111 to transmit the data stored in the communication buffer 110, thereby transmitting the data to the aggregate operation devices 20.

The network controller 109 acquires the wiring table for the system board 1 from the network configuration manager 108. The network controller 109 acquires, from the job manager 107, information of communication, executed for an executed job, between the main operation device 10 and an aggregate operation device 20. Then, the network controller 109 uses the wiring table to determine, based on the acquired information of the communication, a communication destination and data to be transmitted. Then, the network controller 109 outputs, to the memory controllers 103, a request to acquire the data determined to be transmitted. After that, the network controller 109 receives, from the memory controllers 103, the data input based on the request to acquire the data. Then, the network controller 109 transmits the received data to the determined communication destination.

The network controller 109 receives, from the interconnect device 111, a notification indicating the reception of the data. Then, the network controller 109 acquires the received data stored in the communication buffer 110. Then, the network controller 109 outputs the acquired data and a write instruction to the memory controllers 103.

Upon receiving an instruction to transfer data to another system board 1 from an aggregate operation device 20, the network controller 109 causes the data received via the memory controllers 103 to be stored in the memories 104 and instructs the job manager 107 to execute DMA transfer. Thus, the data received from the aggregate operation devices 20 is transmitted by the DMA engine section 105 to main operation devices 10 mounted on the other system board 1.

Figure 6:
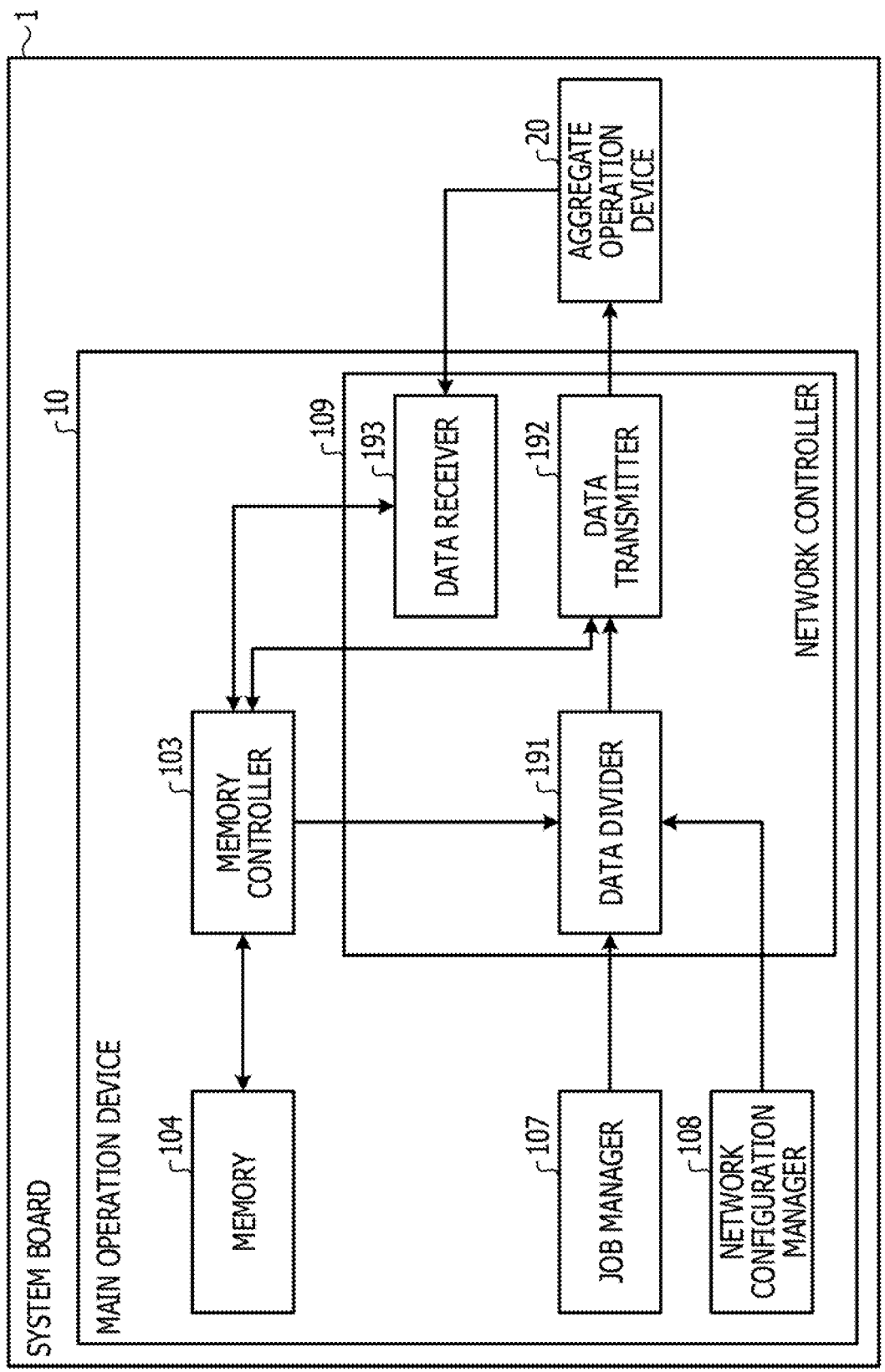
FIG. 6 illustrates a network controller included in each of the main operation devices.

Communication with the aggregate operation devices 20 that is executed by the network controller 109 includes a Reduce process to be executed in the system board 1. Functions of the network controller 109 that operate to execute the Allreduce process are described below in detail with reference to FIG. 6. FIG. 6 illustrates the network controller of each of the main operation devices. FIG. 6 illustrates functions of the network controller 109 that operate to execute the Allreduce process, and does not illustrate other functions of the network controller 109. As illustrated in FIG. 6, the network controller 109 includes a data divider 191, a data transmitter 192, and a data receiver 193.

The data divider 191 acquires an instruction to execute the Allreduce process from the job manager 107. In an intra-system board process included in the Allreduce process, the data divider 191 acquires, from the memory controllers 103, array data to be used in the Allreduce process. Then, the data divider 191 acquires, from the network configuration manager 108, the wiring table for the wirings within the system board 1.

Then, the data divider 191 identifies, from the wiring table for the wirings within the system board 1, aggregate operation devices 20 coupled to the main operation device 10 including the concerned data divider 191. Then, the data divider 191 divides the acquired array data into data items corresponding to the number of aggregate operation devices 20 coupled to the main operation device 10 including the concerned data divider 191 and determines the aggregate operation devices 20 that are transmission destinations to which the data items are to be transmitted. The aggregate operation devices 20 that are the transmission destinations are determined so that the aggregate operation devices 20 are different for the data items. In the first embodiment, since the main operation device 10 is coupled to the four aggregate operation devices 20, the data divider 191 divides the array data into the four data items or generates ¼ array data items from the array data. Then, the data divider 191 outputs, to the data transmitter 192, the divided ¼ array data items and information of the aggregate operation devices 20 that are the transmission destinations. The data divider 191 is an example of a "divider".

The data transmitter 192 receives the ¼ array data items from the data divider 191 in the intra-system board process included in the Allreduce process. The data transmitter 192 receives, from the data divider 191, the input information of the aggregate operation devices 20 that are the transmission destinations to which the ¼ array data items are to be transmitted. Then, the data transmitter 192 transmits the four ¼ array data items to the aggregate operation devices 20 that are the transmission destinations. Hereinafter, the division of array data and the transmission of divided array data items to aggregate operation devices 20 are referred to as intra-system board Reduce process in some cases.

Figure 7:
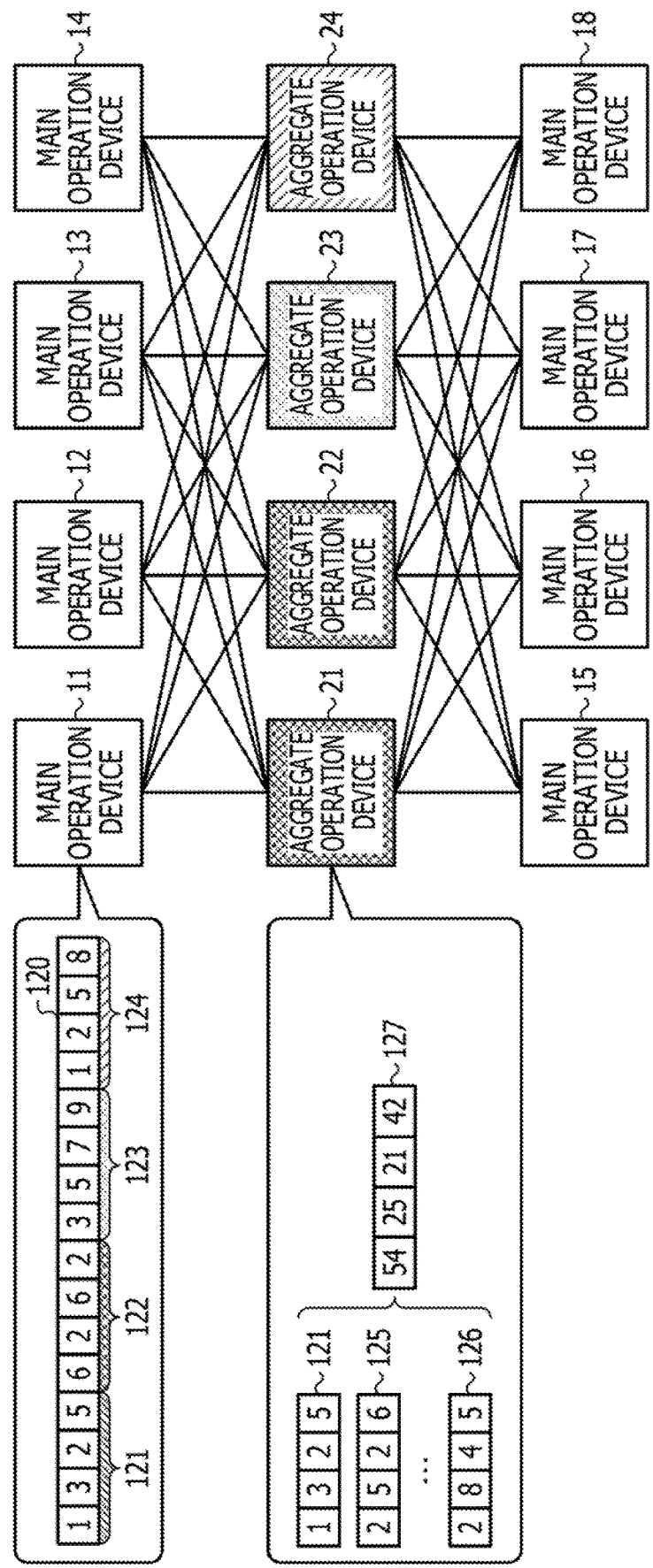
FIG. 7 describes an intra-system board process included in an Allreduce process.

An overview of the intra-system board process included in the Allreduce process is described below with reference to FIG. 7. FIG. 7 describes the intra-system board process included in the Allreduce process. The intra-system board process is described using the main operation devices 11 to 18 and the aggregate operation devices 21 to 24.

For example, the main operation device 11 has array data 120 to be used in the Allreduce process. The data divider 191 divides the array data 120 into ¼ array data items 121 to 124. Then, the data transmitter 192 transmits the ¼ array data item 121 to the aggregate operation device 21. The data transmitter 192 transmits the ¼ array data item 122 to the aggregate operation device 22. The data transmitter 192 transmits the ¼ array data item 123 to the aggregate operation device 23. The data transmitter 192 transmits the ¼ array data item 124 to the aggregate operation device 24. As described above, in the intra-system board process, the data divider 191 divides the original array data 120 into the ¼ array data items 121 to 124 for the number of aggregate operation devices 21 to 24 coupled to the main operation device 11, and the data transmitter 192 distributes the divided ¼ array data items 121 to 124 to the different aggregate operation devices 21 to 24.

Returning to FIG. 6, the description will be continued. In the case where halving and doubling processes are executed in the XYZ directions, the data transmitter 192 acquires, from the memory controllers 103, data received from aggregate operation devices 20 on another system board 1 and stored in the memories 104. Then, the data transmitter 192 transmits the acquired data to the aggregate operation devices 20 that are the destinations.

The data receiver 193 receives aggregate operation results from the aggregate operation devices 20 in the intra-system board process included in the Allreduce process. Then, the data receiver 193 arranges the aggregate operation results as results of executing aggregate operations on the ¼ array data items transmitted to the aggregate operation devices 20 or transmission sources of the aggregate operation results, thereby generating results of executing the aggregate operations on the array data. After that, the data receiver 193 outputs the generated aggregate operation results to the memory controllers 103. Then, the memory controllers 103 cause the aggregate operation results to be stored in the memories 104.

For example, the data receiver 193 receives, from the aggregate operation device 21, a result 127 of executing an aggregate operation on the ¼ array data item 121 illustrated in FIG. 7 in the intra-system board process included in the Allreduce process. The aggregate operation result 127 is obtained by executing the aggregate operation using the ¼ array data items 121 to 124 transmitted by the main operation devices 11 to 18 and ¼ array data items 125 and 126 transmitted by the main operation devices 11 to 18 to the aggregate operation device 21. For example, addition, multiplication, a maximum value, a minimum value, and an average value may be used for the operation.

The main operation device 11 receives, from the aggregate operation device 22, a result of executing an aggregate operation on the ¼ array data item 122. The main operation device 11 receives, from the aggregate operation device 23, a result of executing an aggregate operation on the ¼ array data item 123. The main operation device 11 receives, from the aggregate operation device 24, a result of executing an aggregate operation on the ¼ array data item 124. Thus, the main operation device 11 acquires a result of executing the aggregate operations on the array data 120. Similarly, the main operation devices 12 to 18 receive aggregate operation results from the aggregate operation devices 21 to 24 and acquire results of executing aggregate operations on array data held in the main operation devices 12 to 18. The results are the same as or similar to the result acquired by the main operation device 11.

In the case where the halving and doubling processes are executed in the XYZ directions, the data receiver 193 acquires, from the aggregate operation devices 20 on the system board 1 including the concerned data receiver 193, data to be transmitted to aggregate operation devices 20 on another system board 1. Then, the data receiver 193 outputs the acquired data to the memory controllers 103. Then, the memory controllers 103 cause the data to be stored in the memories 104. The data receiver 193 instructs the memory controllers 103 and the DMA engine section 105 to execute DMA to transfer the data to the destination aggregate operation devices 20.

The communication buffer 110 is a temporal storage region for communication with the aggregate operation devices 20 via interconnects. Data to be transmitted to the aggregate operation devices 20 is stored in the communication buffer 110. Data received from the aggregate operation devices 20 is stored in the communication buffer 110.

The interconnect device 111 is coupled to the aggregate operation devices 20 via the interconnects. The interconnect device 111 communicates with the aggregate operation devices 20 via the interconnects. The interconnect device 111 receives an instruction to transmit data from the network controller 109 and reads the data from the communication buffer 110. Then, the interconnect device 111 transmits the read data to the aggregate operation devices 20 that are communication destinations specified by the network controller 109. The interconnect device 111 receives data from the aggregate operation devices 20 and causes the received data to be stored in the communication buffer 110. The interconnect device 111 notifies the reception of the data to the network controller 109.

The DMA engine section 105 controls access to memories 104 included in main operation devices 10 on another system board 1 coupled to the system board 1 having the concerned DMA engine section 105 via a PCI bus without the CPU 30 and the like. The DMA engine section 105 receives, from the job manager 107, input information of communication executed using PCI based on a job. Then, the DMA engine section 105 instructs the memory controllers 103 to read data in accordance with the information of the communication executed using PCI based on the job.

After that, the DMA engine section 105 receives, from the memory controllers 103, the input data read from the memories 104. Then, the DMA engine section 105 transmits the read data to memories 104 of a destination main operation device 10 via the PCI controller 106 and the PCI switch 40.

The DMA engine section 105 receives, from the PCI controller 106, data transmitted by DMA from the DMA engine section 105 of the main operation device 10 on the other system board 1. Then, the DMA engine section 105 instructs the memory controllers 103 to write the received data.

In the case where the halving and doubling processes are executed in the XYZ directions, the DMA engine section 105 executes the following process. The DMA engine section 105 acquires, from the memories 104, data to be transmitted from the aggregate operation devices 20 on the system board 1 including the concerned DMA engine section 105 to aggregate operation devices 20 on another system board 1. Then, the DMA engine section 105 transmits the data acquired via the PCI controller 106 and the PCI switch 40 to the memories 104 of the main operation devices 10 coupled to the aggregate operation devices 20 on the other system board 1 that is a destination.

The DMA engine section 105 receives, from the PCI controller 106, data transmitted by the aggregate operation devices 20 on the other system board 1 to the aggregate operation devices 20 on the system board 1 having the concerned DMA engine section 105. Then, the DMA engine section 105 instructs the memory controllers 103 to write the received data to the memories 104.

Each of the memory controllers 103 controls reading and writing of data from and to the memory 104 coupled to the concerned memory controller 103. The memory controller 103 reads data from the memory 104 in accordance with a read instruction from the DMA engine section 105 and outputs the read data to the DMA engine section 105. The memory controller 103 writes data to the memory 104 in accordance with a write instruction from the DMA engine section 105.

The memory controller 103 reads data from the memory 104 in accordance with a read instruction from the network controller 109 and outputs the read data to the DMA engine section 105. The memory controller 103 writes data to the memory 104 in accordance with a write instruction from the network controller 109.

Figure 8:
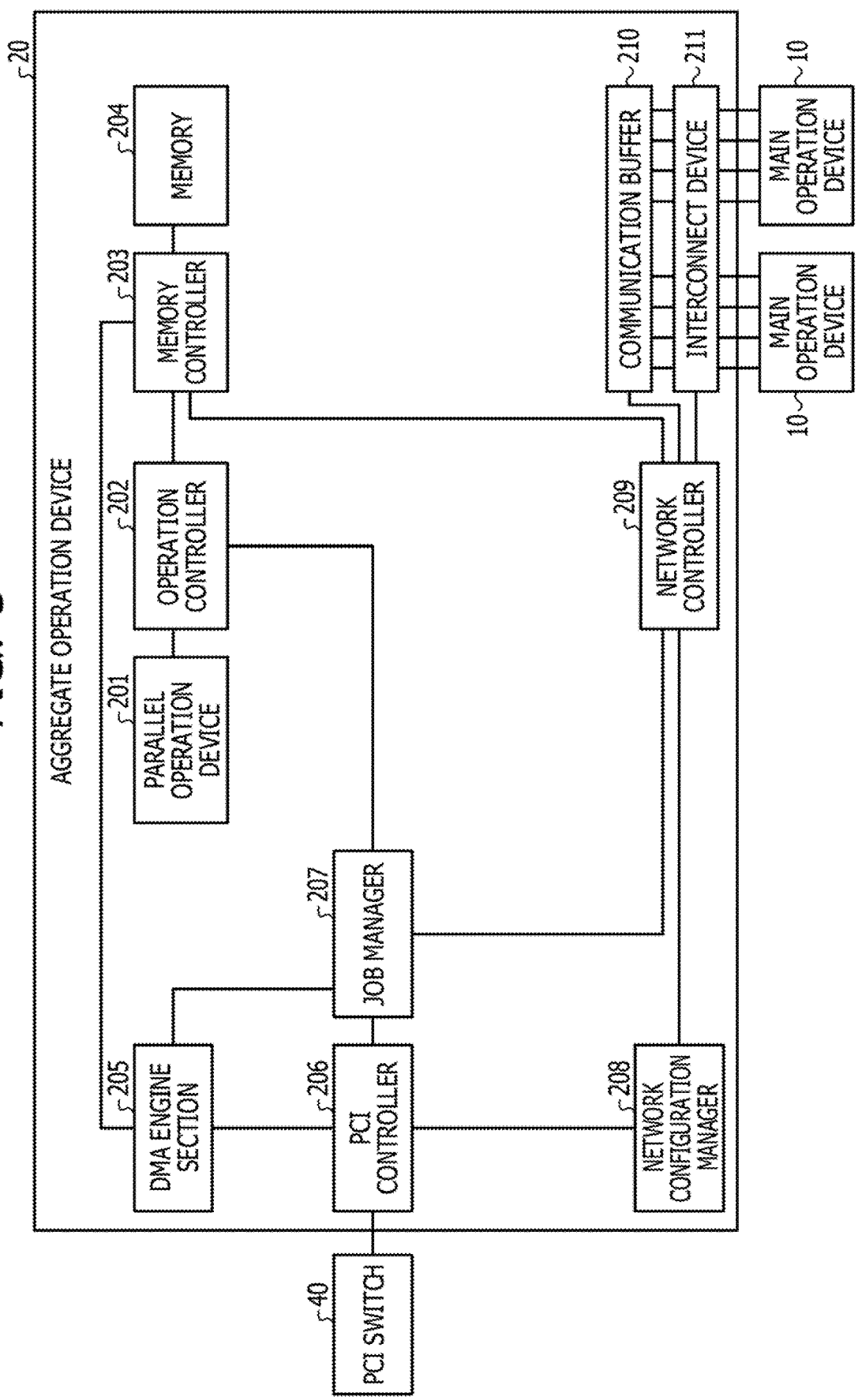
FIG. 8 illustrates a hardware configuration of each of the aggregate operation devices.

Next, each of the aggregate operation devices 20 is described in detail with reference to FIG. 8. FIG. 8 illustrates a hardware configuration of each of the aggregate operation devices. In the first embodiment, each of the aggregate operation devices 20 has a configuration different from those of the main operation devices 10 and is an inexpensive version of the main operation devices 10, but may have the same configuration as those of the main operation devices 10.

The aggregate operation device 20 includes a parallel operation device 201, an operation controller 202, a memory controller 203, and a memory 204. The aggregate operation device 20 further includes a DMA engine section 205, a PCI controller 206, a job manager 207, a network configuration manager 208, a network controller 209, a communication buffer 210, and an interconnect device 211.

The PCI controller 206 operates in substantially the same manner as the PCI controller 106 illustrated in FIG. 6 to control communication using PCI in the Allreduce process. The job manager 207 operates in substantially the same manner as the job manager 107 illustrated in FIG. 6 to manage a job in the Allreduce process. The operation controller 202 operates in substantially the same manner as the operation controller 102 illustrated in FIG. 6 to execute control related to an operation or to control data transfer between the parallel operation device 201 and the memory controller 203 in the Allreduce process. The parallel operation device 201 executes an operation related to the Allreduce process. The parallel operation device 201 is an example of an "operation executor".

The network configuration manager 208 acquires the wiring table for the wirings within the system board 1 and wirings between the system board 1 and other system boards 1 by a device driver executed by the CPU 30. The wiring table includes coupling states of interconnects between the main operation devices 10 and the aggregate operation devices 20 and includes states of coupling between the main operation devices 10 and main operation devices 10 on the other system boards 1 and states of coupling between the aggregate operation devices 20 and aggregate operation devices 20 on the other system boards 1. The network configuration manager 208 outputs the acquired wiring table to the network controller 209.

The network controller 209 acquires the wiring table from the network configuration manager 108. The network controller 109 acquires information of the Allreduce process from the job manager 107. Then, the network controller 209 uses the wiring table to determine, based on the acquired information, a communication destination and data to be transmitted. Then, the network controller 209 outputs, to the memory controller 203, a request to acquire the data determined to be transmitted. After that, the network controller 209 receives, from the memory controller 203, the data input based on the request to acquire the data. Then, the network controller 209 transmits the received data to the determined communication destination.

The network controller 209 receives a notification indicating the reception of the data from the interconnect device 111. Then, the network controller 209 acquires the received data stored in the communication buffer 210. Then, the network controller 209 outputs, to the memory controller 203, the acquired data and an instruction to write the data.

The network controller 209 requests the job manager 207 to use the acquired data to execute an operation in the Allreduce process and causes the parallel operation device 201 to use data stored in the memory 204 to execute the operation in the Allreduce process. Then, the network controller 209 acquires operation results by acquiring data stored in the memory 204.

Figure 9:
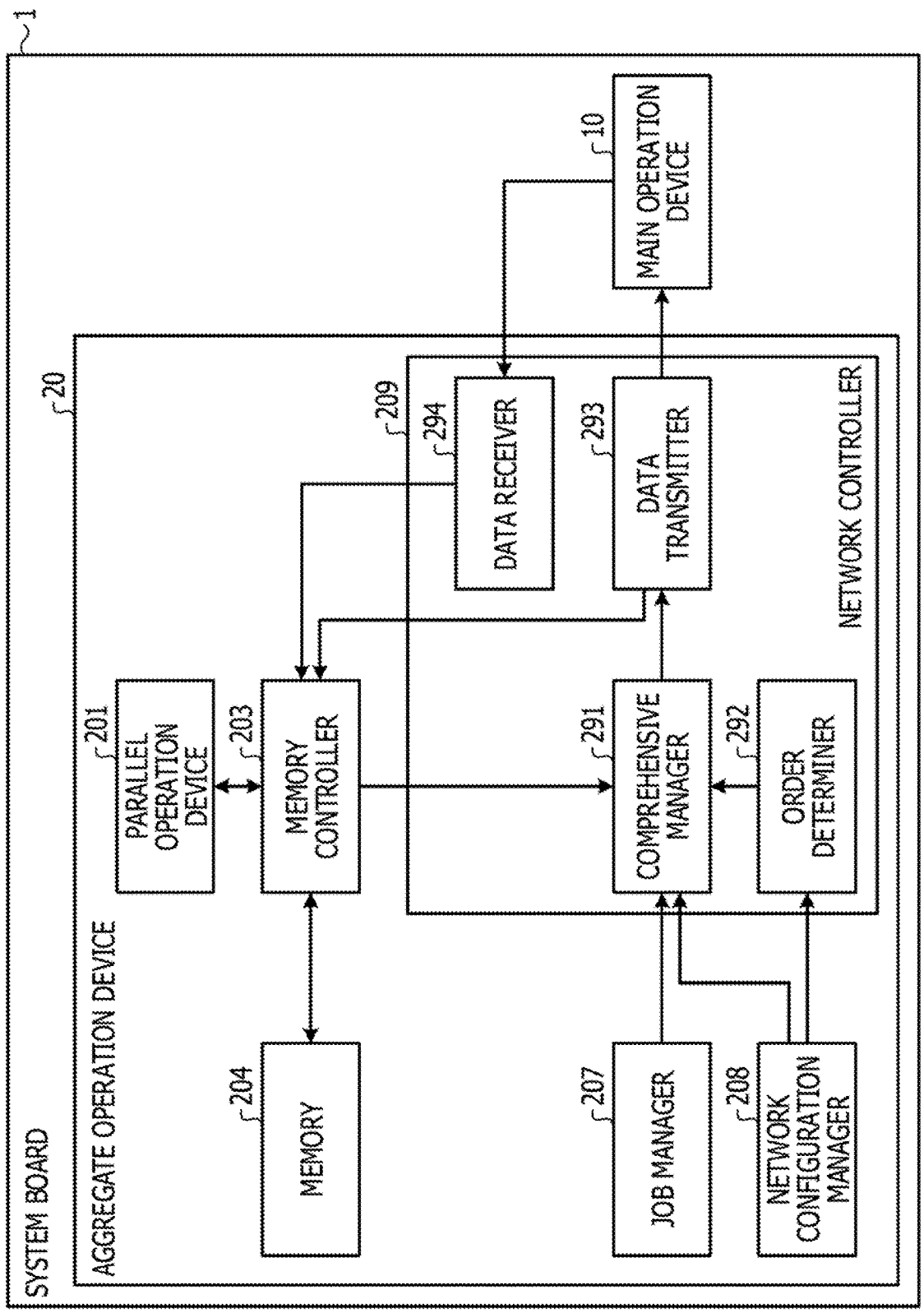
FIG. 9 illustrates a network controller included in each of the aggregate operation devices.

The Allreduce process to be executed by the network controller 209 is described below in detail. FIG. 9 illustrates the network controller included in each of the aggregate operation devices. FIG. 9 illustrates functions of the network controller 209 that are used to execute the Allreduce process, and does not illustrate other functions of the network controller 209. The following describes the case where the network controller 209 directly communicates with the main operation devices 10 and an aggregate operation device 20 on another system board 1. The following describes the case where the parallel operation device 201 directly communicates with the memory controller 203. The parallel operation device 201 executes an operation in the Allreduce process, but the operation by the parallel operation device 201 is not described in the following case.

As illustrated in FIG. 9, the network controller 209 includes a comprehensive manager 291, an order determiner 292, a data transmitter 293, and a data receiver 294.

The order determiner 292 receives the input wiring table from the network configuration manager 208. Then, the order determiner 292 acquires, as the dimensions of the information processing system 3, the W, X, Y, and Z dimensions in which the four-dimensional torus structure is formed. Then, the order determiner 292 sorts the four dimensions, for example, in alphabetical order. Then, the order determiner 292 notifies the comprehensive manager 291 of the order of the dimensions after the sorting as the order of the dimensions in which the halving process is to be executed. In the first embodiment, the order determiner 292 determines that the halving process is to be executed in the dimensions in the order of the W, X, Y, and Z dimensions.

The data transmitter 293 receives, from the comprehensive manager 291, input data to be transmitted. The data transmitter 293 receives, from the comprehensive manager 291, input information of a destination to which the data is to be transmitted. In the case where the halving process or the doubling process is executed in the W dimension, the data transmitter 293 instructs the memory controller 203 to transmit the data to an aggregate operation device 20 that is the destination and exists on another system board 1 coupled to the system board 1 having the concerned aggregate operation device 20. In the case where the halving process or the doubling process is executed in any of the X, Y, and Z dimensions, the data transmitter 293 transmits the data to a main operation device 10 on the system board 1 having the concerned data transmitter 293 in order to transmit the data to a destination main operation device 10 on another system board 1. As described above, in the case where the halving process or the doubling process is executed in any of the X, Y, and Z dimensions, the aggregate operation device 20 communicates with the other system board 1 via the main operation device 10. The data transmitter 293 is an example of a "transmitter".

In the case where the halving process or the doubling process is executed in any of the X, Y, and Z dimensions, the data receiver 294 receives, from the main operation device 10, data transmitted by an aggregate operation device 20 on the other system board 1. Then, the data receiver 294 causes the received data to be stored in the memory 204 via the memory controller 203. The data receiver 294 is an example of a "receiver".

The comprehensive manager 291 receives, from the job manager 207, an input instruction to execute the Allreduce process. The comprehensive manager 291 receives the input wiring table from the network configuration manager 208. The comprehensive manager 291 receives, from the order determiner 292, input information of the order of the dimensions in which the halving process is to be executed. The halving process is a process of repeatedly halving held array data items and distributing the data items to system boards 1 arranged in the dimension.

Next, the comprehensive manager 291 acquires ¼ array data items received from the main operation devices 10 from the memory 204 via the memory controller 203. Since the same process is executed on each of the ¼ array data items received from the main operation devices 10, attention is focused on a single quarter data item, which will be described below.

The comprehensive manager 291 acquires a number in the W dimension from the wiring table. The number in the W direction indicates the number of system boards 1 coupled to each other and arranged on a path extending from the aggregate operation device 20 including the concerned comprehensive manager 291 in the W dimension in which the halving process is executed first. The case where four system boards 1 are coupled to each other and arranged in the W direction or the number in the W direction is four is described below. The comprehensive manager 291 divides the ¼ array data item into four data items corresponding to the number in the W direction. After that, the comprehensive manager 291 executes the halving process between the aggregate operation device 20 including the concerned comprehensive manager 291 and the aggregate operation devices 20 on the system boards 1 coupled to each other and arranged on the path extending from the aggregate operation device 20 including the concerned comprehensive manager 291 in the W dimension.

In the first halving process, the comprehensive manager 291 acquires, from the wiring table, the number in the W direction. The number in the W direction indicates the number of system boards 1 coupled to each other and arranged on the path extending from the aggregate operation device 20 including the concerned comprehensive manager 291 in the W dimension. The case where four system boards 1 are coupled to each other and arranged in the W direction or the number in the W direction is four is described below. The comprehensive manager 291 divides the ¼ array data item into four data items corresponding to the number in the W direction. After that, the comprehensive manager 291 executes the halving process between the aggregate operation device 20 including the concerned comprehensive manager 291 and the aggregate operation devices 20 on the system boards 1 coupled to each other and arranged on the path extending from the aggregate operation device 20 including the concerned comprehensive manager 291 in the W dimension.

Figure 10:
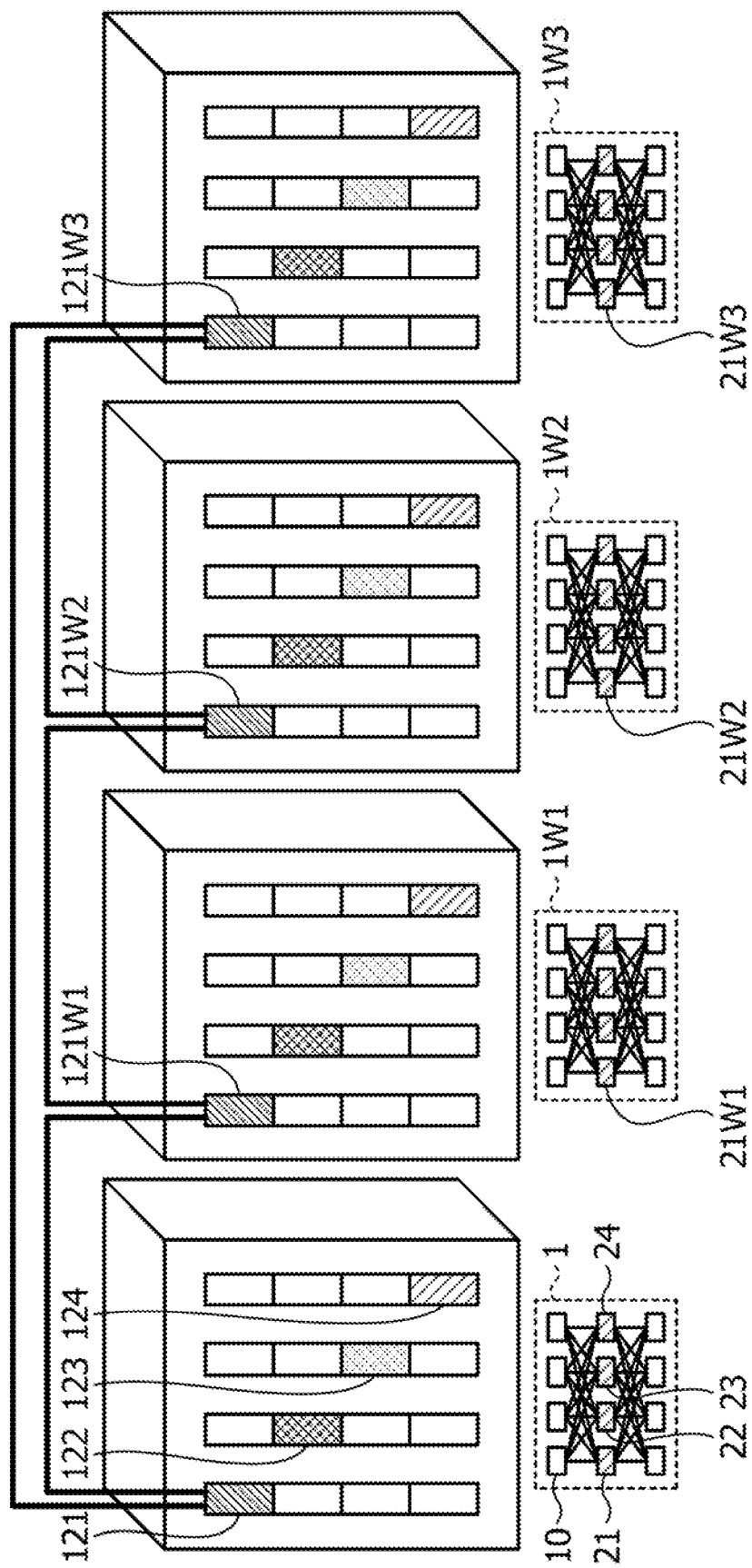
FIG. 10 describes a halving process to be executed in a W dimension.

The halving process to be executed in the W dimension is described below in detail with reference to FIG. 10. FIG. 10 describes the halving process to be executed in the W dimension. System boards 1 and 1W1 to 1W3 are coupled to each other and arranged in the W dimension. The system board 1 includes aggregate operation devices 21 to 24. The aggregate operation devices 21W1 to 21W3 exist at the same positions on the system boards 1W1 to 1W3 as that of the aggregate operation device 21 on the system board 1.

The aggregate operation device 21 holds a ¼ array data item 121 received from a main operation device 10. The aggregate operation device 22 holds a ¼ array data item 122 received from the main operation device 10. The aggregate operation device 23 holds a ¼ array data item 123 received from the main operation device 10. The aggregate operation device 24 holds a ¼ array data item 124 received from the main operation device 10. Four bands including the ¼ array data items 121, 122, 123, and 124 in a box illustrated on the upper side of the system board 1 in FIG. 10 are data held in the aggregate operation devices 21 to 24. The positions of the ¼ array data items 121, 122, 123, and 124 in the bands indicate positions in the array data 120 held in the main operation device 10. This applies to the other system boards 1W1 to 1W3.

The aggregate operation device 21W1 on the system board 1W1 holds a ¼ array data item 121W1. The aggregate operation device 21W2 on the system board 1W2 holds a ¼ array data item 121W2. The aggregate operation device 21W3 on the system board 1W3 holds a ¼ array data item 121W3.

Then, the aggregate operation devices 21 and 21W1 to 21W3 that are coupled to each other to have a one-dimensional torus execute the halving process. Similarly, each of the aggregate operation devices 22 to 24 executes the halving process between the concerned aggregate operation device and aggregate operation devices 20 existing at the same positions on the other system boards 1W1 to 1W3 as that of the concerned aggregate operation device.

Figure 11:
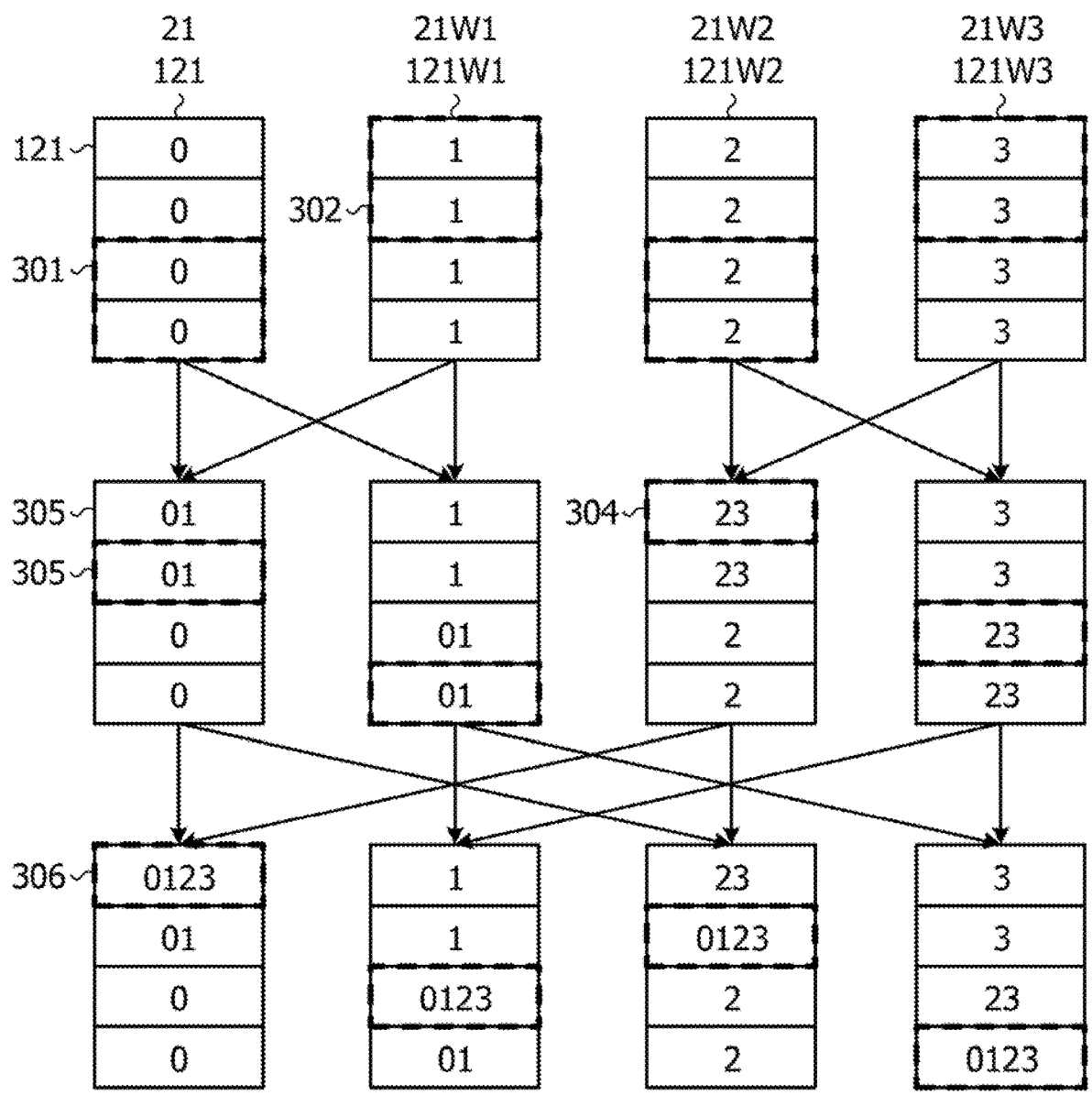
FIG. 11 illustrates the halving process by the aggregate operation devices.

The halving process is described below with reference to FIG. 11. FIG. 11 illustrates the halving process by the aggregate operation devices. The aggregate operation devices 21 and 21W1 to 21W3 hold the ¼ array data items 121 and 121W1 to 121W3, respectively.

The aggregate operation device 21 transmits lower half data 301 of the ¼ array data item 121 to any of the aggregate operation devices 21W1 to 21W3. In FIG. 11, the aggregate operation device 21 transmits the data 301 to the aggregate operation device 21W1. The aggregate operation device 21W1 receives the data 301 from the aggregate operation device 21 and transmits upper half data 302 of the ¼ array data item 121W1 to the aggregate operation device 21. Each of the remaining aggregate operation devices 21W2 and 21W3 transmits and receives lower half data of the ¼ array data item 121W2 and upper half data of the ¼ array data item 121W3 to and from the other of the aggregate operation devices 21W2 and 21W3. Then, the aggregate operation device 21 executes an operation using the data 302 and data included in the ¼ array data item 121 and existing at the same position as the data 302 to obtain operation results. In this case, the operation results are represented by numbers obtained by arranging the original values of the data before the operation. The aggregate operation devices 21W1 to 21W3 execute operations in substantially the same manner as the aggregate operation device 21 to obtain operation results.

Then, the aggregate operation device 21 transmits lower half data 303 of data obtained by the operation to either the aggregate operation device 21W2 or 21W3 that holds an operation result at the same position in the array data item 121W2 or 121W3 as the data 303 in the previous step. In this example, the aggregate operation device 21 transmits the data 303 to the aggregate operation device 21W2. The aggregate operation device 21W2 receives the data 303 from the aggregate operation device 21 and transmits, to the aggregate operation device 21, upper half data 304 of data obtained by the operation. Each of the remaining aggregate operation devices 21W1 and 21W3 transmits and receives upper half data and lower half data of data obtained by the operations to and from the other of the aggregate operation devices 21W1 and 21W3. Then, the aggregate operation device 21 executes an operation using the received data 304 and upper half data 305 of the data obtained by the operation in the previous step. By executing this operation, the aggregate operation device 21 obtains data 306 as a result of executing an aggregate operation on a first data item among four data items into which the ¼ array data item 121 has been divided. Similarly, the aggregate operation devices 21W1, 21W2, and 21W3 obtain results of executing aggregate operations on a third data item among four data items into which the ¼ array data item 121W1 has been divided, a second data item among four data items into which the ¼ array data item 121W2 has been divided, and a fourth data item among four data items into which the ¼ array data item 121W3 has been divided. Thus, the aggregate operation devices 21 and 21W1 to 21W3 hold the aggregate operation results at the different positions in the case where each of the ¼ array data items 121 and 121W1 to 121W3 is divided into four data items.

Figure 12:
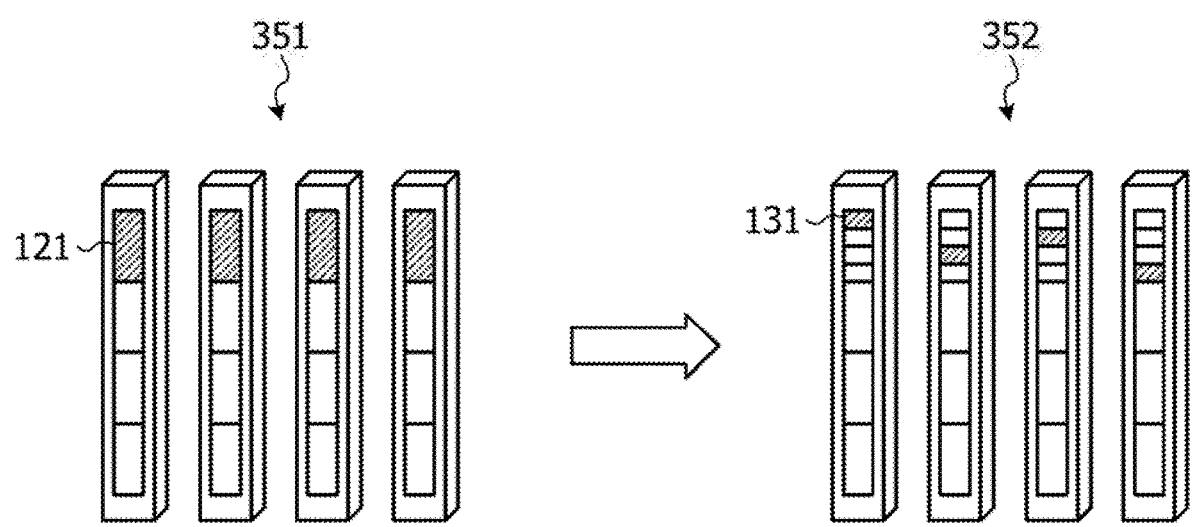
FIG. 12 illustrates lengths of data held in the aggregate operation devices before and after the halving process.

FIG. 12 illustrates lengths of the data items held in each of the aggregate operation devices before and after the halving process. In FIG. 12, a state 351 indicates the lengths of the data items held in the aggregate operation devices 21 and 21W1 to 21W3 before the halving process, and a state 352 indicates the lengths of the data items held in the aggregate operation devices 21 and 21W1 to 21W3 after the halving process. The states 351 and 352 indicate the data items held in the aggregate operation devices 21 and 21W1 to 21W3 from the left side of FIG. 12. The data items illustrated in FIG. 12 indicate the sizes of the data items relative to the original array data.

For example, an aggregate operation device 21A holds the ¼ array data item 121 before the halving process in the W dimension, as indicated by the state 351. When the halving process is executed in the W dimension, the aggregate operation device 21A holds a ¹⁄₁₆ array data item 131 having ¼ the size of the ¼ array data item 121, as indicated by the state 352. Other aggregate operation devices 21B to 21D hold data items having ¹⁄₁₆ the size of the original array data held in the main operation device 10.

Returning to FIG. 9, the description will be continued. In the order described above, the comprehensive manager 291 acquires, from the memory 204 via the memory controller 203, ¼ array data items acquired from the main operation devices 10 or operation results for each step of the halving process in the W dimension. Then, the comprehensive manager 291 generates transmission data by halving the data items acquired for each step of the halving process in the W dimension and outputs the generated transmission data to the data transmitter 293. The comprehensive manager 291 notifies destinations to the data transmitter 293 in the aforementioned order for each step of the halving process in the W dimension. Thus, the comprehensive manager 291 causes the data transmitter 293 to transmit the data in the halving process in the W dimension.

Figure 13:
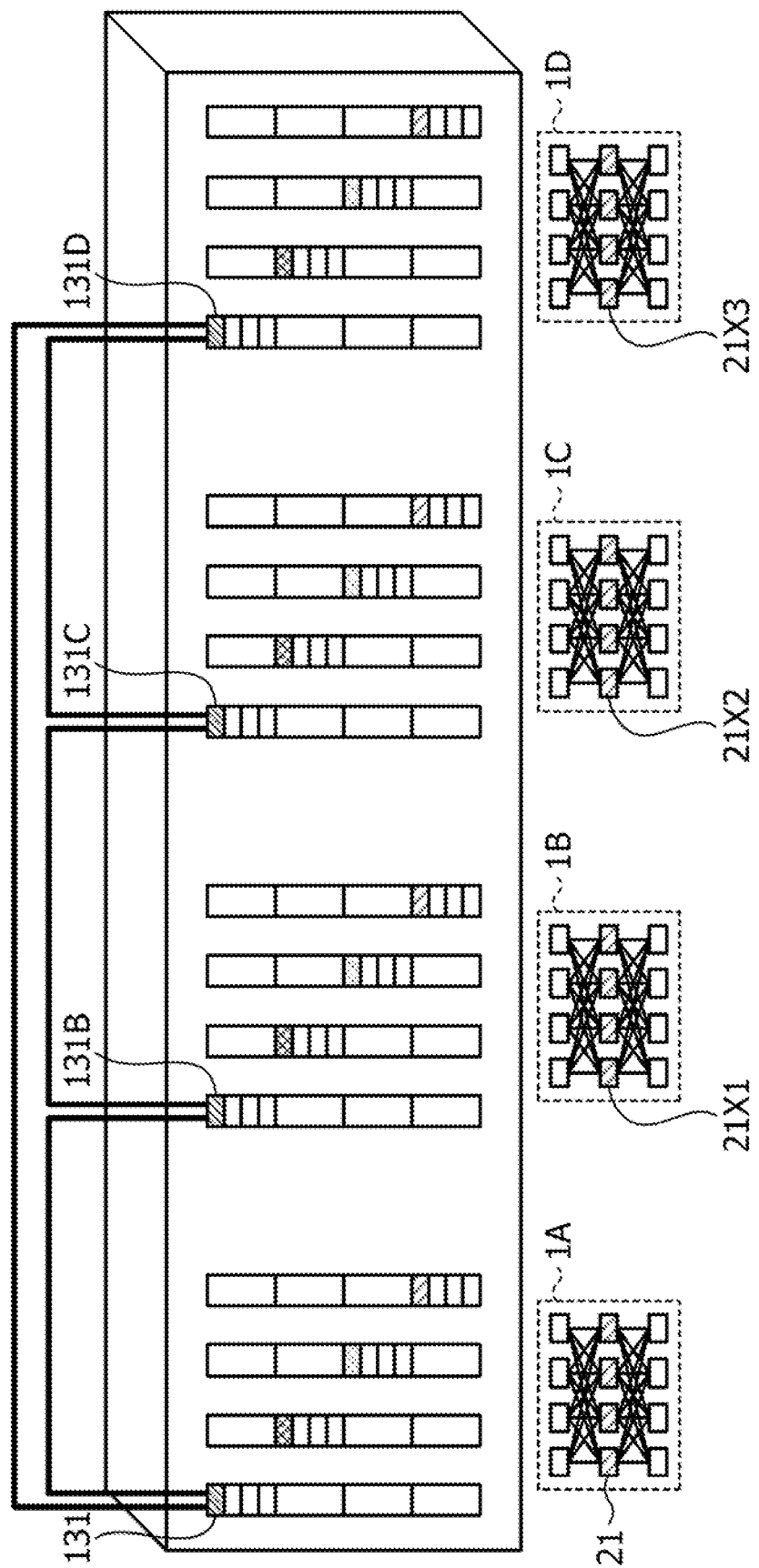
FIG. 13 describes the halving process to be executed in an X dimension.

Next, the aggregate operation device 21 executes the halving process in the X dimension. The halving process to be executed in the X dimension is described in detail with reference to FIG. 13. FIG. 13 describes the halving process to be executed in the X dimension. System boards 1 and 1X1 to 1X3 are coupled to each other and arranged in the X dimension. The system boards 1 and 1X1 to 1X3 have aggregate operation devices 21 and 21X1 to 21X3, respectively. The aggregate operation devices 21X1 to 21X3 exist at the same positions on the system boards 1X1 to 1X3 as that of the aggregate operation device 21 on the system board 1. The aggregate operation devices 21 and 21X1 to 21X3 execute the halving process in the X dimension.

The aggregate operation device 21 holds the ¹⁄₁₆ array data item 131 calculated in the halving process in the W dimension. The aggregate operation device 21X1 on the system board 1X1 holds a ¹⁄₁₆ array data item 131X1. The aggregate operation device 21X2 on the system board 1X2 holds a ¹⁄₁₆ array data item 131X2. The aggregate operation device 21X3 on the system board 1X3 holds a ¹⁄₁₆ array data item 131X3.

The aggregate operation devices 21 and 21X1 to 21X3 coupled to each other to form a one-dimensional torus execute the halving process. Similarly, each of the aggregate operation devices 22 to 24 executes the halving process between the concerned aggregate operation device and aggregate operation devices 20 existing at the same positions on the other system boards 1X1 to 1X3 as that of the concerned aggregate operation device.

Figure 14:
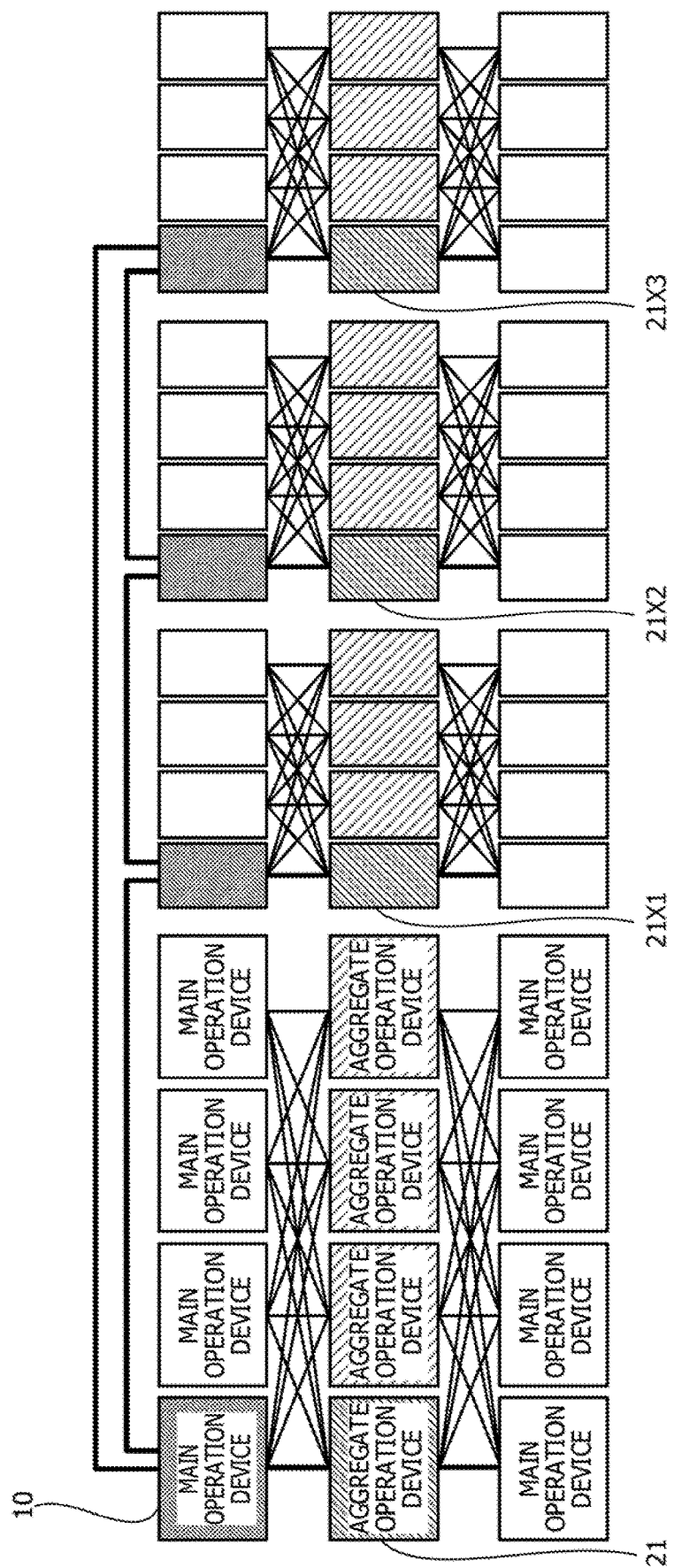
FIG. 14 describes communication between the aggregate operation devices in the X dimension.

The aggregate operation device 21 is not directly coupled to the aggregate operation devices 21X1 to 21X3. Thus, the aggregate operation device 21 communicates with the aggregate operation devices 21X1 to 21X3 by hopping over main operation devices 10, as illustrated in FIG. 14. FIG. 14 describes the communication between the aggregate operation devices in the X dimension.

In the halving process in the X dimension, the aggregate operation devices 21 and 21X1 to 21X3 execute the same process as the process illustrated in FIG. 11. Thus, the aggregate operation device 21 obtains operation results having 1/64 the size of the original array data 120 held in the main operation devices 10. In this stage, array data items held in the aggregate operation devices 20 and having 1/64 the size of the original array data are values obtained by aggregating array data held in all 128 main operation devices 10 on all system boards 1 arranged in the W and X dimensions.

Returning to FIG. 9, the description will be continued. In the order described above, the comprehensive manager 291 acquires, from the memory 204 via the memory controller 203, operation results for each step of the halving process in the X dimension. Then, the comprehensive manager 291 sequentially halves the operation results to generate transmission data and outputs the generated transmission data to the data transmitter 293. The comprehensive manager 291 notifies destinations to the data transmitter 293 in the aforementioned order for each step of the halving process in the X dimension. Thus, the comprehensive manager 291 causes the data transmitter 293 to transmit the data in the halving process in the X dimension.

After that, the comprehensive manager 291 executes the halving process in the Y and Z dimensions in substantially the same manner as described above. Thus, all the aggregate operation devices 20 hold array data items having 1/1024 the length of the original array data held in the main operation devices 10.

After that, the comprehensive manager 291 executes the doubling process in the opposite order to the order in which the halving process is executed in the dimensions. In this case, the comprehensive manager 291 executes the doubling process by copying the data items in the opposite order to the order in which the halving process is executed in the dimensions. For example, in the first embodiment, the comprehensive manager 291 executes the doubling process in the dimensions in the order of the Z, Y, X, and W dimensions. Thus, the comprehensive manager 291 obtains aggregate operation results using the 1/4 array data items received from the main operation devices 10. The doubling process is a process of transmitting and receiving operation results between the system boards 1 arranged in the dimensions.

For example, in the case where the doubling process is executed in the X dimension, data items are copied between the aggregate operation devices 21 and 21X1 to 21X3 illustrated in FIG. 13. In the case where the doubling process is executed in the W dimension, data items are copied between the aggregate operation devices 21 and 21W1 to 21W3 illustrated in FIG. 10. In the doubling process, when the copy is executed, the size of each operation result held is doubled.

Figure 15:
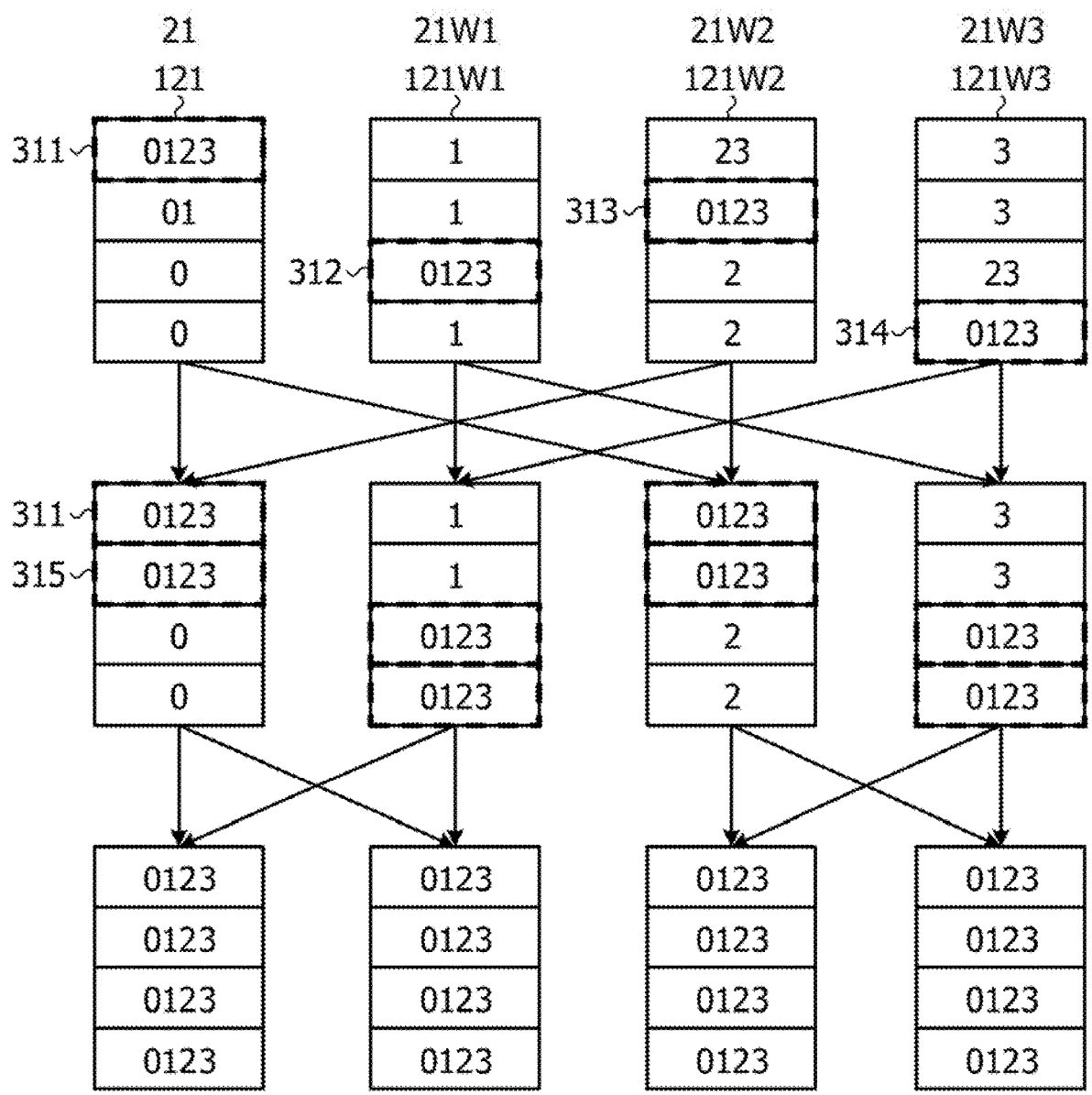
FIG. 15 describes a doubling process by the aggregate operation devices.

The doubling process to be executed in the W dimension is described below with reference to FIG. 15. FIG. 15 illustrates the doubling process by the aggregate operation devices. When the doubling process executed in the X dimension is completed, the aggregate operation devices 21 and 21W1 to 21W3 hold operation results having 1/16 the size of the original array data held in the main operation devices 10. The aggregate operation devices 21 to 21W1 to 21W3 hold operation results at different positions in the array data items. In this case, the aggregate operation devices 21 to 21W1 to 21W3 hold data items 311 to 314, respectively.

The aggregate operation device 21 copies the data item 311 to the aggregate operation device 21W2 that is the last communication destination in the halving process in the W dimension. The copy is executed to copy the data item to the same position in the array data item as the data item. The aggregate operation device 21W2 copies the data item 313 to the aggregate operation device 21. Similarly, the remaining aggregate operation devices 21W1 and 21W3 copy the data items 312 and 314 to each other. Thus, the aggregate operation devices 21 and 21W1 to 21W3 hold operation results having 1/8 the size of the original array data held in the main operation devices 10.

Then, the aggregate operation device 21 transmits the data item 311 held before the previous step and the data item 315 copied from the aggregate operation device 21W2 in the previous step to the aggregate operation device 21W1 that is a first communication destination in the halving process. Similarly, each of the aggregate operation devices 21W1 to 21W3 copies an operation result having 1/8 the size of the original array data held in the main operation devices 10 to a first communication destination. Thus, the aggregate operation devices 21 and 21W1 to 21W3 hold operation results having 1/4 the size of the original array data held in the main operation devices 10. For example, the aggregate operation device 21 may obtain the aggregate operation result 127 using the 1/4 array data item 121 received from the main operation device 10 illustrated in FIG. 7.

Returning to FIG. 9, the description will be continued. In the order described above, the comprehensive manager 291 acquires operation results from the memory 204 via the memory controller 203 for each step of the halving process in the Z, Y, X, and W dimensions. Then, the comprehensive manager 291 synthesizes the copied operation results to sequentially double the held operation results and accordingly generate transmission data and outputs the generated transmission data to the data transmitter 293. The comprehensive manager 291 notifies a destination to the data transmitter 293 for each step of the doubling process in each of the dimensions in the aforementioned order. Thus, the comprehensive manager 291 causes the data transmitter 293 to transmit the transmission data obtained in the doubling process in each of the aforementioned dimensions.

After that, the comprehensive manager 291 executes the intra-system board process by transmitting aggregate operation results obtained using 1/4 array data items acquired from the main operation devices 10 to the main operation devices 10 or the sources of the 1/4 array data items and completes the Allreduce process. Hereinafter, the transmission of aggregate operation results obtained using 1/4 array data items from the aggregate operation devices 20 to the main operation devices 10 is referred to as "intra-system board broadcast" in some cases. The comprehensive manager 291 is an example of a "processing controller".

Figure 16A:
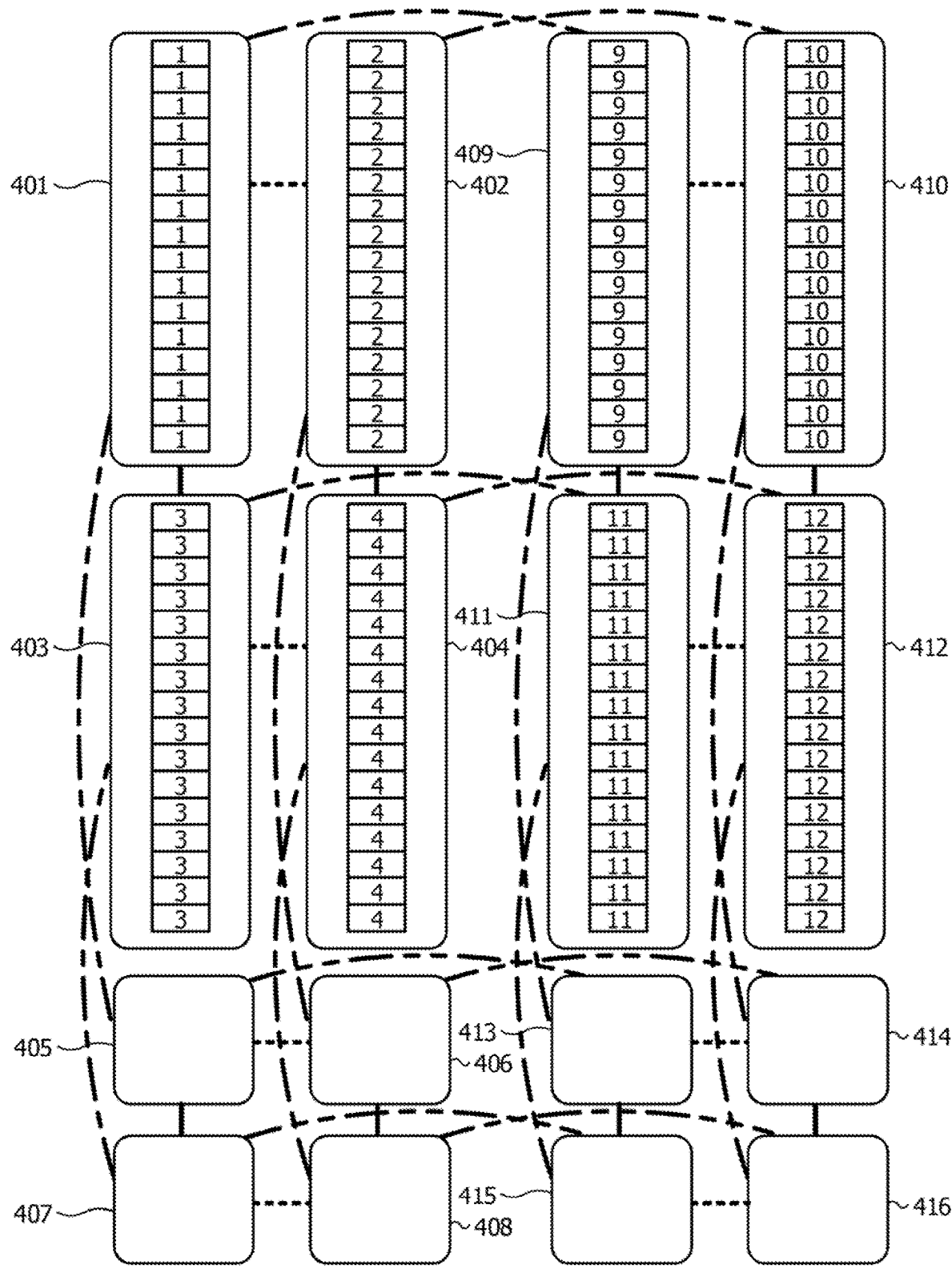
FIGS. 16A and 16B illustrate an initial state.
Figure 16B:
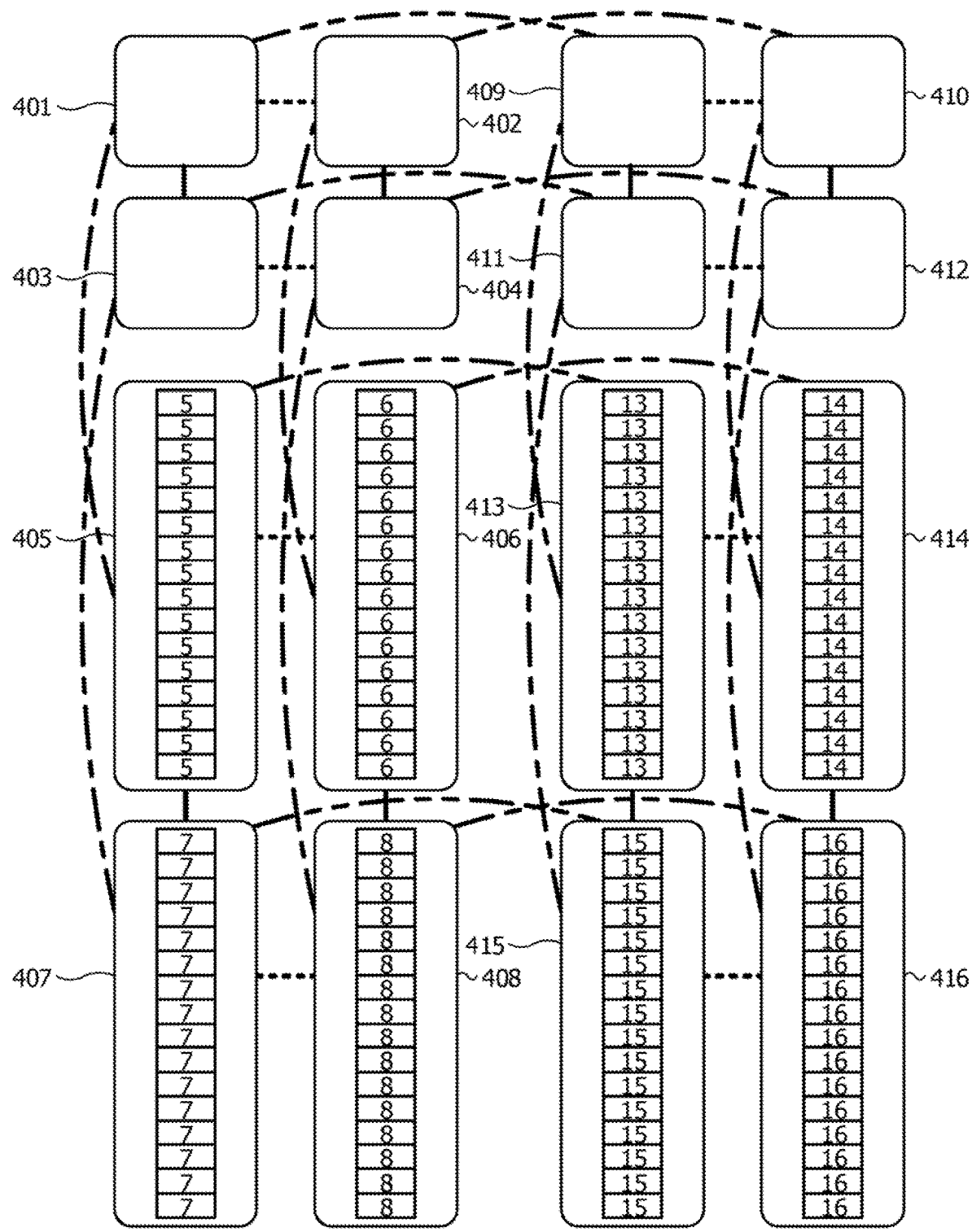
Figure 17A:
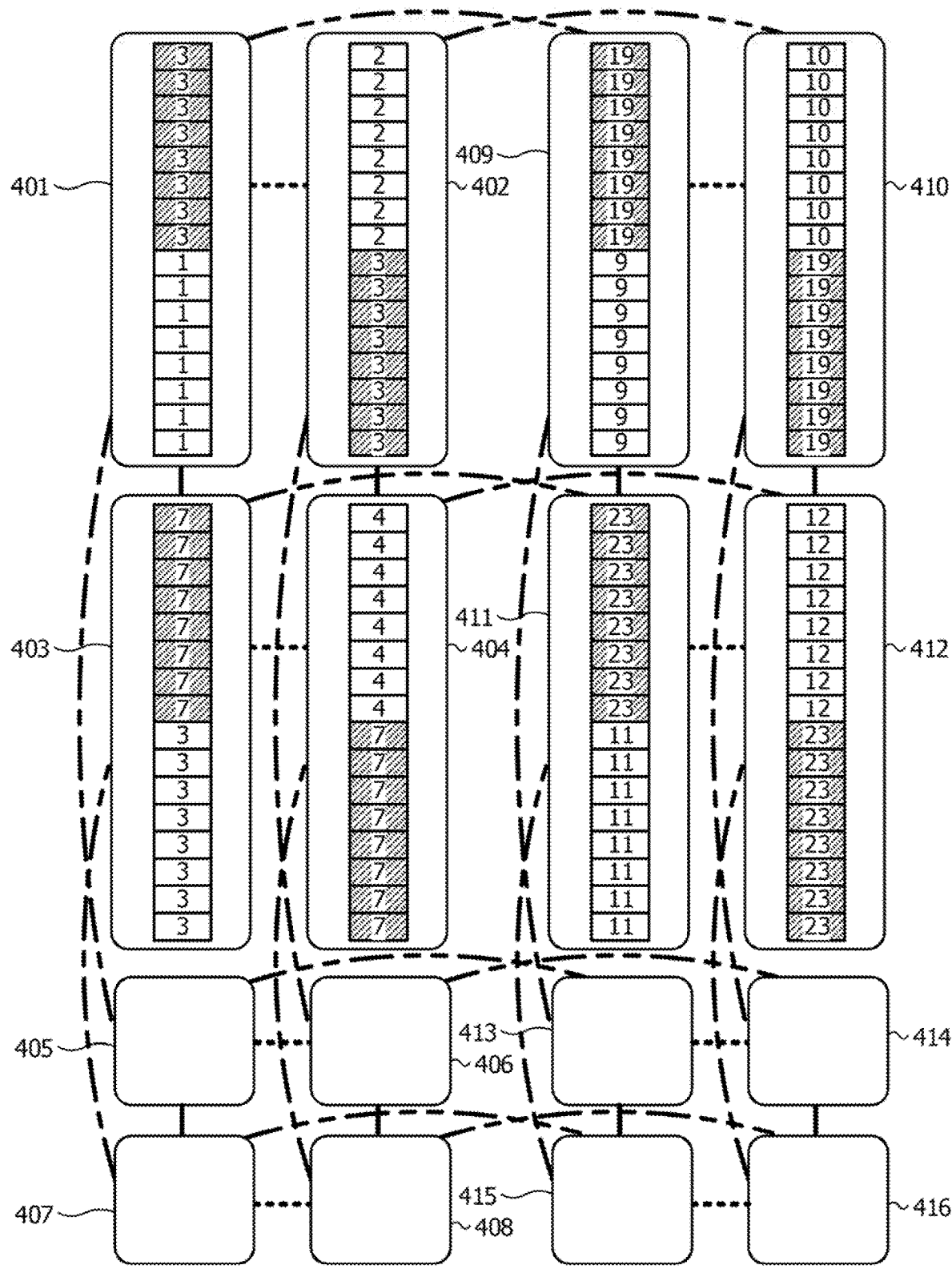
FIGS. 17A and 17B illustrate the halving process to be executed in the W dimension.
Figure 17B:
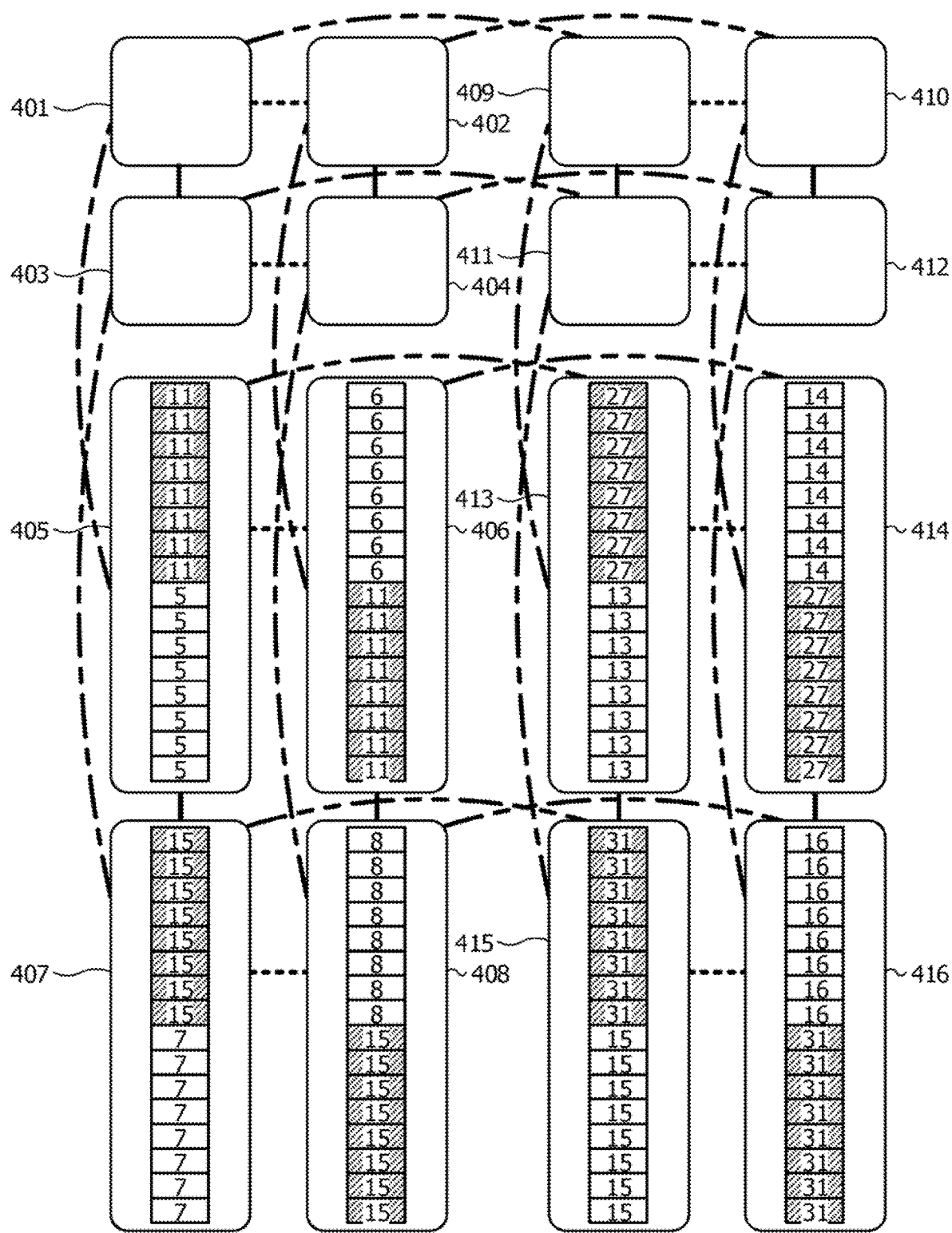
Figure 18A:
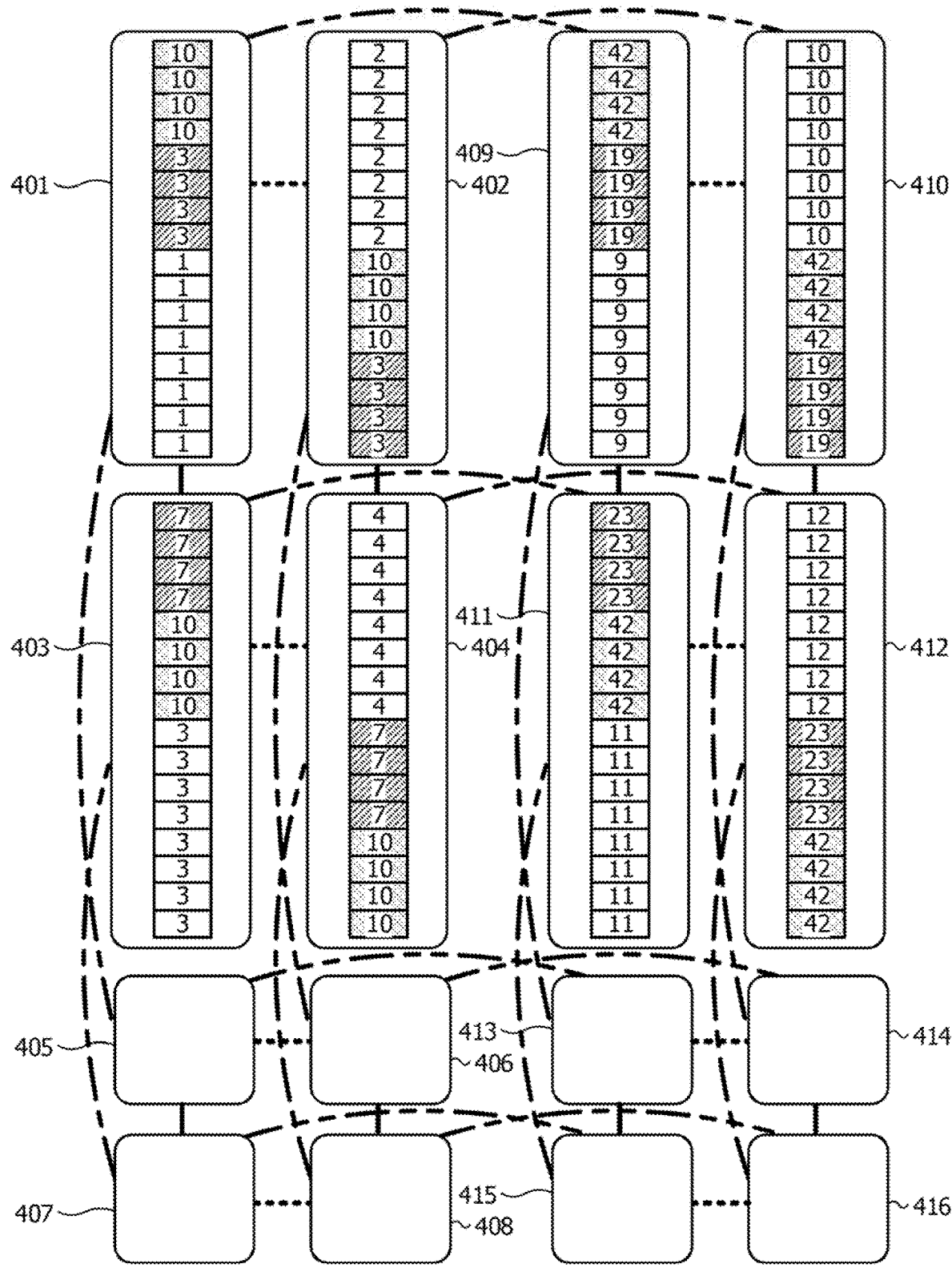
FIGS. 18A and 18B illustrate the halving process to be executed in the X dimension.
Figure 18B:
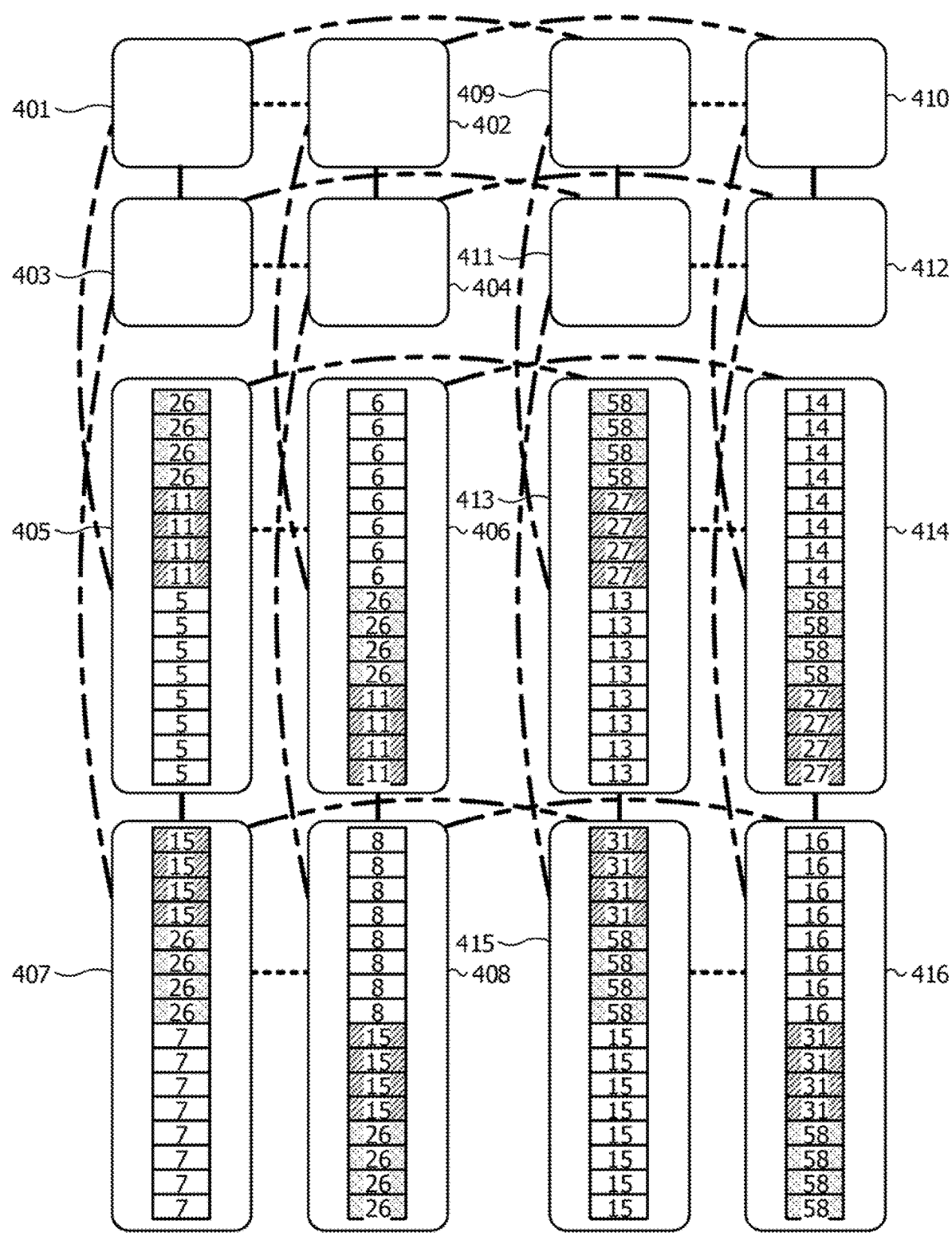
Figure 19A:
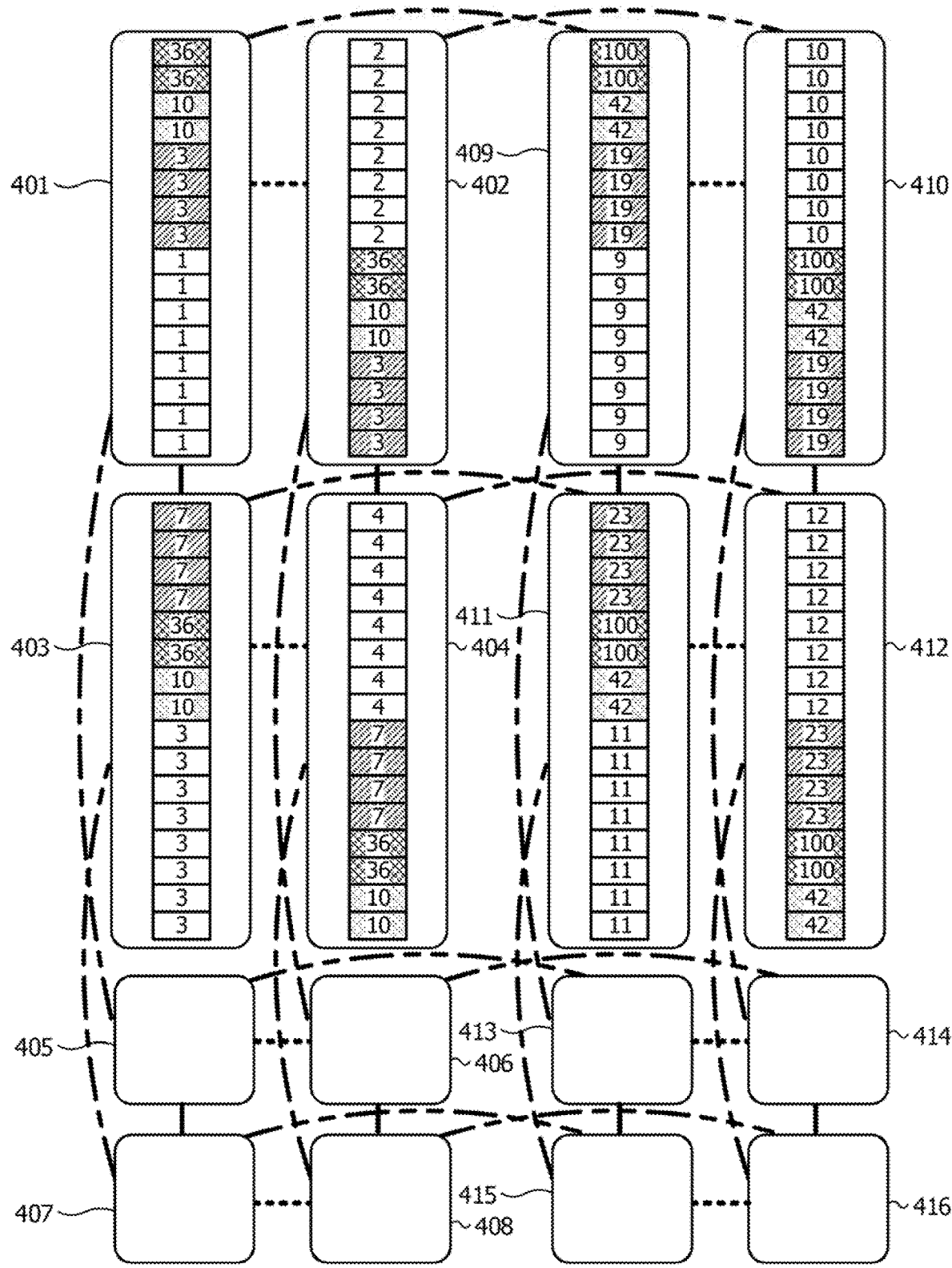
FIGS. 19A and 19B illustrate the halving process to be executed in a Y dimension.
Figure 19B:
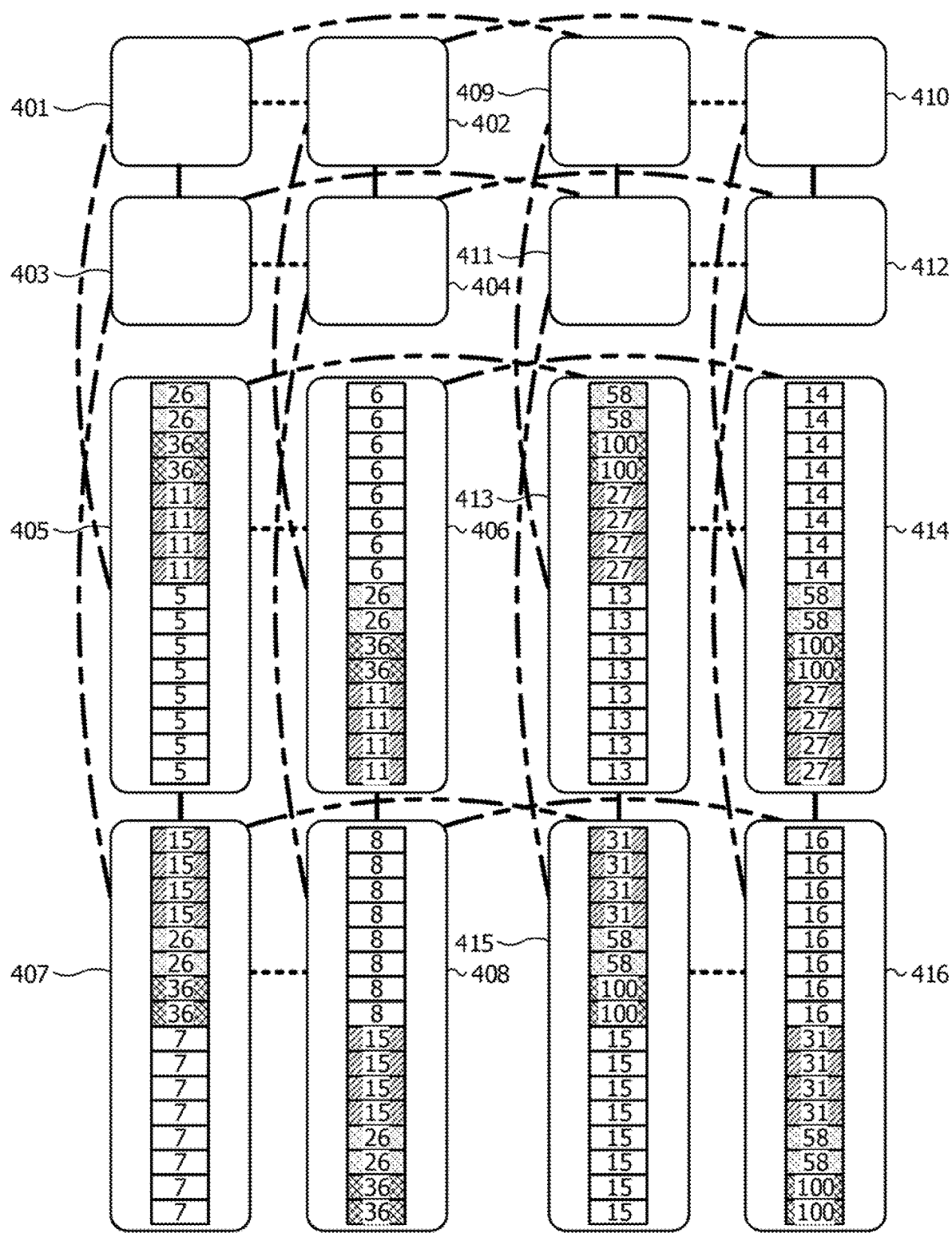
Figure 20A:
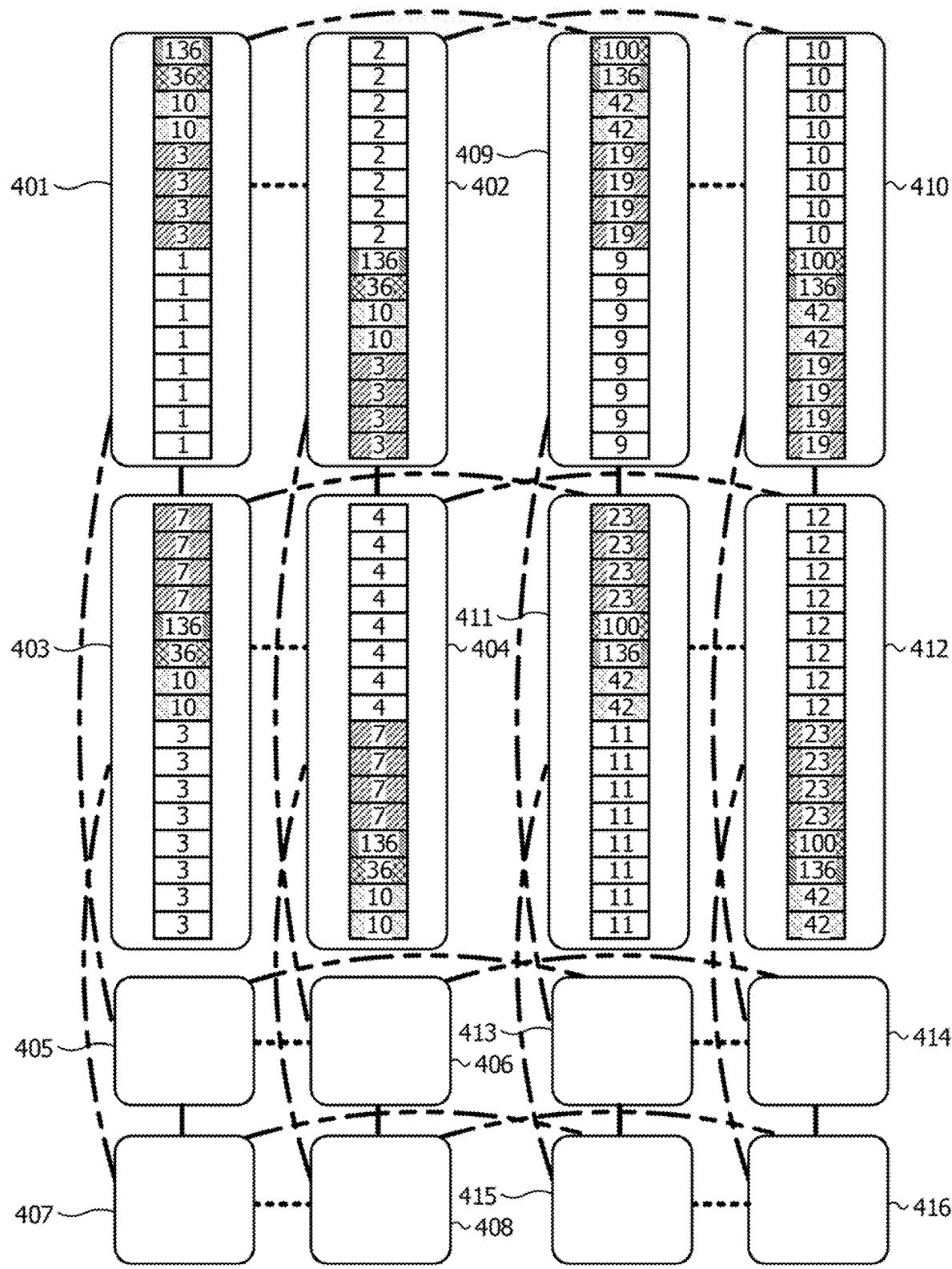
FIGS. 20A and 20B illustrate the halving process to be executed in a Z dimension.
Figure 20B:
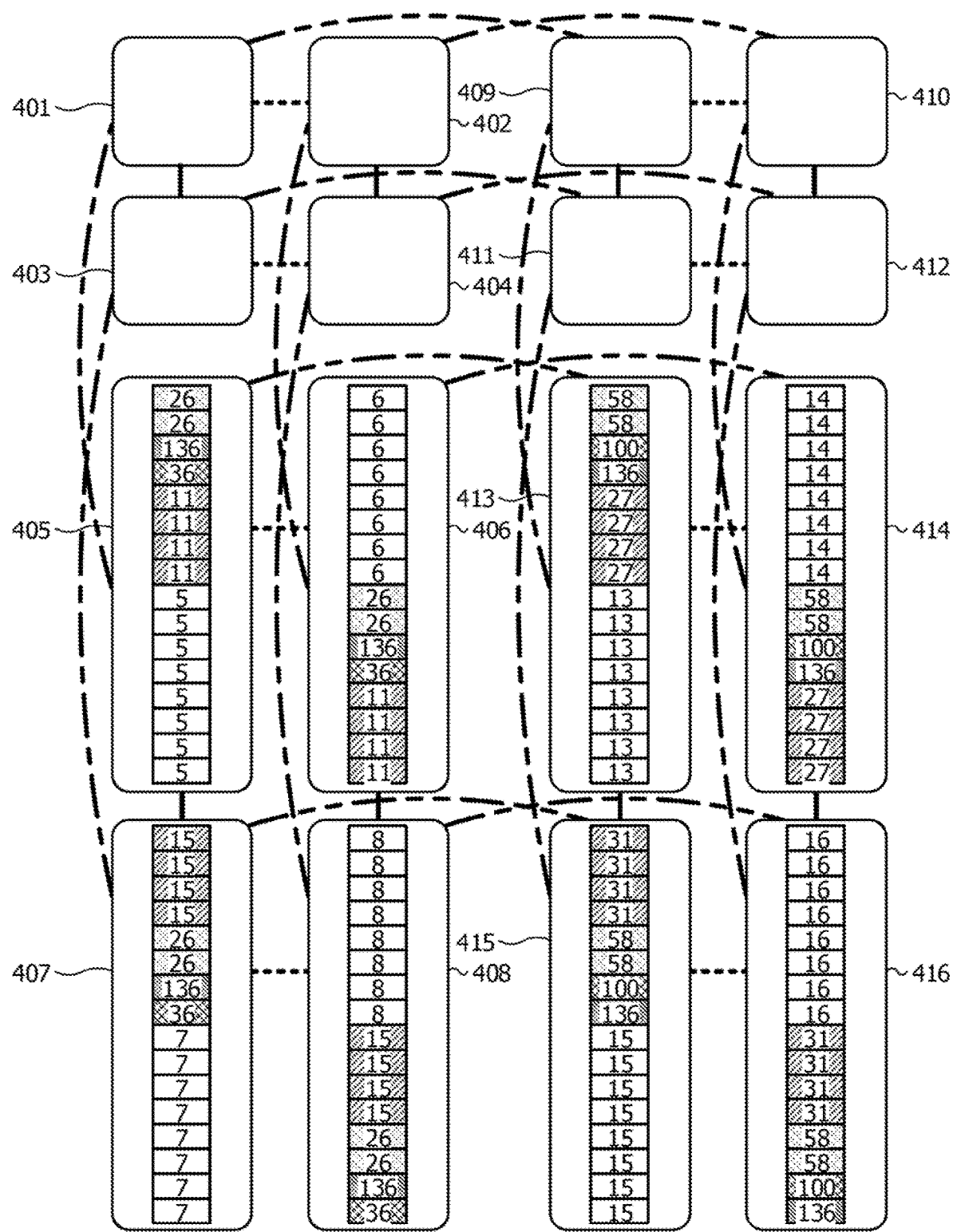
Figure 21A:
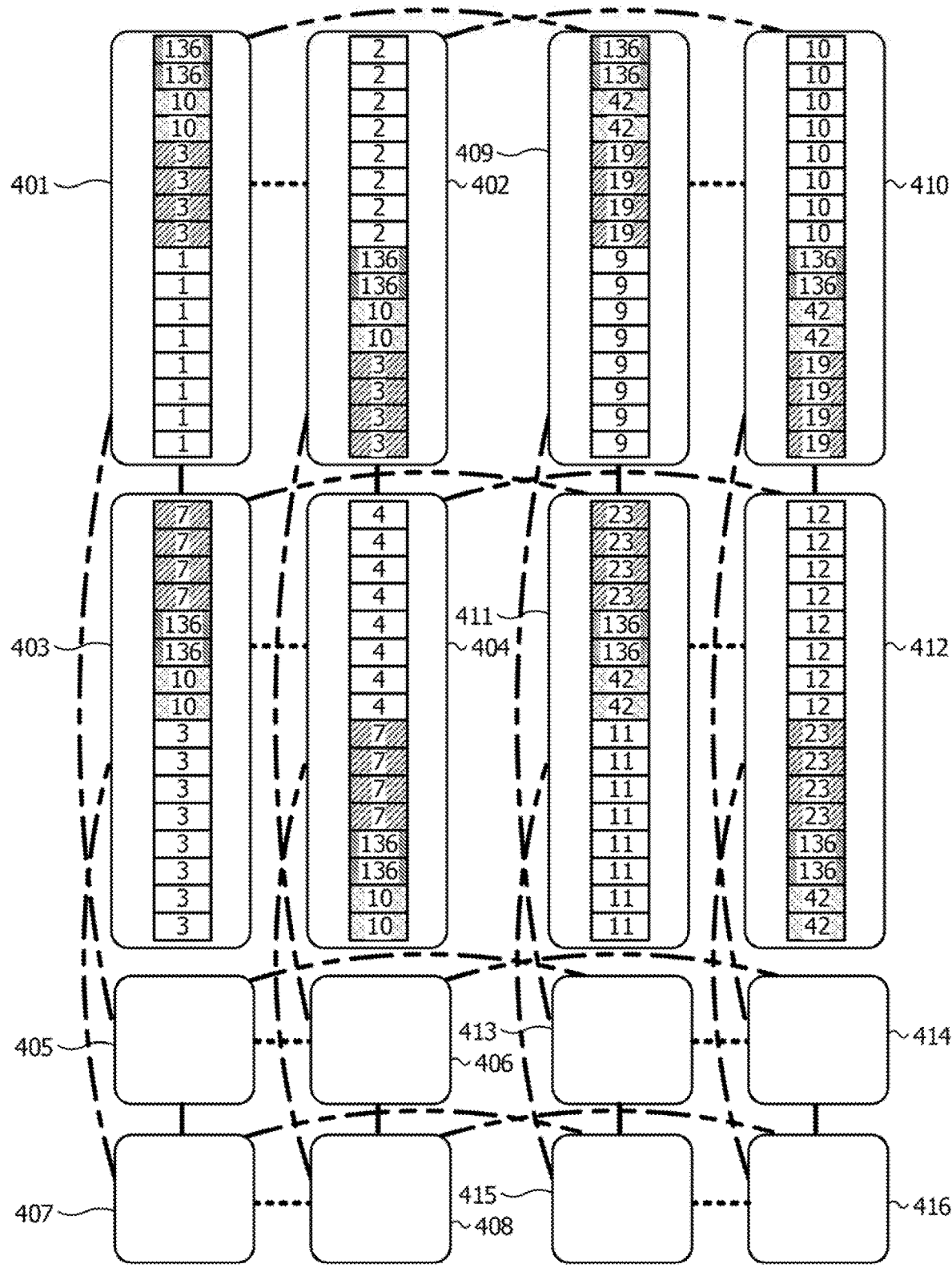
FIGS. 21A and 21B illustrate the doubling process to be executed in the Z dimension.
Figure 21B:
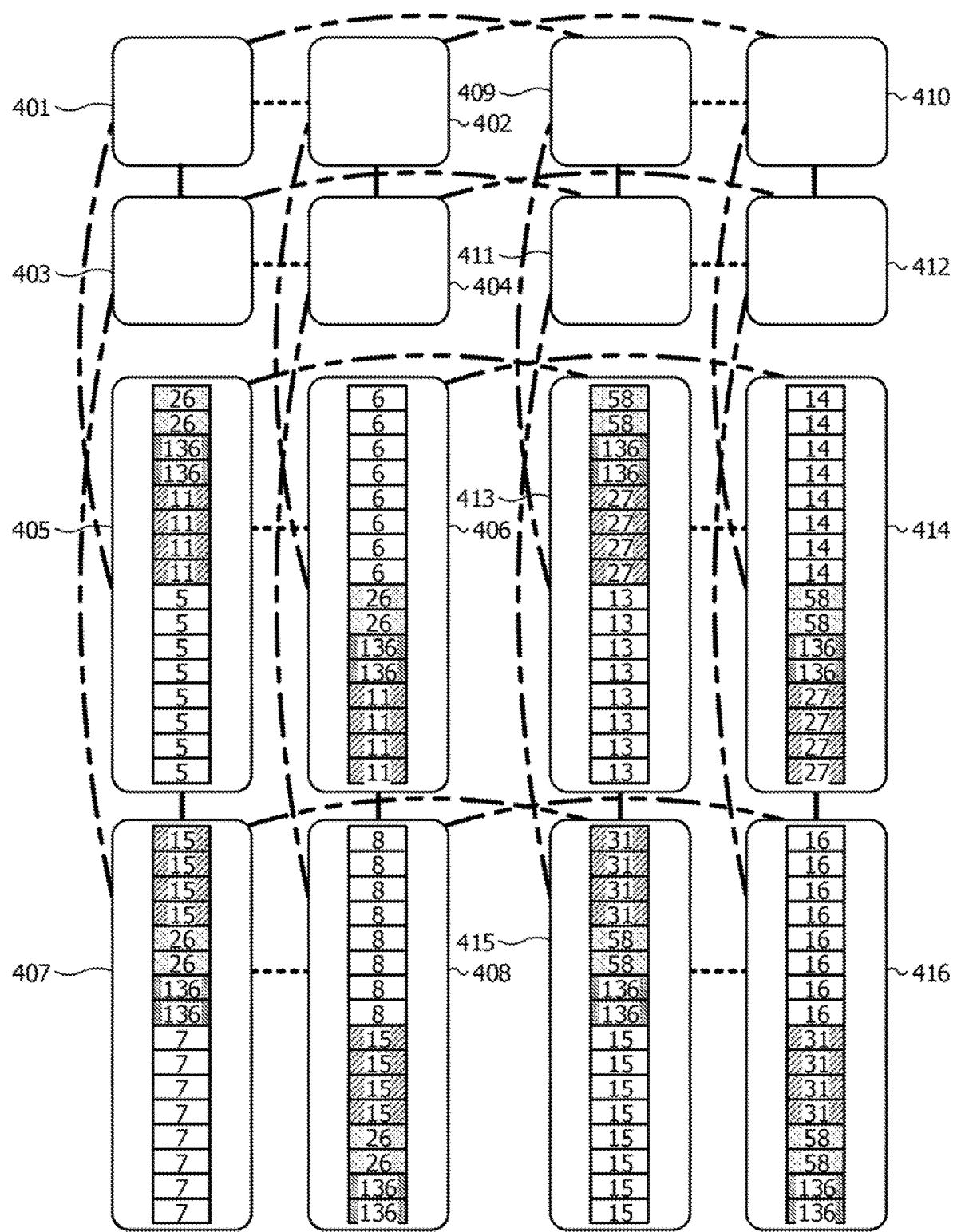
Figure 22A:
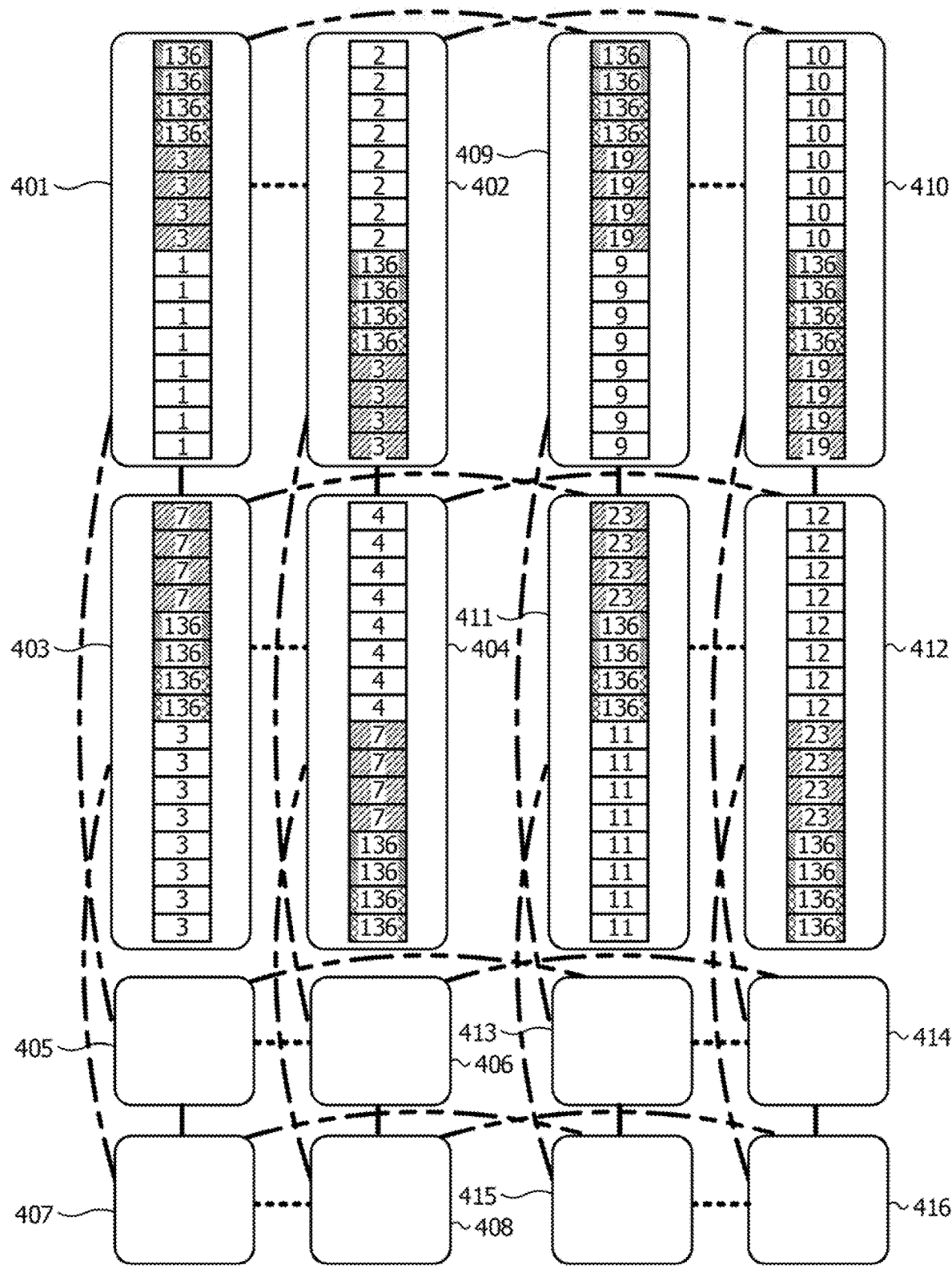
FIGS. 22A and 22B illustrate the doubling process to be executed in the Y dimension.
Figure 22B:
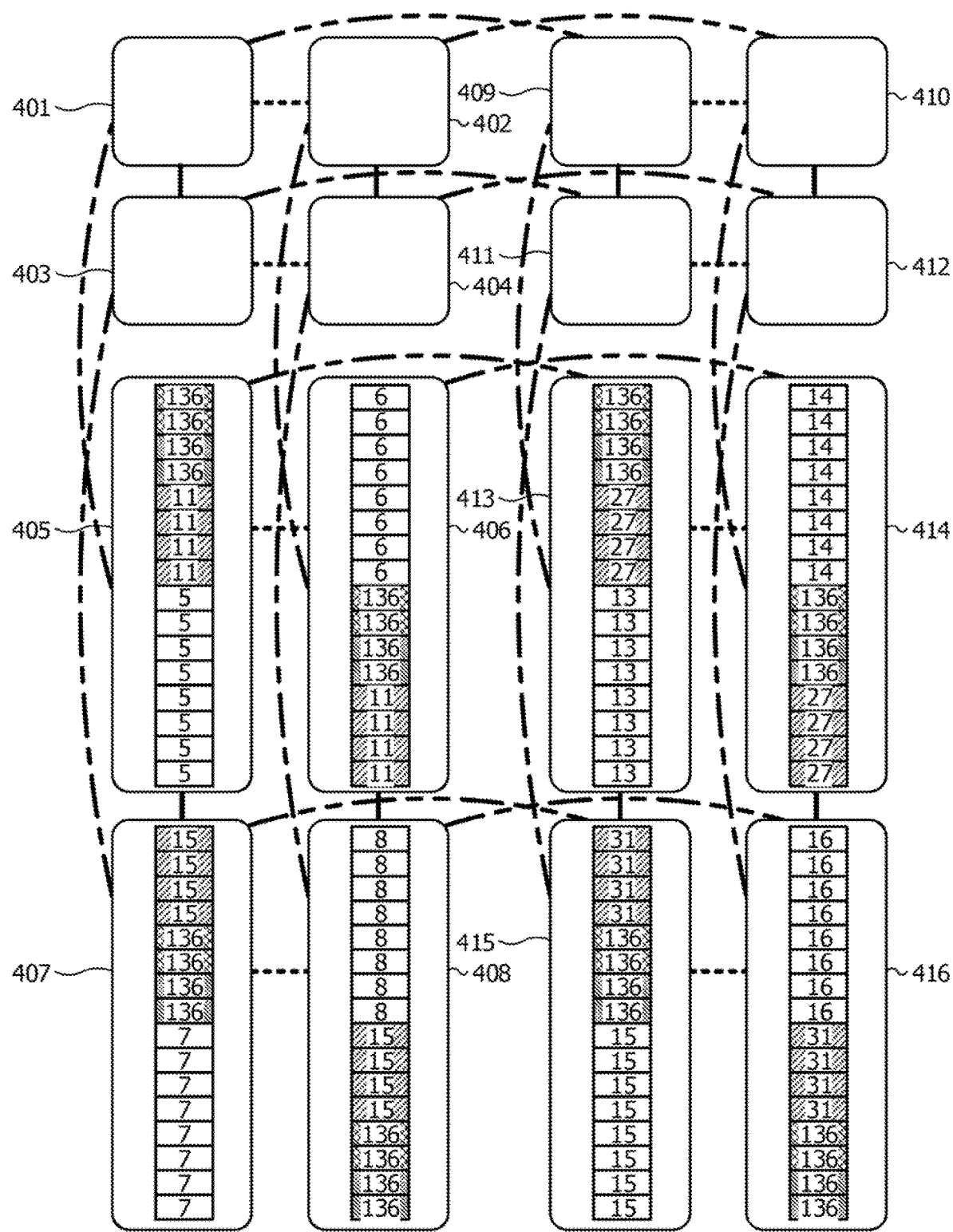
Figure 23A:
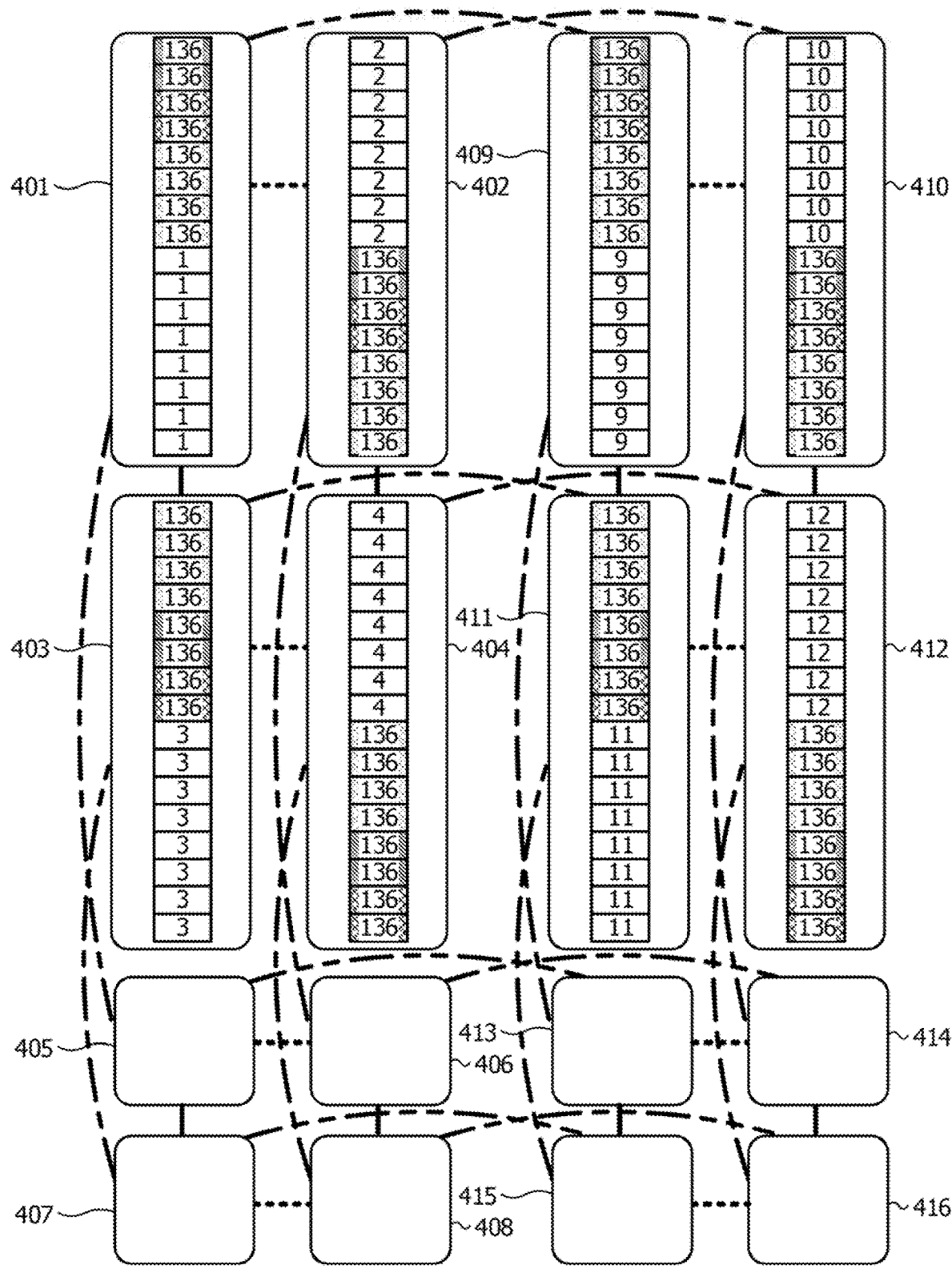
FIGS. 23A and 23B illustrate the doubling process to be executed in the X dimension.
Figure 23B:
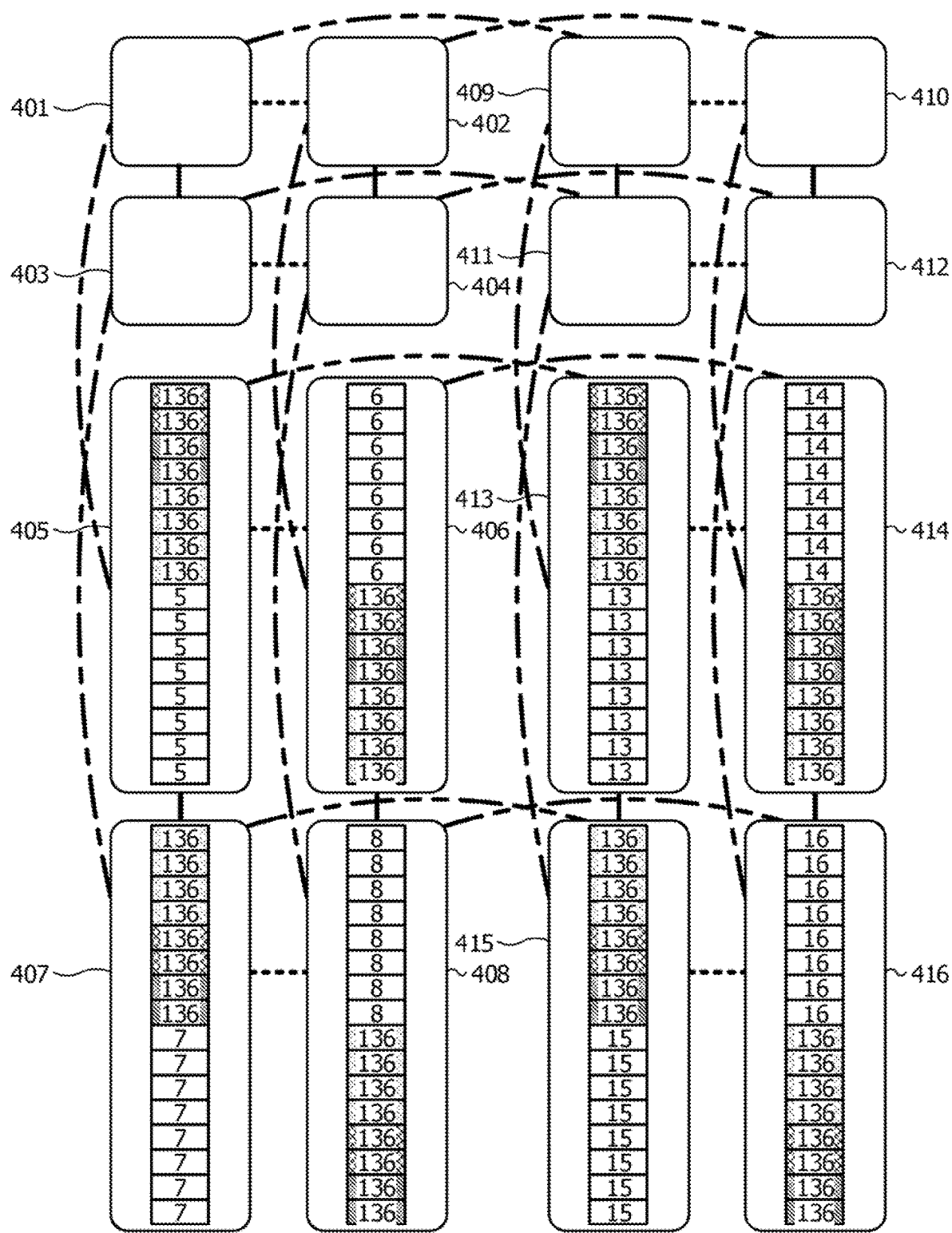
Figure 24A:
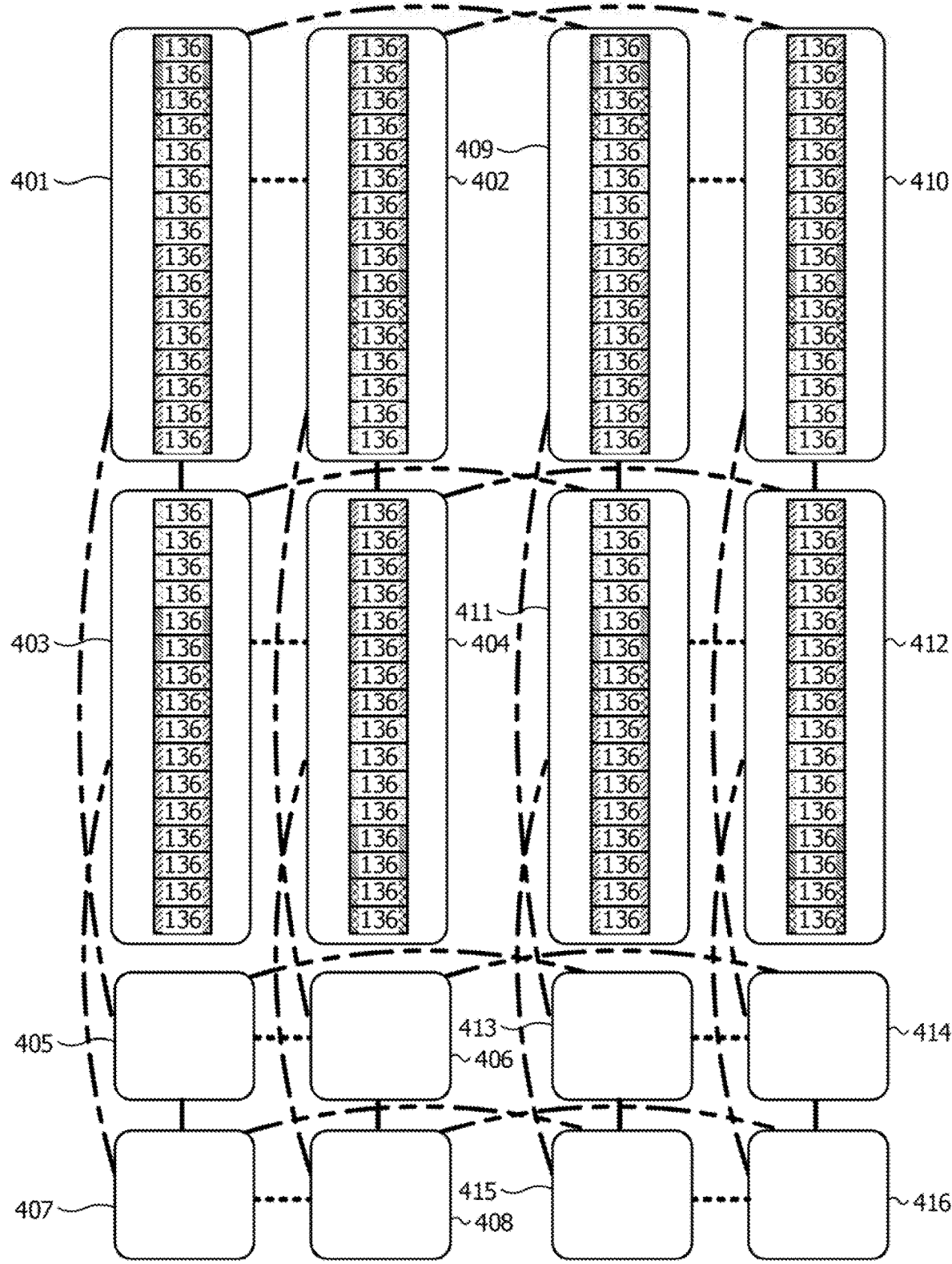
FIGS. 24A and 24B illustrate the doubling process to be executed in the W dimension.
Figure 24B:
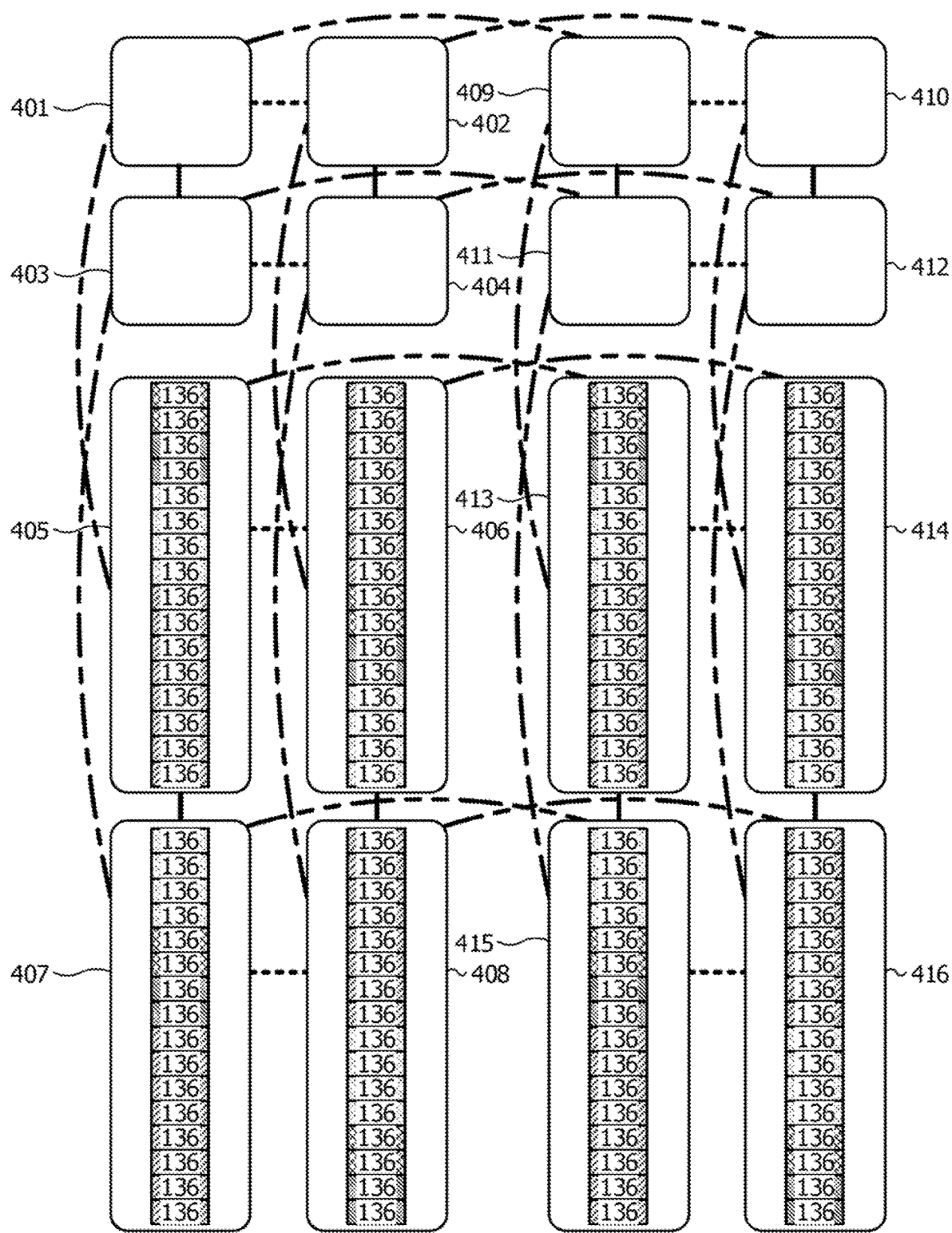

A specific example of the halving and doubling processes by the aggregate operation devices 20 according to the first embodiment is described below with reference to FIGS. 16 to 24. FIG. 16 (i.e., FIGS. 16A and 16B) illustrates an initial state. FIG. 17 (i.e., FIGS. 17A and 17B) illustrates the halving process to be executed in the W dimension. FIG. 18 (i.e., FIGS. 18A and 18B) illustrates the halving process to be executed in the X dimension. FIG. 19 (FIGS. 19A and 19B) illustrates the halving process to be executed in the Y dimension. FIG. 20 (FIGS. 20A and 20B) illustrates the halving process to be executed in the Z dimension. FIG. 21 (FIGS. 21A and 21B) illustrates the doubling process to be executed in the Z dimension. FIG. 22 (i.e., FIGS. 22A and 22B) illustrates the doubling process to be executed in the Y dimension. FIG. 23 (FIGS. 23A and 23B) illustrates the doubling process to be executed in the X dimension. FIG. 24 (FIGS. 24A and 24B) illustrates the doubling process to be executed in the W dimension. This specific example assumes that system boards 1 have aggregate operation devices 20, respectively, which are referred to as aggregate operation devices 401 to 416. This specific example also assumes that sizes of a four-dimensional space in the W, X, Y, and Z dimensions are 2. Thus, in the specific example, two system boards 1 are arranged in each of the dimensions, or sixteen system boards 1 exist. The specific example assumes that the aggregate operation devices 20 execute addition as aggregate operations. The system boards 1 have the aggregate operation devices 20. In FIGS. 16 to 24, broken lines indicate the W dimension, solid lines indicate the X dimension, dashed-and-dotted lines indicate the Y dimension, and dashed-and-double-dotted lines indicate the Z dimension.

In FIG. 16, array data items that are distributed in the intra-system board Reduce process are illustrated in rectangles indicating the aggregate operation devices 401 to 416. Each of the aggregate operation devices 401 to 416 holds sixteen array data items with any of values of 1 to 16, while array data items held in each of the aggregate operation devices 401 to 416 have a single value different from values of array data items held in the other aggregate operation devices.

When the halving process is executed in the W dimension in the initial state illustrated in FIG. 16, the initial state transitions to a state illustrated in FIG. 17. For example, the halving process is executed between the aggregate operation devices 401 and 402 so that upper half data of the array data items held in the aggregate operation device 401 and lower half data of the array data items held in the aggregate operation device 402 are changed to 3 by adding the lower half data to the upper half data and adding the upper half data to the lower half data. The halving process is executed between the aggregate operation devices 403 and 404 so that upper half data of the array data items held in the aggregate operation device 403 and lower half data of the array data items held in the aggregate operation device 404 are changed to 7 by adding the lower half data to the upper half data and adding the upper half data to the lower half data. The halving process is executed between the aggregate operation devices 405 and 406 so that upper half data of the array data items held in the aggregate operation device 405 and lower half data of the array data items held in the aggregate operation device 406 are changed to 11 by adding the lower half data to the upper half data and adding the upper half data to the lower half data. The halving process is executed between the aggregate operation devices 407 and 408 so that upper half data of the array data items held in the aggregate operation device 407 and lower half data of the array data items held in the aggregate operation device 408 are changed to 15 by adding the lower half data to the upper half data and adding the upper half data to the lower half data. The halving process is executed between the aggregate operation devices 409 and 410 so that upper half data of the array data items held in the aggregate operation device 409 and lower half data of the array data items held in the aggregate operation device 410 are changed to 19 by adding the lower half data to the upper half data and adding the upper half data to the lower half data. The halving process is executed between the aggregate operation devices 411 and 412 so that upper half data of the array data items held in the aggregate operation device 411 and lower half data of the array data items held in the aggregate operation device 412 are changed to 23 by adding the lower half data to the upper half data and adding the upper half data to the lower half data. The halving process is executed between the aggregate operation devices 413 and 414 so that upper half data of the array data items held in the aggregate operation device 413 and lower half data of the array data items held in the aggregate operation device 414 are changed to 27 by adding the lower half data to the upper half data and adding the upper half data to the lower half data. The halving process is executed between the aggregate operation devices 415 and 416 so that upper half data of the array data items held in the aggregate operation device 415 and lower half data of the array data items held in the aggregate operation device 416 are changed to 31 by adding the lower half data to the upper half data and adding the upper half data to the lower half data.

When the halving process is executed in the X dimension in the state illustrated in FIG. 17, the state transitions to a state illustrated in FIG. 18. For example, the halving process is executed between the aggregate operation devices 401 and 403 so that upper half data of the operation results held in the aggregate operation device 401 and lower half data of the operation results held in the aggregate operation device 403 are changed to 10 by adding the lower half data to the upper half data and adding the upper half data to the lower half data. The halving process is executed between the aggregate operation devices 402 and 404 so that upper half data of the operation results held in the aggregate operation device 402 and lower half data of the operation results held in the aggregate operation device 404 are changed to 10 by adding the lower half data to the upper half data and adding the upper half data to the lower half data. The halving process is executed between the aggregate operation devices 405 and 407 so that upper half data of the operation results held in the aggregate operation device 405 and lower half data of the operation results held in the aggregate operation device 407 are changed to 26 by adding the lower half data to the upper half data and adding the upper half data to the lower half data. The halving process is executed between the aggregate operation devices 406 and 408 so that upper half data of the operation results held in the aggregate operation device 406 and lower half data of the operation results held in the aggregate operation device 408 are changed to 26 by adding the lower half data to the upper half data and adding the upper half data to the lower half data. The halving process is executed between the aggregate operation devices 409 and 411 so that upper half data of the operation results held in the aggregate operation device 409 and lower half data of the operation results held in the aggregate operation device 411 are changed to 42 by adding the lower half data to the upper half data and adding the upper half data to the lower half data. The halving process is executed between the aggregate operation devices 410 and 412 so that upper half data of the operation results held in the aggregate operation device 410 and lower half data of the operation results held in the aggregate operation device 412 are changed to 42 by adding the lower half data to the upper half data and adding the upper half data to the lower half data. The halving process is executed between the aggregate operation devices 413 and 415 so that upper half data of the operation results held in the aggregate operation device 413 and lower half data of the operation results held in the aggregate operation device 415 are changed to 58 by adding the lower half data to the upper half data and adding the upper half data to the lower half data. The halving process is executed between the aggregate operation devices 414 and 416 so that upper half data of the operation results held in the aggregate operation device 414 and lower half data of the operation results held in the aggregate operation device 416 are changed to 58 by adding the lower half data to the upper half data and adding the upper half data to the lower half data.

When the halving process is executed in the Y dimension in the state illustrated in FIG. 18, the state transitions to a state illustrated in FIG. 19. For example, the halving process is executed between the aggregate operation devices 401 and 405 so that upper half data of the operation results held in the aggregate operation device 401 and lower half data of the operation results held in the aggregate operation device 405 are changed to 36 by adding the lower half data to the upper half data and adding the upper half data to the lower half data. The halving process is executed between the aggregate operation devices 402 and 406 so that upper half data of the operation results held in the aggregate operation device 402 and lower half data of the operation results held in the aggregate operation device 406 are changed to 36 by adding the lower half data to the upper half data and adding the upper half data to the lower half data. The halving process is executed between the aggregate operation devices 403 and 407 so that upper half data of the operation results held in the aggregate operation device 403 and lower half data of the operation results held in the aggregate operation device 407 are changed to 36 by adding the lower half data to the upper half data and adding the upper half data to the lower half data. The halving process is executed between the aggregate operation devices 404 and 408 so that upper half data of the operation results held in the aggregate operation device 404 and lower half data of the operation results held in the aggregate operation device 408 are changed to 36 by adding the lower half data to the upper half data and adding the upper half data to the lower half data. The halving process is executed between the aggregate operation devices 409 and 413 so that upper half data of the operation results held in the aggregate operation device 409 and lower half data of the operation results held in the aggregate operation device 413 are changed to 100 by adding the lower half data to the upper half data and adding the upper half data to the lower half data. The halving process is executed between the aggregate operation devices 410 and 414 so that upper half data of the operation results held in the aggregate operation device 410 and lower half data of the operation results held in the aggregate operation device 414 are changed to 100 by adding the lower half data to the upper half data and adding the upper half data to the lower half data. The halving process is executed between the aggregate operation devices 411 and 415 so that upper half data of the operation results held in the aggregate operation device 411 and lower half data of the operation results held in the aggregate operation device 415 are changed to 100 by adding the lower half data to the upper half data and adding the upper half data to the lower half data. The halving process is executed between the aggregate operation devices 412 and 416 so that upper half data of the operation results held in the aggregate operation device 412 and lower half data of the operation results held in the aggregate operation device 416 are changed to 100 by adding the lower half data to the upper half data and adding the upper half data to the lower half data.

When the halving process is executed in the Z dimension in the state illustrated in FIG. 19, the state transitions to a state illustrated in FIG. 20. For example, the halving process is executed between the aggregate operation devices 401 and 409 so that upper half data of the operation results held in the aggregate operation device 401 and lower half data of the operation results held in the aggregate operation device 409 are changed to 136 by adding the lower half data to the upper half data and adding the upper half data to the lower half data. The halving process is executed between the aggregate operation devices 402 and 410 so that upper half data of the operation results held in the aggregate operation device 402 and lower half data of the operation results held in the aggregate operation device 410 are changed to 136 by adding the lower half data to the upper half data and adding the upper half data to the lower half data. The halving process is executed between the aggregate operation devices 403 and 411 so that upper half data of the operation results held in the aggregate operation device 403 and lower half data of the operation results held in the aggregate operation device 411 are changed to 136 by adding the lower half data to the upper half data and adding the upper half data to the lower half data. The halving process is executed between the aggregate operation devices 404 and 412 so that upper half data of the operation results held in the aggregate operation device 404 and lower half data of the operation results held in the aggregate operation device 412 are changed to 136 by adding the lower half data to the upper half data and adding the upper half data to the lower half data. The halving process is executed between the aggregate operation devices 405 and 413 so that upper half data of the operation results held in the aggregate operation device 405 and lower half data of the operation results held in the aggregate operation device 413 are changed to 136 by adding the lower half data to the upper half data and adding the upper half data to the lower half data. The halving process is executed between the aggregate operation devices 406 and 414 so that upper half data of the operation results held in the aggregate operation device 406 and lower half data of the operation results held in the aggregate operation device 414 are changed to 136 by adding the lower half data to the upper half data and adding the upper half data to the lower half data. The halving process is executed between the aggregate operation devices 407 and 415 so that upper half data of the operation results held in the aggregate operation device 407 and lower half data of the operation results held in the aggregate operation device 415 are changed to 136 by adding the lower half data to the upper half data and adding the upper half data to the lower half data. The halving process is executed between the aggregate operation devices 408 and 416 so that upper half data of the operation results held in the aggregate operation device 408 and lower half data of the operation results held in the aggregate operation device 416 are changed to 136 by adding the lower half data to the upper half data and adding the upper half data to the lower half data.

When the doubling process is executed in the Z dimension in the state illustrated in FIG. 20, the state transitions to a state illustrated in FIG. 21. For example, the doubling process is executed between the aggregate operation devices 401 and 409 so that the first and second data items among the array data items held in the aggregate operation devices 401 and 409 are 136. The doubling process is executed between the aggregate operation devices 402 and 410 so that the ninth and tenth data items among the array data items held in the aggregate operation devices 402 and 410 are 136. The doubling process is executed between the aggregate operation devices 403 and 411 so that the seventh and eighth data items among the array data items held in the aggregate operation devices 403 and 411 are 136. The doubling process is executed between the aggregate operation devices 404 and 412 so that the thirteenth and fourteenth data items among the array data items held in the aggregate operation devices 404 and 412 are 136. The doubling process is executed between the aggregate operation devices 405 and 413 so that the third and fourth data items among the array data items held in the aggregate operation devices 405 and 413 are 136. The doubling process is executed between the aggregate operation devices 406 and 414 so that the eleventh and twelfth data items among the array data items held in the aggregate operation devices 406 and 414 are 136. The doubling process is executed between the aggregate operation devices 407 and 415 so that the seventh and eighth data items among the array data items held in the aggregate operation devices 407 and 415 are 136. The doubling process is executed between the aggregate operation devices 408 and 416 so that the fifteenth and sixteenth data items among the array data items held in the aggregate operation devices 408 and 416 are 136.

When the doubling process is executed in the Y dimension in the state illustrated in FIG. 21, the state transitions to a state illustrated in FIG. 22. For example, the doubling process is executed between the aggregate operation devices 401 and 405 so that the first to fourth data items among the array data items held in the aggregate operation devices 401 and 405 are 136. The doubling process is executed between the aggregate operation devices 402 and 406 so that the ninth to twelfth data items among the array data items held in the aggregate operation devices 402 and 406 are 136. The doubling process is executed between the aggregate operation devices 403 and 407 so that the fifth to eighth data items among the array data items held in the aggregate operation devices 403 and 407 are 136. The doubling process is executed between the aggregate operation devices 404 and 408 so that the thirteenth to sixteenth data items among the array data items held in the aggregate operation devices 404 and 408 are 136. The doubling process is executed between the aggregate operation devices 409 and 413 so that the first to fourth data items among the array data items held in the aggregate operation devices 409 and 413 are 136. The doubling process is executed between the aggregate operation devices 410 and 414 so that the ninth to twelfth data items among the array data items held in the aggregate operation devices 410 and 414 are 136. The doubling process is executed between the aggregate operation devices 411 and 415 so that the fifth to eighth data items among the array data items held in the aggregate operation devices 411 and 415 are 136. The doubling process is executed between the aggregate operation devices 412 and 416 so that the twelfth to sixteenth data items among the array data items held in the aggregate operation devices 412 and 416 are 136.

When the doubling process is executed in the X dimension in the state illustrated in FIG. 22, the state transitions to a state illustrated in FIG. 23. For example, the doubling process is executed between the aggregate operation devices 401 and 403 so that the first to eighth data items among the array data items held in the aggregate operation devices 401 and 403 are 136. The doubling process is executed between the aggregate operation devices 402 and 404 so that the ninth to sixteenth data items among the array data items held in the aggregate operation devices 402 and 404 are 136. The doubling process is executed between the aggregate operation devices 405 and 407 so that the first to eighth data items among the array data items held in the aggregate operation devices 405 and 407 are 136. The doubling process is executed between the aggregate operation devices 406 and 408 so that the ninth to sixteenth data items among the array data items held in the aggregate operation devices 406 and 408 are 136. The doubling process is executed between the aggregate operation devices 409 and 411 so that the first to eighth data items among the array data items held in the aggregate operation devices 409 and 411 are 136. The doubling process is executed between the aggregate operation devices 410 and 412 so that the ninth to sixteenth data items among the array data items held in the aggregate operation devices 410 and 412 are 136. The doubling process is executed between the aggregate operation devices 413 and 415 so that the first to eighth data items among the array data items held in the aggregate operation devices 413 and 415 are 136. The doubling process is executed between the aggregate operation devices 414 and 416 so that the ninth to sixteenth data items among the array data items held in the aggregate operation devices 414 and 416 are 136.

When the doubling process is executed in the X dimension in the state illustrated in FIG. 22, the state transitions to a state illustrated in FIG. 23. For example, the doubling process is executed between the aggregate operation devices 401 and 403 so that the first to eighth data items among the array data items held in the aggregate operation devices 401 and 403 are 136. The doubling process is executed between the aggregate operation devices 402 and 404 so that the ninth to sixteenth data items among the array data items held in the aggregate operation devices 402 and 404 are 136. The doubling process is executed between the aggregate operation devices 405 and 407 so that the first to eighth data items among the array data items held in the aggregate operation devices 405 and 407 are 136. The doubling process is executed between the aggregate operation devices 406 and 408 so that the ninth to sixteenth data items among the array data items held in the aggregate operation devices 406 and 408 are 136. The doubling process is executed between the aggregate operation devices 409 and 411 so that the first to eighth data items among the array data items held in the aggregate operation devices 409 and 411 are 136. The doubling process is executed between the aggregate operation devices 410 and 412 so that the ninth to sixteenth data items among the array data items held in the aggregate operation devices 410 and 412 are 136. The doubling process is executed between the aggregate operation devices 413 and 415 so that the first to eighth data items among the array data items held in the aggregate operation devices 413 and 415 are 136. The doubling process is executed between the aggregate operation devices 414 and 416 so that the ninth to sixteenth data items among the array data items held in the aggregate operation devices 414 and 416 are 136.

When the doubling process is executed in the W dimension in the state illustrated in FIG. 23, the state transitions to a state illustrated in FIG. 24. For example, the doubling process is executed between the aggregate operation devices 401 and 402 so that the first to sixteenth array data items held in the aggregate operation devices 401 and 402 are 136. The doubling process is executed between the aggregate operation devices 403 and 404 so that the first to sixteenth array data items held in the aggregate operation devices 403 and 404 are 136. The doubling process is executed between the aggregate operation devices 405 and 406 so that the first to sixteenth array data items held in the aggregate operation devices 405 and 406 are 136. The doubling process is executed between the aggregate operation devices 407 and 408 so that the first to sixteenth array data items held in the aggregate operation devices 407 and 408 are 136. The doubling process is executed between the aggregate operation devices 409 and 410 so that the first to sixteenth array data items held in the aggregate operation devices 409 and 410 are 136. The doubling process is executed between the aggregate operation devices 411 and 412 so that the first to sixteenth array data items held in the aggregate operation devices 411 and 412 are 136. The doubling process is executed between the aggregate operation devices 413 and 414 so that the first to sixteenth array data items held in the aggregate operation devices 413 and 414 are 136. The doubling process is executed between the aggregate operation devices 415 and 416 so that the first to sixteenth array data items held in the aggregate operation devices 415 and 416 are 136. Thus, as illustrated in FIG. 24, all the aggregate operation devices 401 to 416 obtain the results of executing the aggregate operations on all the array data items.

Figure 25:
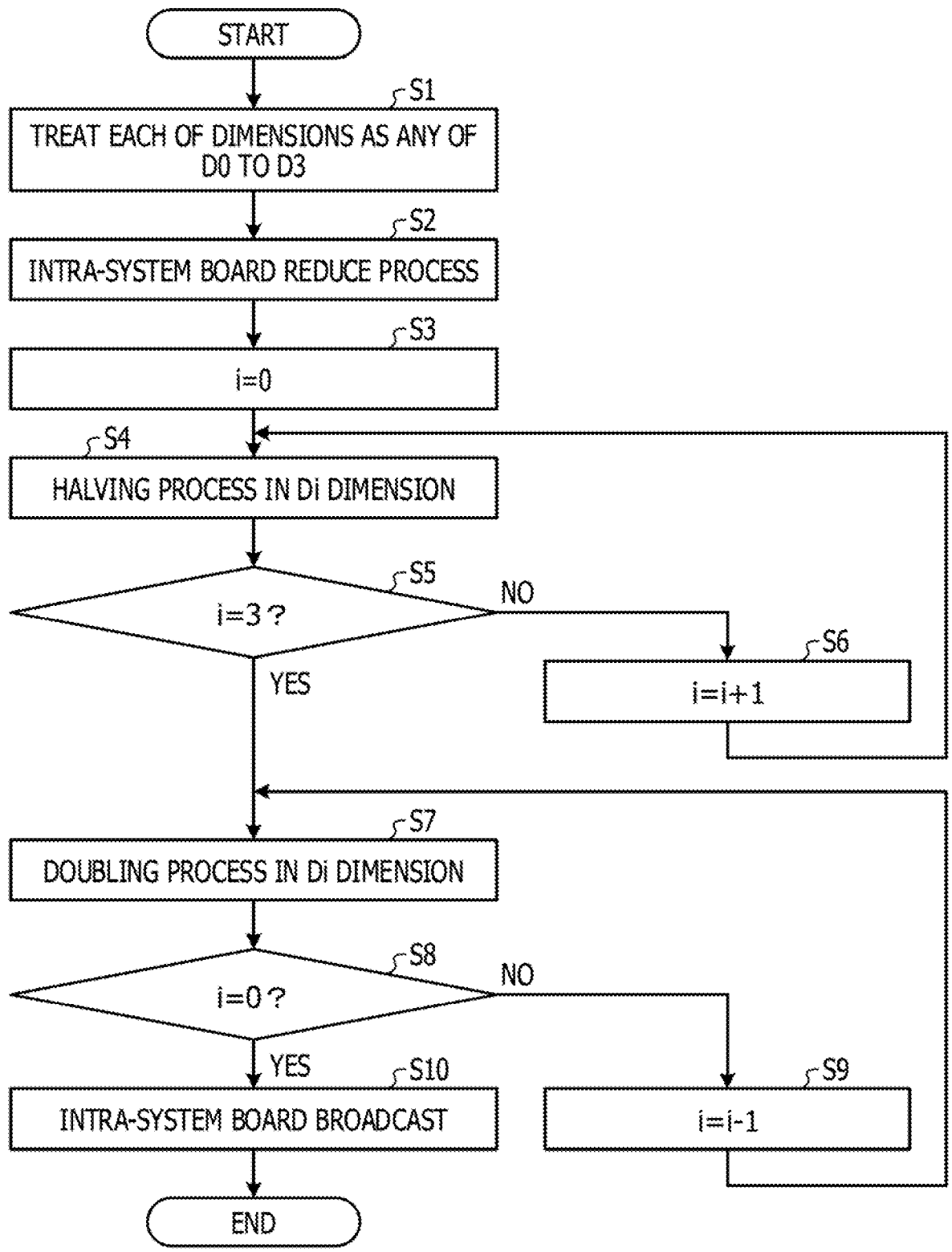
FIG. 25 is a flowchart of the Allreduce process by the information processing system according to the first embodiment.

Next, the flow of the Allreduce process by the information processing system 3 according to the first embodiment is described with reference to FIG. 25. FIG. 25 is a flowchart of the Allreduce process by the information processing system according to the first embodiment.

The order determiners 292 receive the wiring table from the network configuration managers 208. Then, the order determiners 292 confirm the W, X, Y, and Z dimensions that are the dimensions of the information processing system 3. Then, the order determiners 292 treat the order of the dimensions in which the process is executed as the order of D0 to D3, treat each of the dimensions as any of D0 to D3, and determine the order of the dimensions in which the process is executed (in step S1). For example, the order determiners 292 assign D0 to D3 to the dimensions in the order of the W, X, Y, and Z dimensions. After that, the order determiners 292 notify the comprehensive managers 291 of information of the assignment of D0 to D3 to the dimensions.

Each of the data dividers 191 of the main operation devices 10 divides array data stored in the memories 104 into four ¼ array data items. Then, the data transmitters 192 execute the intra-system board Reduce process by transmitting the ¼ array data items to the different aggregate operation devices 20 (in step S2). The data receivers 294 of the aggregate operation devices 20 receive the ¼ array data items transmitted by the main operation devices 10. Then, the data receivers 294 cause the ¼ array data items to be stored in the memories 204.

The comprehensive managers 291 receive the information of the assignment of D0 to D3 to the dimensions from the order determiners 292. Then, the comprehensive managers 291 set i to 0 (in step S3).

The comprehensive managers 291 acquire the ¼ array data items from the memories 204. Then, the comprehensive managers 291 execute the halving process in a Di dimension (in step S4).

Next, the comprehensive managers 291 determine whether i=3 (in step S5). Thus, the comprehensive managers 291 determine whether the halving process has been completed in all the dimensions. When i is not 3 (No in step S5), the comprehensive managers 291 increment i by 1 (in step S6) and cause the process to return to step S4.

When i=3 (Yes in step S5), the comprehensive managers 291 execute the doubling process in the Di dimension (in step S7).

Then, the comprehensive managers 291 determine whether i=0 (in step S8). Thus, the comprehensive managers 291 determine whether the doubling process has been completed in all the dimensions. When i is not 0 (No in step S8), the comprehensive managers 291 decrement i by 1 (in step S9) and causes the process to return to step S7.

When i=0 (affirmative in step S8), the comprehensive managers 291 execute the intra-system board broadcast using results of executing aggregate operations on the ¼ array data items (in step S10).

Figure 26:
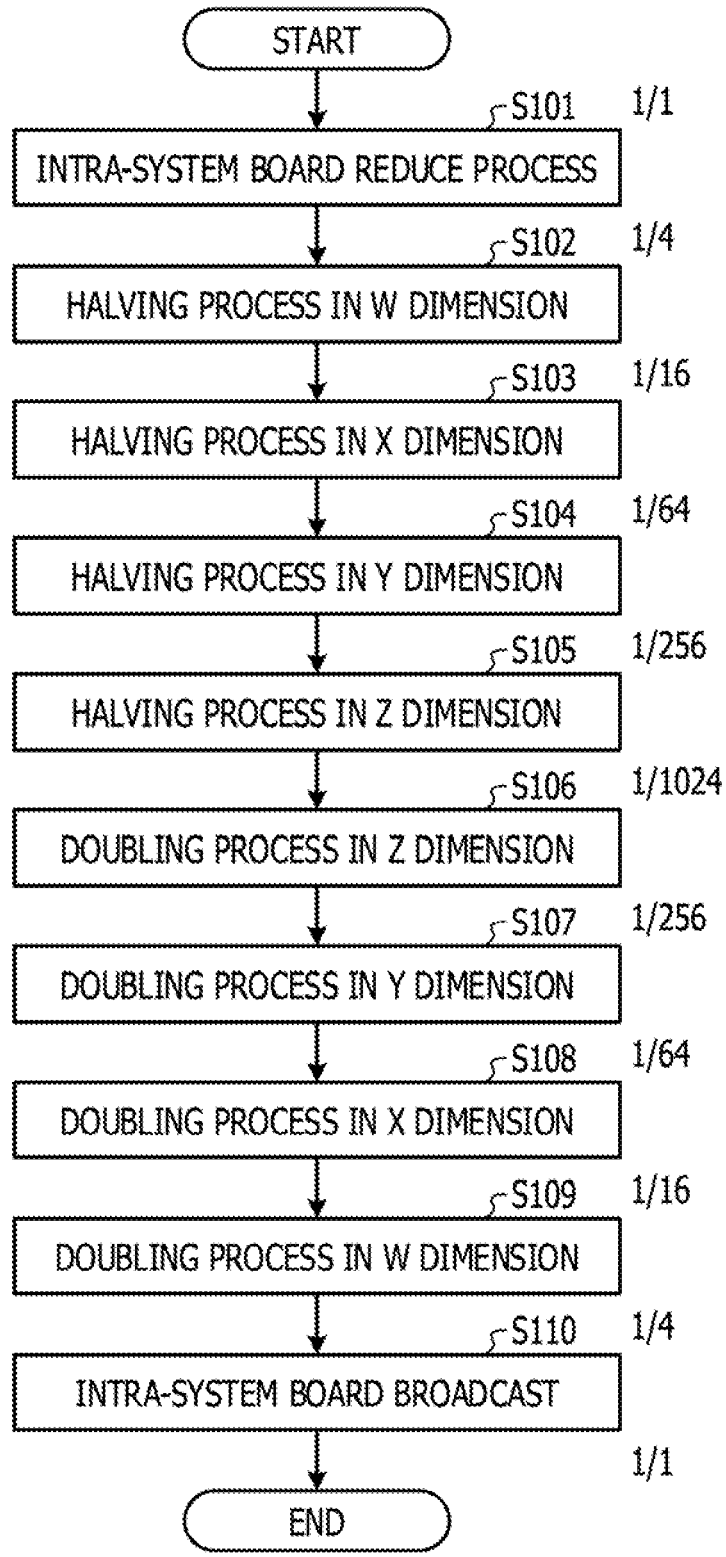
FIG. 26 describes amounts of data to be transferred in the case where the halving and doubling processes according to the first embodiment are used.
Figure 27:
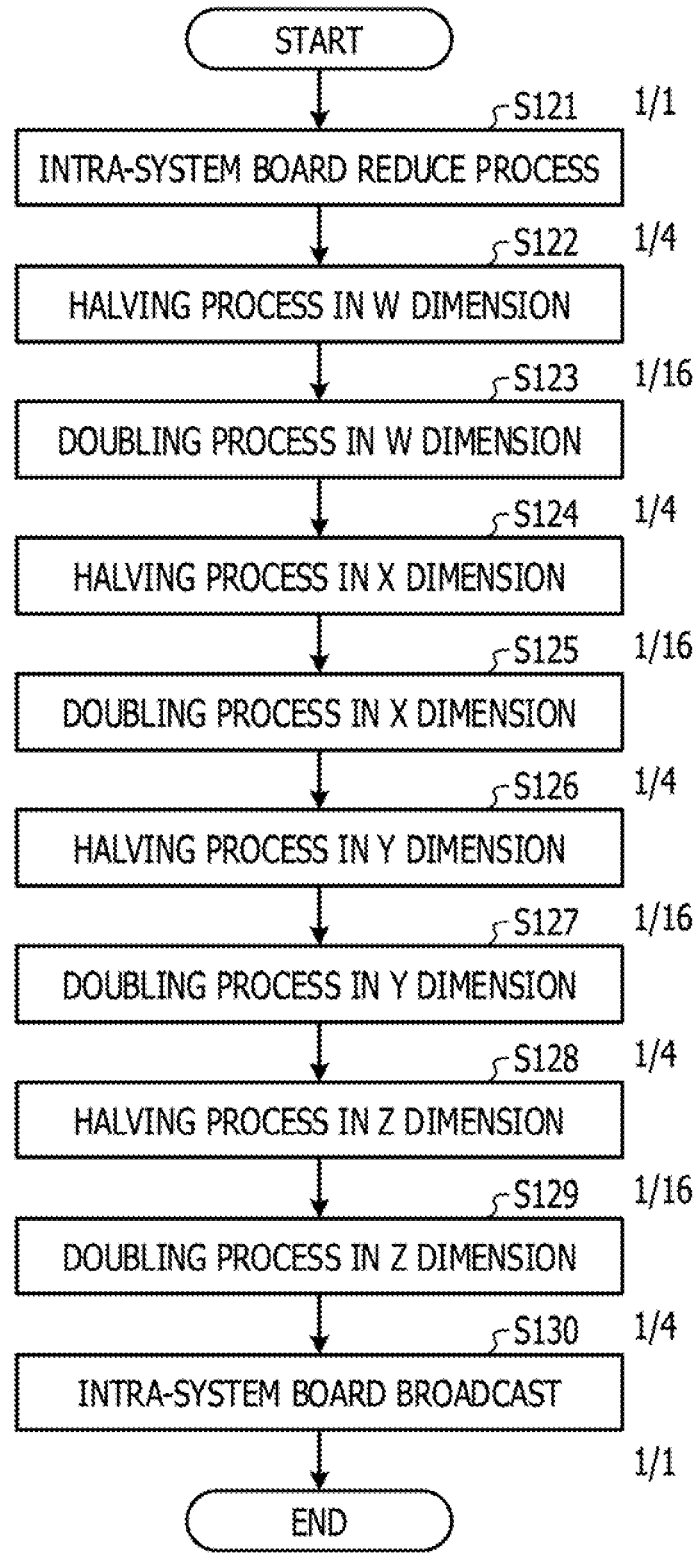
FIG. 27 describes amounts of data to be transferred in the case where traditional halving and doubling processes are used.

Next, differences between amounts of data transferred when the halving and doubling processes according to the first embodiment are used and amounts of data transferred when traditional halving and doubling processes are used are described with reference to FIGS. 26 and 27. FIG. 26 describes amounts of data transferred when the halving and doubling processes according to the first embodiment are used. FIG. 27 describes amounts of data transferred when the traditional halving and doubling processes are used. In FIGS. 26 and 27, numbers described for steps on the right side indicate the sizes of data items to be transferred relative to the size of the array data held in the main operation devices 10.

In the case where the halving and doubling processes according to the first embodiment are used, before the intra-system board Reduce process (of step S101), the array data held in the main operation devices 10 has yet to be divided and the data to be transferred has the same size as that of the original array data. When the intra-system board Reduce process (of step S101) is executed, the array data is divided into transfer data items, each of which has ¼ the size of the array data held in the main operation devices 10. Then, when the halving process is executed in the W dimension (in step S102), the transfer data items are divided into transfer data items, each of which has ¹⁄₁₆ the size of the array data held in the main operation devices 10. Then, when the halving process is executed in the X dimension (in step S103), the transfer data items are divided into transfer data items, each of which has ¹⁄₆₄ the size of the array data held in the main operation devices 10. Then, when the halving process is executed in the Y dimension (in step S104), the transfer data items are divided into transfer data items, each of which has ¹⁄₂₅₆ the size of the array data held in the main operation devices 10. Then, when the halving process is executed in the Z dimension (in step S105), the transfer data items are divided into transfer data items, each of which has ¹⁄₁₀₂₄ the size of the array data held in the main operation devices 10. After that, when the doubling process is executed in the Z dimension (in step S106), the transfer data items are changed to transfer data items, each of which has ¹⁄₂₅₆ the size of the array data held in the main operation devices 10. Then, when the doubling process is executed in the Y dimension (in step S107), the transfer data items are changed to transfer data items, each of which has ¹⁄₆₄ the size of the array data held in the main operation devices 10. Then, when the doubling process is executed in the X dimension (in step S108), the transfer data items are changed to transfer data items, each of which has ¹⁄₁₆ the size of the array data held in the main operation devices 10. Then, when the doubling process is executed in the W dimension (in step S109), the transfer data items are changed to transfer data items, each of which has ¼ the size of the array data held in the main operation devices 10. After that, when the intra-system board broadcast is executed (in step S110), the transfer data items are changed to data having the same size as that of the original array data.

On the other hand, the case where the traditional halving and doubling processes are used is described below. In this case, the traditional halving process and the traditional doubling process are continuously executed in each of the dimensions. In this case, as illustrated in FIG. 27, before the intra-system board Reduce process (of step S121), array data held in the main operation devices 10 has yet to be divided and the data to be transferred has the same size as that of the original array data. Then, when the intra-system board Reduce process is executed (of step S121), the data to be transferred is changed to transfer data items, each of which has ¼ the size of the array data held in the main operation devices 10. Then, when the traditional halving process is executed in the W dimension (in step S122), the transfer data items are divided into transfer data items, each of which has ¹⁄₁₆ the size of the array data held in the main operation devices 10. Then, when the traditional doubling process is executed in the W dimension (in step S123), the transfer data items are changed to transfer data items, each of which has ¼ the size of the array data held in the main operation devices 10. Then, when the traditional halving process is executed in the X dimension (in step S124), the transfer data items are divided into transfer data items, each of which has $\frac{1}{16}$ the size of the array data held in the main operation devices 10. Then, when the traditional doubling process is executed in the X dimension (in step S125), the transfer data items are changed to transfer data items, each of which has ¼ the size of the array data held in the main operation devices 10. Then, when the traditional halving process is executed in the Y dimension (in step S126), the transfer data items are divided into transfer data items, each of which has $\frac{1}{16}$ the size of the array data held in the main operation devices 10. Then, when the traditional doubling process is executed in the Y dimension (in step S127), the transfer data items are changed to transfer data items, each of which has ¼ the size of the array data held in the main operation devices 10. Then, when the traditional halving process is executed in the Z dimension (in step S128), the transfer data items are divided into transfer data items, each of which has $\frac{1}{16}$ the size of the array data held in the main operation devices 10. Then, when the traditional doubling process is executed in the Z dimension (in step S129), the transfer data items are changed to transfer data items, each of which has ¼ the size of the array data held in the main operation devices 10. After that, when the intra-system board broadcast is executed (in step S130), the transfer data items are changed to data having the same size as that of the original array data held in the main operation devices 10.

As described above, the aggregate operation devices 20 according to the first embodiment may transfer data items each having $\frac{1}{1024}$ the size of the original array data at the minimum. On the other hand, in the traditional halving and doubling processes, data to be transferred has $\frac{1}{16}$ the size of the original array data at the minimum. Thus, the aggregate operation devices 20 according to the first embodiment may significantly reduce amounts of data to be transferred in the entire aggregate operation process.

As described above, in the information processing system according to the first embodiment, the aggregate operation devices acquire divided array data items from the main operation devices, collectively execute the halving process in the dimensions, collectively execute the doubling process in the dimensions after the halving process, and broadcast operation results. This may reduce amounts of data to be transferred and reduce communication time in the Allreduce process. Since the divided array data items are distributed to all the aggregate operation devices, and all the aggregate operation devices operate in parallel, amounts of data to be computed may be evenly distributed, loads to be applied due to the computation may be distributed, and a processing speed of the entire information processing system may be improved.

Modification

Figure 28:
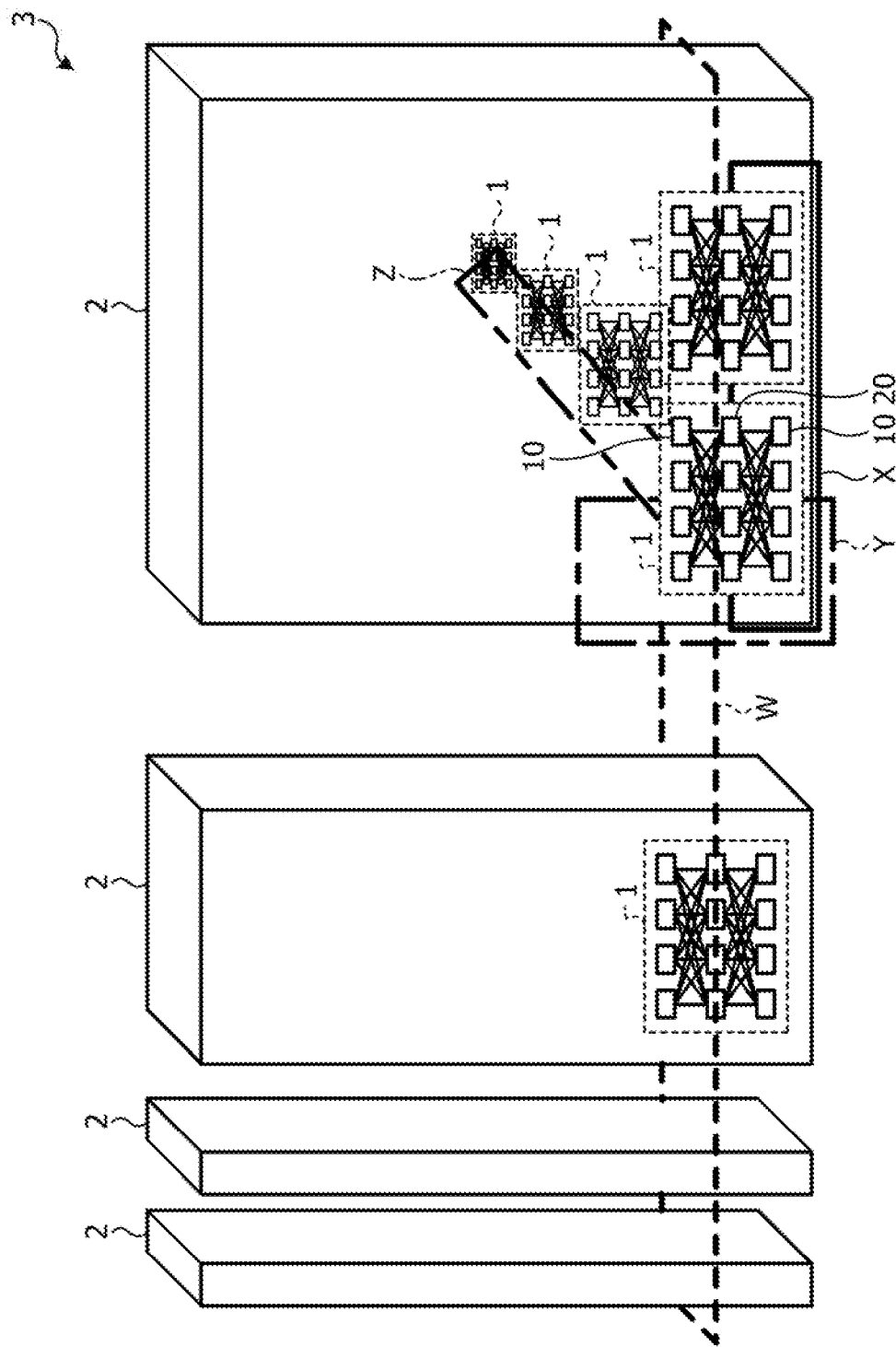
FIG. 28 illustrates a configuration of an information processing system according to a modification.

FIG. 28 illustrates a configuration of an information processing system according to a modification. The first embodiment describes the case where the sizes in the W, X, Y, and Z dimensions are four and four system boards 1 form a ring. The sizes in the dimensions, however, may vary. The modification describes the case where the sizes in the dimensions vary.

In the information processing system 3 according to the modification, the number of main operation devices 10 on each system board 1 and the number of aggregate operation devices 20 on each system board 1 are the same as those described in the first embodiment. The number of system boards 1 included in each of three-dimensional torus meshes 2, however, is different from the first embodiment.

In the information processing system 3, the halving and doubling processes are executed, and thus each of the sizes in the W, X, Y, and Z dimensions is 2 raised to the power of 2 or is any of values of 1, 2, and 4. Thus, the number of system boards 1 that form an annular structure in each of the dimensions is any of 1, 2, and 4.

In the information processing system 3 according to the modification, the size in the W dimension is 4, the size in the X dimension is 2, the size in the Y dimension is 1, and the size in the Z dimension is 4.

In the modification, a torus in the X dimension indicates the same system board 1 in two directions extending in the X dimension from a specific system board 1. For example, a bandwidth for communication in the X dimension is twice as wide as bandwidths for communication in the W and Z dimensions.

One system board 1 is installed in the Y dimension, and the halving and doubling processes are not executed in the Y dimension. Thus, a bandwidth in the Y dimension may be assigned to any of the X and Z dimensions.

In this case, the aggregate operation devices 20 acquire divided array data items from the main operation devices 10, collectively execute the halving process in the dimensions, collectively execute the doubling process in the dimensions after the halving process, and broadcast operation results in the same manner as the first embodiment. Thus, the aggregate operation devices 20 may execute the Allreduce process.

As described above, even when the sizes in the dimensions vary, the information processing system according to the modification may execute the Allreduce process in substantially the same manner as the first embodiment. In the modification, in the Allreduce process, amounts of data to be transferred may be reduced and communication time may be reduced. Amounts of data to be computed may be evenly distributed, loads to be applied due to the computation may be distributed, and a processing speed of the entire information processing system may be improved.

Second Embodiment

Next, a second embodiment is described. The second embodiment is different from the first embodiment in that when bandwidths for communication in the dimensions vary, an information processing system according to the second embodiment determines, based on the magnitude of the bandwidths, the order of the dimensions in which the halving and doubling processes are executed.

The block diagram of FIG. 9 also illustrates each of aggregate operation devices 20 according to the second embodiment. In the case where the halving process is collectively executed in the dimensions and the doubling process is collectively executed in the dimensions after the halving process, information of a combination of the halving and doubling processes is in a nested structure. As information of a combination of the halving and doubling processes to be executed in a specific dimension is described closer to the inside of the nested structure, sizes of data items to be transferred in the halving and doubling processes executed in the specific dimension are smaller.

As described in the modification of the first embodiment, the bandwidths for communication in the W, X, Y, and Z dimensions may vary. It is preferable that, in a state in which sizes of data items to be transferred are large, the halving and doubling processes be executed in a dimension in which a bandwidth is large. In the following description, the functions of the same sections as those in the first embodiment will not be described.

The order determiners 292 acquire the wiring table from the network configuration managers 208. Then, the order determiners 292 acquire the sizes in the dimensions from the wiring table. As a size in a certain dimension is smaller, a bandwidth in the certain dimension is wider. The order determiners 292 sort the dimensions in ascending order of size. For example, the order determiners 292 sort the W, X, Y, and Z dimensions in descending order of bandwidth. Then, the order determiners 292 determine the order of the dimensions after the sorting as the order of the dimensions in which the halving process is to be executed, and notify the determined order to the comprehensive managers 291.

The comprehensive managers 291 receive, as the order of the dimensions in which the halving process is to be processed, the notification indicating the order of the dimensions sorted by sorting the bandwidths in descending order. Then, the comprehensive managers 291 execute the halving process in descending order of bandwidth and execute the doubling process in the opposite order to the descending order of the bandwidths.

Figure 29:
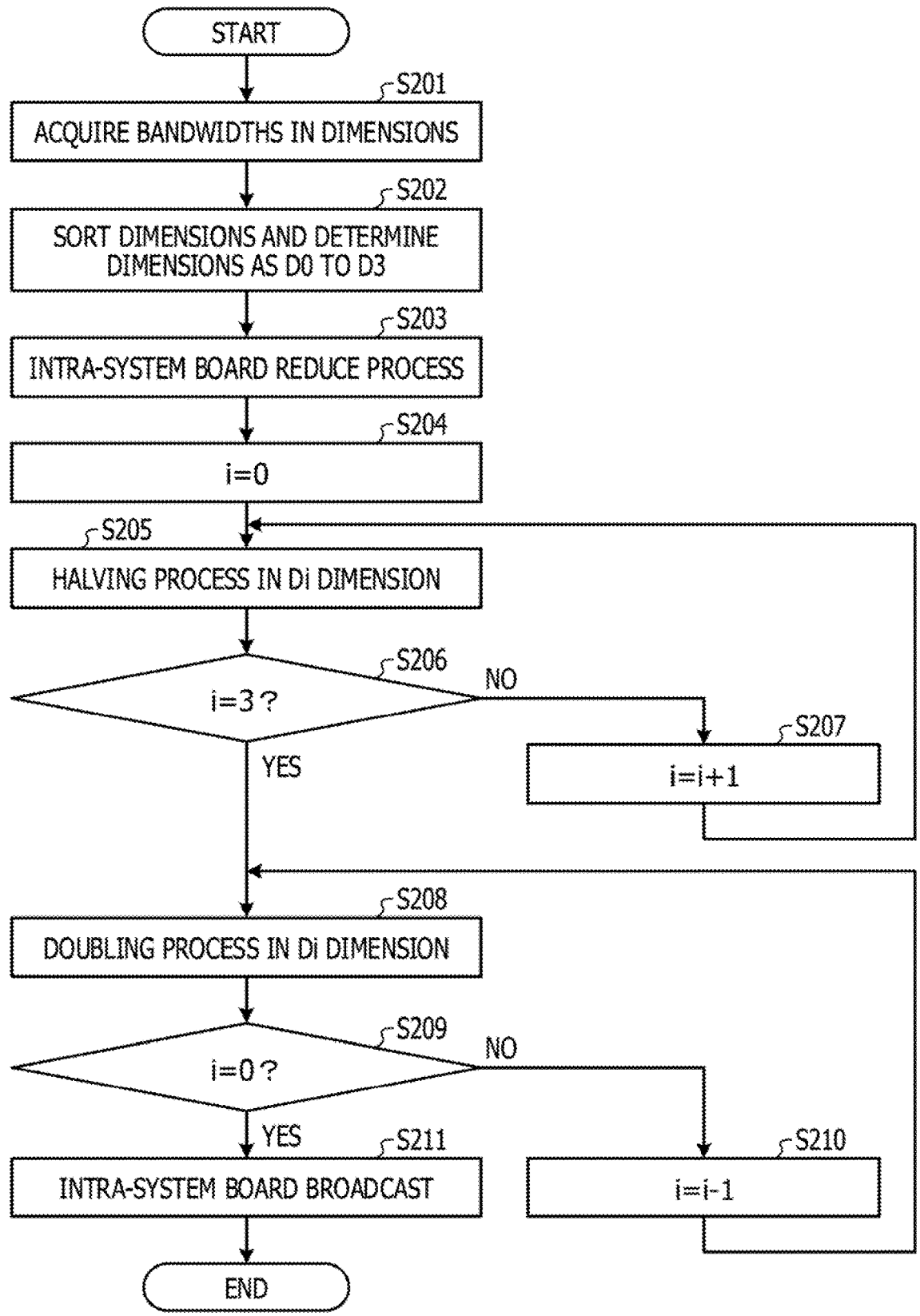
FIG. 29 is a flowchart of an Allreduce process by an information processing system according to a second first embodiment.

Next, the flow of the Allreduce process by the information processing system 3 according to the second embodiment is described with reference to FIG. 29. FIG. 29 is a flowchart of the Allreduce process by the information processing system according to the second embodiment.

The order determiners 292 receive the wiring table from the network configuration managers 208. Then, the order determiners 292 confirm the W, X, Y, and Z dimensions that are the dimensions of the information processing system 3. The order determiners 292 acquire the bandwidths in the W, X, Y, and Z dimensions (in step S201).

Then, the order determiners 292 sort the W, X, Y, and Z dimensions in descending order of bandwidth. Then, the order determiners 292 determine the dimensions as D0 to D3 in the order of the sorted dimensions (in step S202). After that, the order determiners 292 notify the comprehensive managers 291 of information of the assignment of D0 to D3 to the dimensions.

Each of the data dividers 191 of the main operation devices 10 divides array data stored in a corresponding memory 104 into four ¼ array data items. Then, the data transmitters 192 execute the intra-system board Reduce process by transmitting the divided ¼ array data items to the different aggregate operation devices 20 (in step S203). The data receivers 294 of the aggregate operation devices 20 receive the ¼ array data items transmitted by the main operation devices 10. Then, the data receivers 294 cause the ¼ array data items to be stored in the memories 204.

The comprehensive managers 291 receive, from the order determiners 292, the information of D0 to D3 assigned to the W to Z dimensions sorted in descending order of bandwidth. Then, the comprehensive managers 291 set i to 0 (in step S204).

Then, the comprehensive managers 291 acquire the ¼ array data items from the memories 204. Then, the comprehensive managers 291 execute the halving process in the Di dimension (in step S205).

Then, the comprehensive managers 291 determine whether i=3 (in step S206). When i is not 3 (negative in step S206), the comprehensive managers 291 increment i by 1 (in step S207) and cause the process to return to step S205.

When i=3 (affirmative in step S206), the comprehensive managers 291 execute the doubling process in the Di dimension (in step S208).

Then, the comprehensive managers 291 determine whether i=0 (in step S209). When i is not 0 (No in step S209), the comprehensive managers 291 decrement i by 1 (in step S210) and cause the process to return to step S208.

When i=0 (Yes in step S209), the comprehensive managers 291 execute the intra-system board broadcast using results of executing the aggregate operations on the ¼ array data items (in step S211).

As described above, the aggregate operation devices according to the second embodiment execute the halving process in the dimensions in descending order of bandwidth and execute the doubling process in the opposite order to the descending order of the bandwidths, thereby executing the Allreduce process. Thus, communication may be executed using a bandwidth as wide as possible when amounts of data to be transferred are large, and communication time may be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system of a multi-dimensional torus structure having N dimensions ("N" is a natural number greater than two), the system comprising:
a plurality of information processing devices each of which is coupled to each other as any one of nodes in the multi-dimensional torus structure, each of the plurality of information processing devices including: a plurality of main operation devices and a plurality of aggregate operation devices, each of the plurality of main operation devices being coupled to each other via the plurality of aggregate operation devices,
each of the plurality of aggregate operation devices includes a memory and a processor coupled to the memory, the processor being configured to perform processing, the processing including:
performing a reduce processing by acquiring first array data items from each of the plurality of main operation devices included in the information processing device to which that aggregate operation device belongs, a size of each first array data item being equal to a value obtained by dividing an original size of array data stored in each of the plurality of main operation devices by a number of the N dimensions;
performing a halving processing for each of the N dimensions in a given order of dimension, the halving processing performed for i-th dimension ("i" is a natural number from 1 to N) among the N dimensions includes transmitting a second array data item to another information processing device arranged in the i-th dimension among the plurality of information processing devices, a size of the second array data item for the i-th dimension being equal to a value obtained by dividing the size of the first array data item by N^i ("N^i" is a value obtained by raising N to the power of i);

in response to completion of the halving processing for all of the N dimensions, performing a doubling processing for each of the N dimensions in the opposite order to the given order of dimension, the doubling processing performed for i-th dimension among the N dimensions includes transmitting a third array data item to the other information processing device arranged in the i-th dimension among the plurality of information processing devices, a size of the third array data item for the i-th dimension being equal to a value obtained by dividing the size of the first array data item by N^(N−i) ("N^(N−i)" is a value obtained by raising N to the power of N−i); and in response to completion of the doubling processing for all of the N dimensions, transmitting operation results collected by the doubling processing for all of the N dimensions to each of the plurality of main operation devices included in the information processing device to which that device coupled to the concerned aggregate operation device.

2. The information processing system according to claim 1, wherein the reduce processing performed by each of the plurality of aggregate operation device is configured to acquire the array data items, which have been obtained by dividing a data block stored in any one of the plurality of main operation devices coupled to that aggregate operation device so that the number of array data items is equal to the number of aggregate operation devices coupled to that main operation device.

3. The information processing system according to claim 2, wherein each of the plurality of main operation devices includes a memory and a processor coupled to the memory, the processor being configured to perform processing, the processing including:

dividing a data block stored in that main operation device into array data items for a number of aggregate operation devices coupled to that main operation device, transmitting the array data items generated by the dividing of the data block to the aggregate operation devices coupled to that main operation device, and receiving operation results from the aggregate operation devices coupled to that main operation device.

4. The information processing system according to claim 1, wherein the information processing devices have a three-dimensional torus structure in which the plurality of main operation devices are coupled to each other, and have a one-dimensional torus structure in which the plurality of aggregate operation devices are coupled to each other.

5. The information processing system according to claim 1, wherein the processing further includes determining the given order of the dimensions by sorting the dimensions in descending order of bandwidth in the dimensions.

6. The information processing system according to claim 1, wherein the plurality of main operation devices included in a specific information processing device are coupled to all the plurality of aggregate operation devices included in the specific information processing device.

7. The information processing system according to claim 1, wherein the torus structure is a four-dimensional torus structure.

8. A method of controlling an information processing system of a multi-dimensional torus structure having N dimensions ("N" is a natural number greater than two), the system, the information processing system including a plurality of information processing devices each of which is coupled to each other as any one of nodes in the multi-dimensional torus structure, each of the plurality of information processing devices including: a plurality of main operation devices and a plurality of aggregate operation devices, each of the plurality of main operation devices being coupled to each other via the plurality of aggregate operation devices, the method comprising:

acquiring, by each of the plurality of aggregate operation devices, array data items from each of the plurality of main operation devices included in the information processing device to which that aggregate operation device belongs, a size of each first array data item being equal to a value obtained by dividing an original size of array data stored in each of the plurality of main operation devices by a number of the N dimensions;

performing, by each of the plurality of aggregate operation devices, a halving processing for each of the N dimensions in a given order of dimension, the halving processing performed for i-th dimension ("i" is a natural number from 1 to N) among the N dimensions includes transmitting a second array data item to another information processing device arranged in the i-th dimension among the plurality of information processing devices, a size of the second array data item for the i-th dimension being equal to a value obtained by dividing the size of the first array data item by N^i ("N^i" is a value obtained by raising N to the power of i);

in response to completion of the halving processing for all of the N dimensions, performing a doubling processing for each of the N dimensions in the opposite order to the given order of dimension, the doubling processing performed for i-th dimension among the N dimensions includes transmitting a third array data item to the other information processing device arranged in the i-th dimension among the plurality of information processing devices, a size of the third array data item for the i-th dimension being equal to a value obtained by dividing the size of the first array data item by N^(N−i) ("N^(N−i)" is a value obtained by raising N to the power of N−i); and in response to completion of the doubling processing for all of the N dimensions, transmitting, by each of plurality of the aggregate operation devices, operation results collected by doubling processing for all of the N dimensions to each of the plurality of main operation devices included in the information processing device to which that device coupled to the concerned aggregate operation device.

* * * * *